(12) United States Patent
Arbel

(10) Patent No.: US 8,232,482 B2
(45) Date of Patent: Jul. 31, 2012

(54) METHOD AND APPARATUS FOR FINISHED INSTALLATION OF ELECTRICAL OUTLET BOX WITHOUT USE OF EXTERNAL COVER PLATE

(75) Inventor: Omer Arbel, Vancouver (CA)

(73) Assignee: Bocci Design & Manufacturing, Inc., Vancouver, British Columbia (CA)

( * ) Notice: Subject to any disclaimer, the term of this patent is extended or adjusted under 35 U.S.C. 154(b) by 823 days.

(21) Appl. No.: 12/228,014

(22) Filed: Aug. 8, 2008

(65) Prior Publication Data

US 2010/0032182 A1 Feb. 11, 2010

Related U.S. Application Data

(63) Continuation-in-part of application No. 11/731,107, filed on Mar. 30, 2007, now Pat. No. 7,956,295.

(60) Provisional application No. 61/134,571, filed on Jul. 11, 2008.

(51) Int. Cl.
*H02B 1/40* (2006.01)
*H05K 5/03* (2006.01)

(52) U.S. Cl. ............ 174/480; 174/481; 174/66; 174/67; 220/3.2; 220/3.3; 220/241; 33/DIG. 10

(58) Field of Classification Search .................. 174/480, 174/481, 50, 53, 57, 58, 66, 67, 520; 220/3.2–3.9, 220/4.02, 241, 242; 52/220.8, 220.1; 33/DIG. 10, 33/528
See application file for complete search history.

(56) References Cited

U.S. PATENT DOCUMENTS

| | | | |
|---|---|---|---|
| 1,066,706 A | 7/1913 | Caine | |
| 4,247,738 A | 1/1981 | Bonato | |
| 4,353,759 A * | 10/1982 | Stallings | 174/66 |
| 4,399,922 A | 8/1983 | Horsley | |
| 4,569,458 A | 2/1986 | Horsley | |
| 5,287,665 A * | 2/1994 | Rath, Jr. | 220/3.3 |
| 5,321,206 A * | 6/1994 | Hibler | 174/66 |
| 5,740,936 A | 4/1998 | Nash | |
| 6,239,365 B1 * | 5/2001 | McEvers | 174/50 |
| 6,395,984 B1 * | 5/2002 | Gilleran | 174/58 |
| 6,649,835 B2 * | 11/2003 | Gilleran | 174/58 |
| 7,259,329 B1 * | 8/2007 | Balma et al. | 174/66 |
| 7,956,295 B2 * | 6/2011 | Arbel | 174/480 |

FOREIGN PATENT DOCUMENTS

| | | |
|---|---|---|
| CA | 2017589 | 1/1995 |
| EP | 1739254 A2 | 1/2007 |

\* cited by examiner

*Primary Examiner* — Angel R Estrada
(74) *Attorney, Agent, or Firm* — Todd N. Hathaway

(57) ABSTRACT

An electrical outlet box installation in which there is no exposed cover plate, only the operative portion of the electrical component is visible at the wall surface. The operative portion of the component may be an electrical outlet, jack, switch, knob, or light, for example. The body of the electrical component is housed within the outlet box, also referred to as a junction box, with the open side of the outlet box being covered by a plate assembly having an opening that closely surrounds the operative portion of the component. The surface of the plate assembly is covered with wallboard mud, or other wall finishing material, which is blended into the surrounding surface of the wall so that only the operative portion of the component is exposed. The wall covering may also be panelling, stone, tile or similar materials.

25 Claims, 44 Drawing Sheets

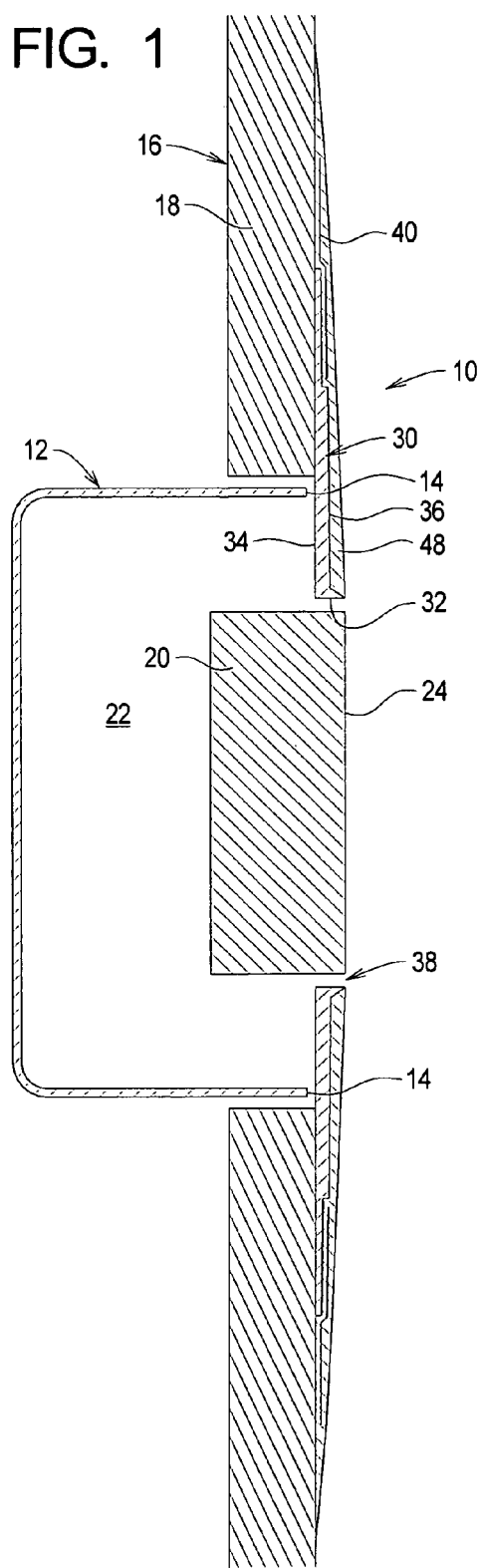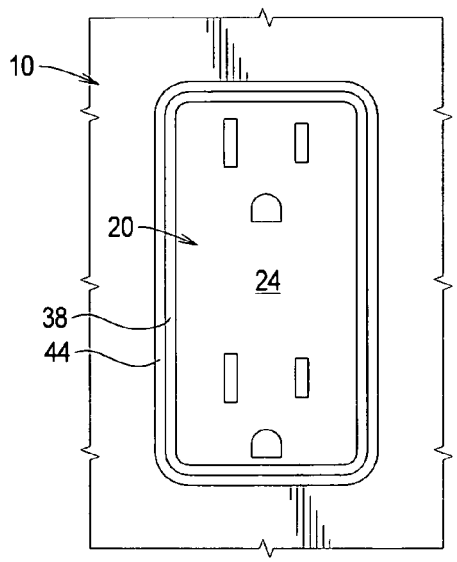

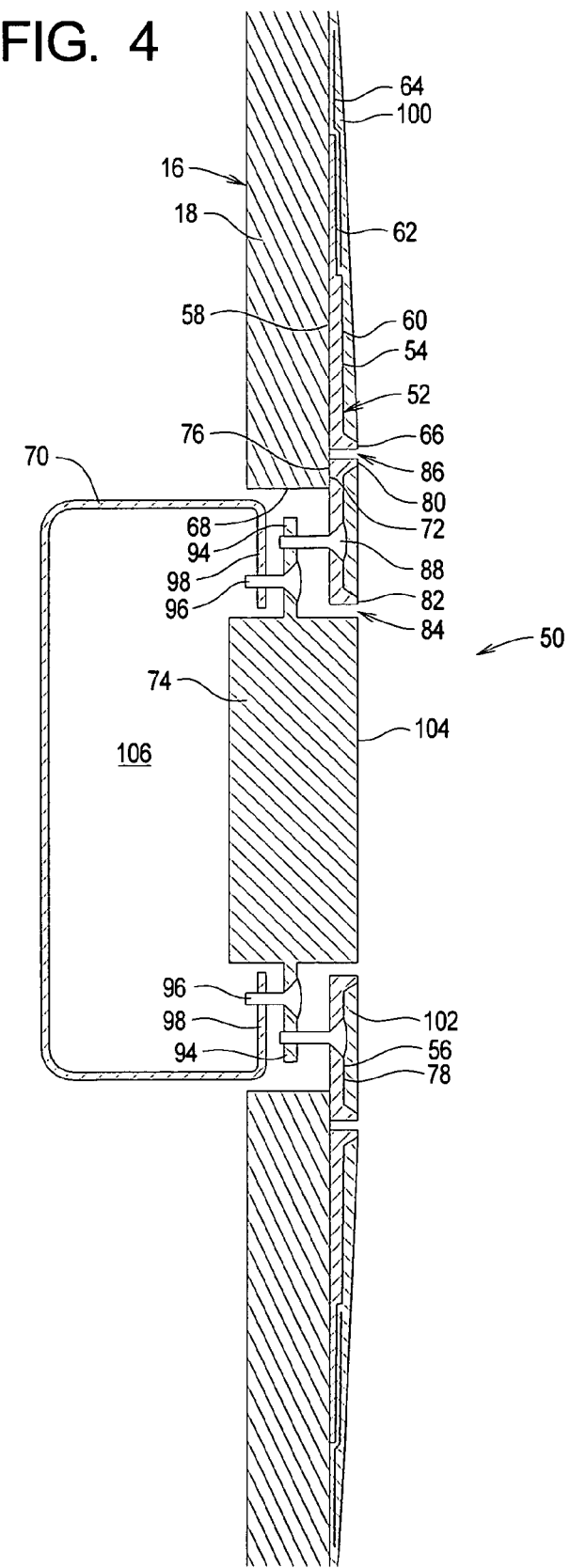

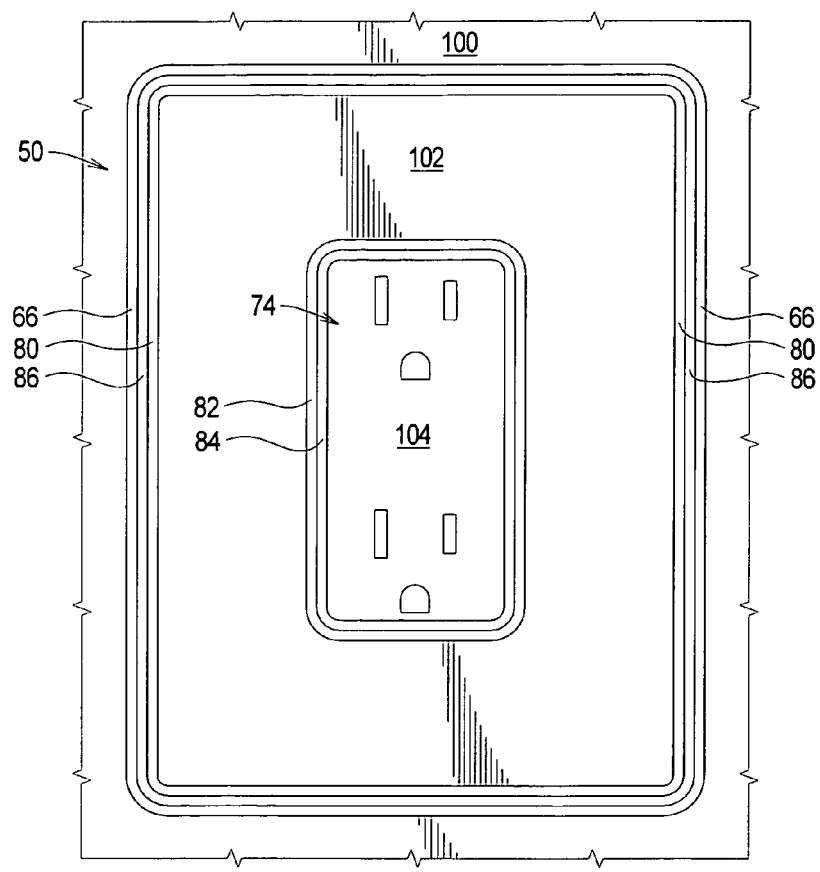

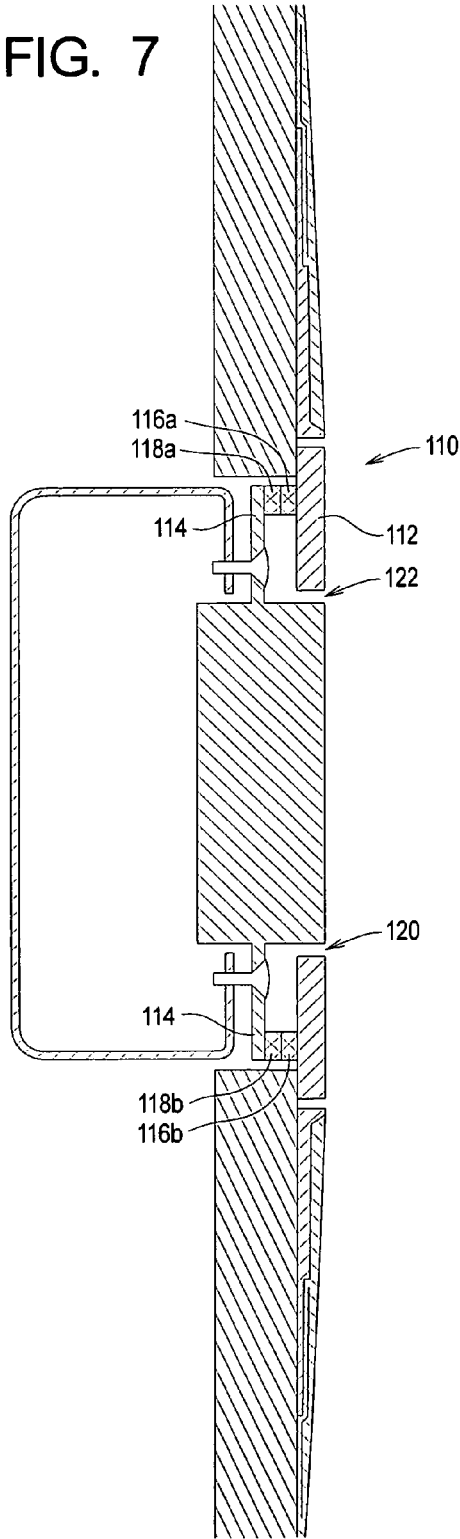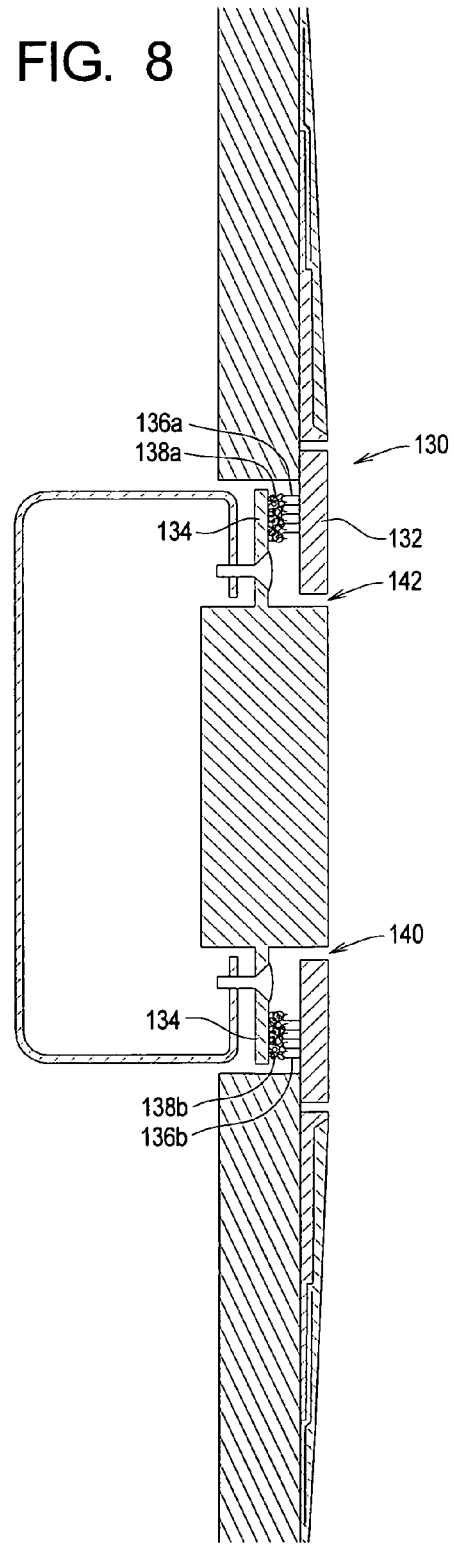

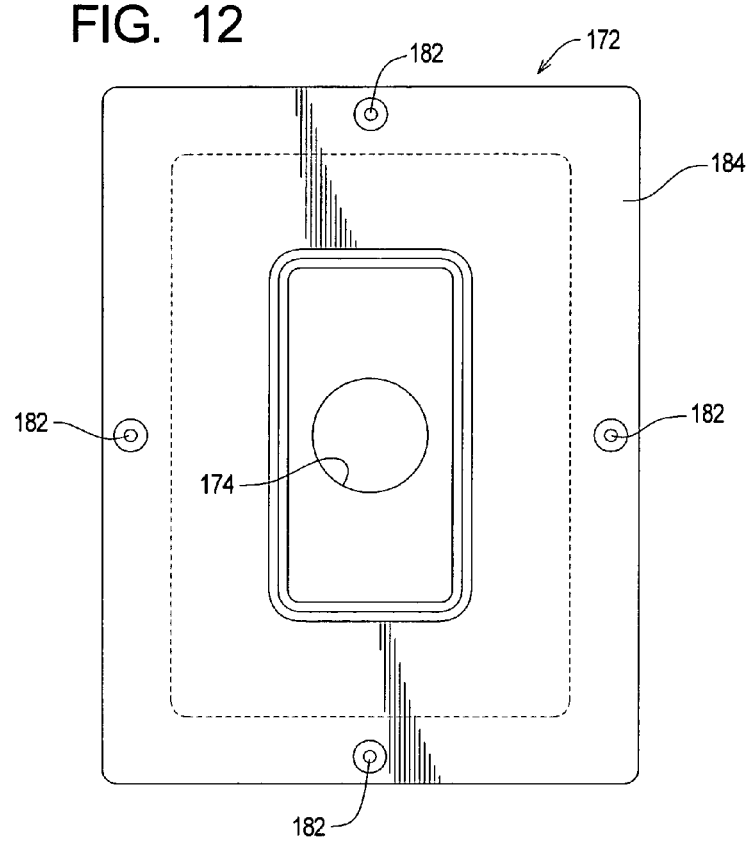

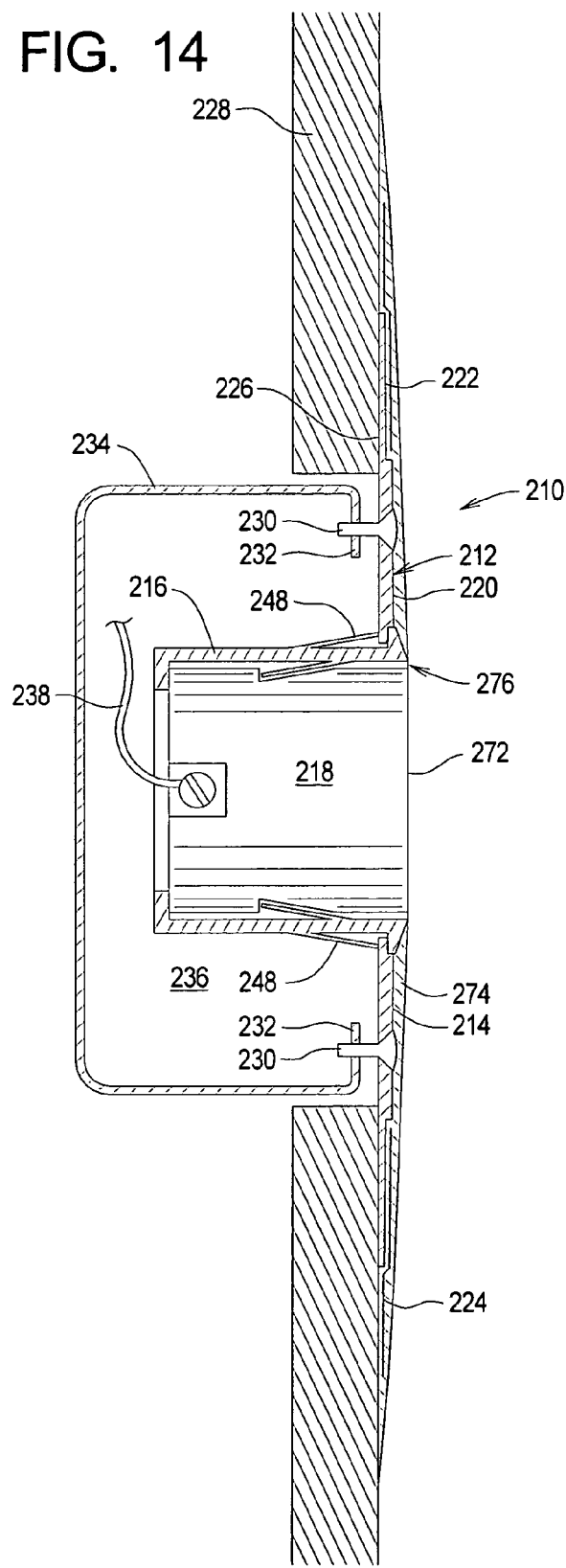

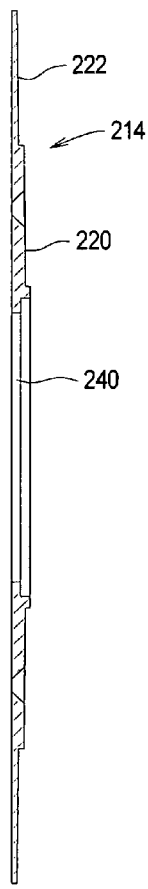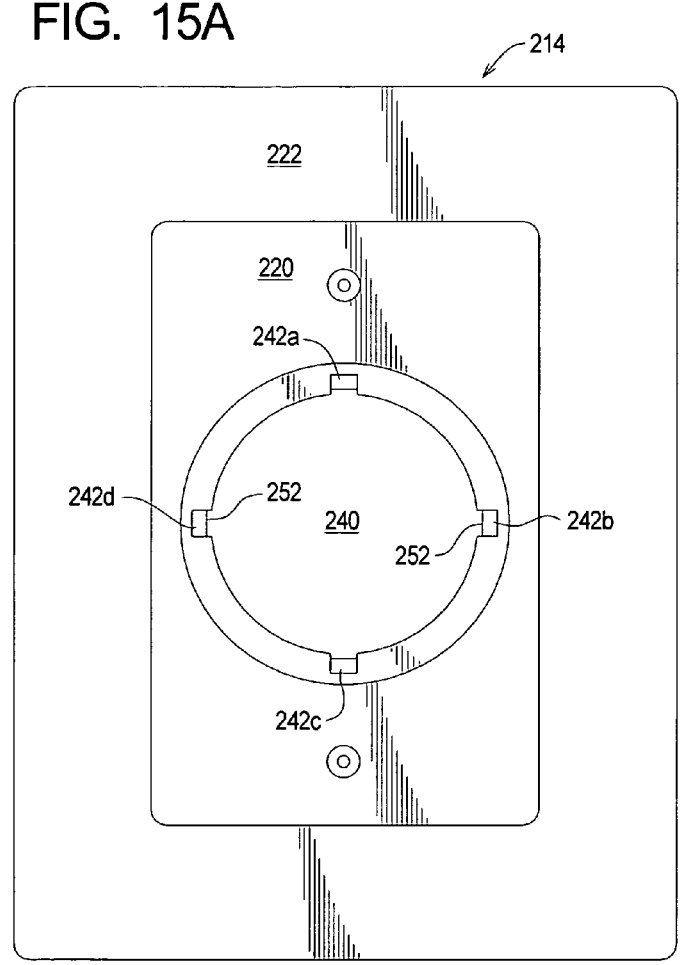

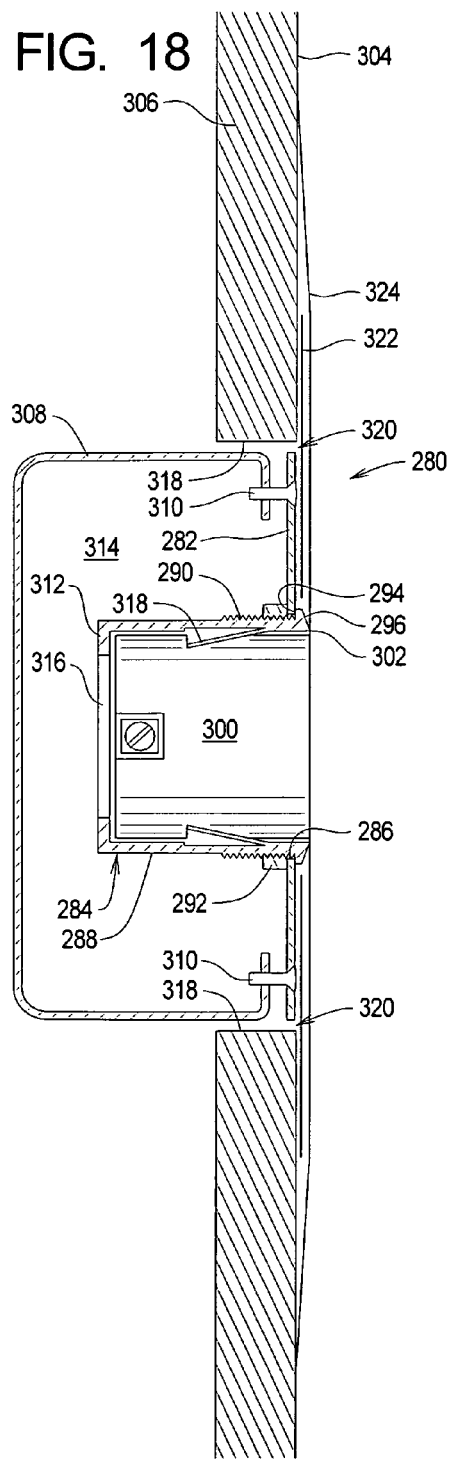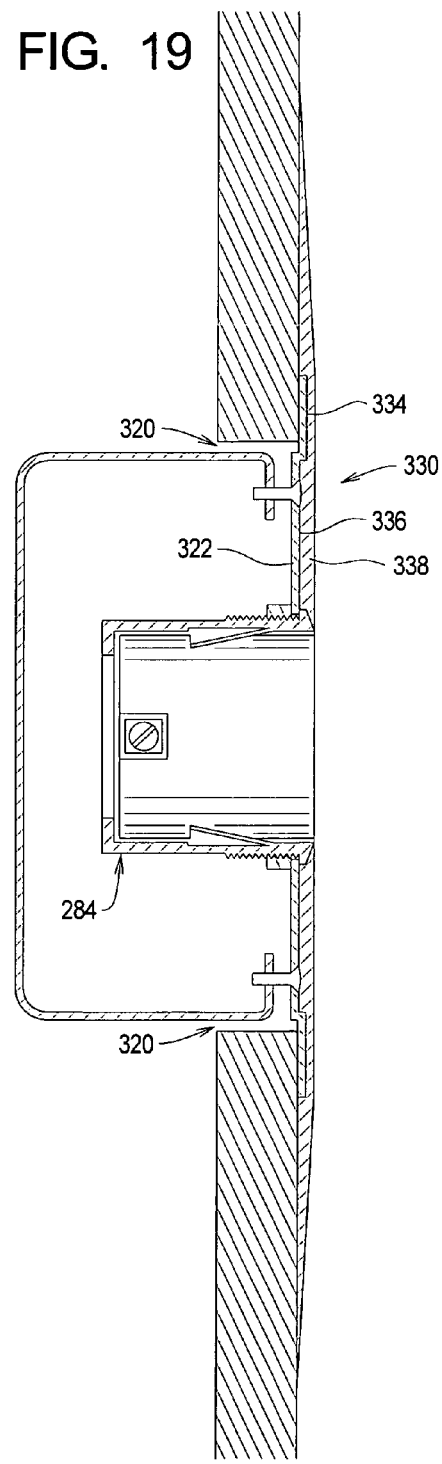

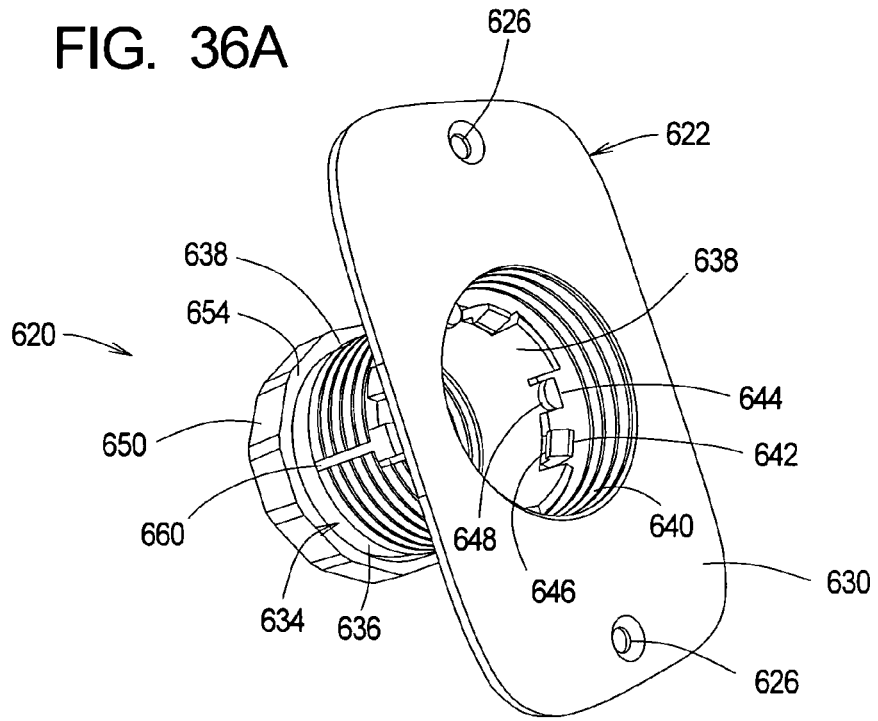
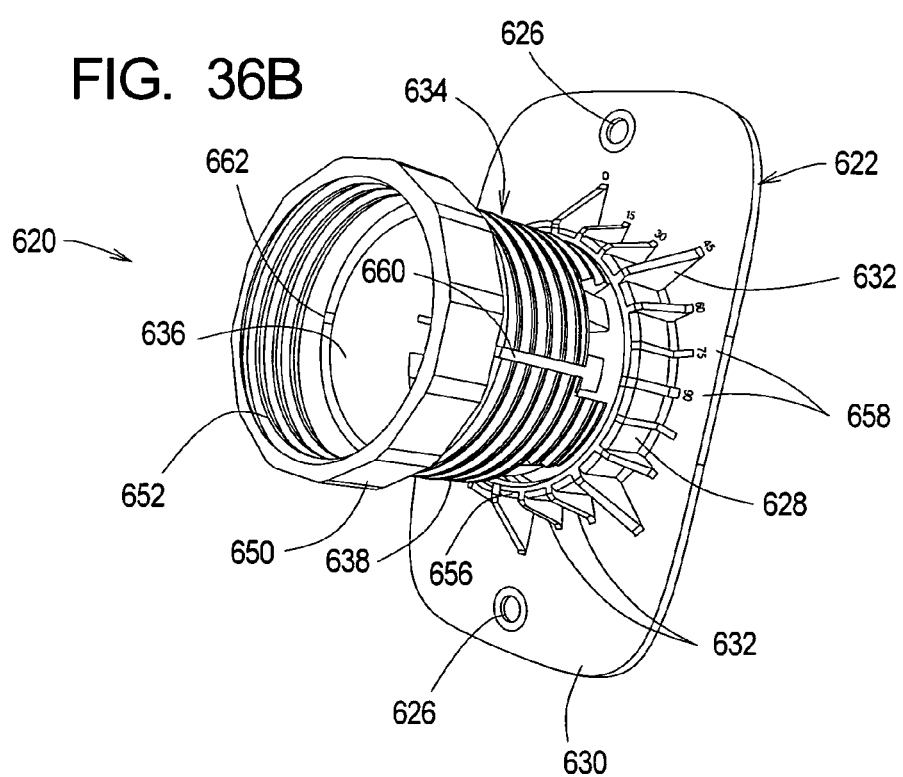

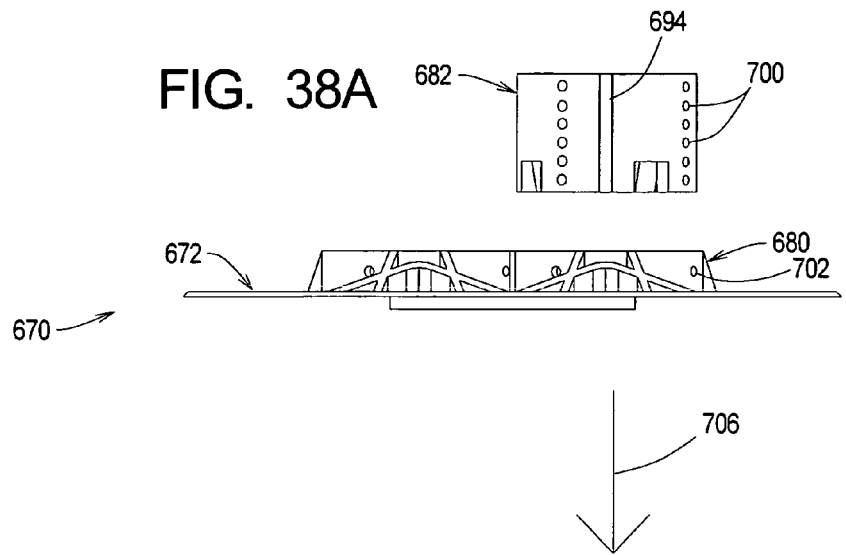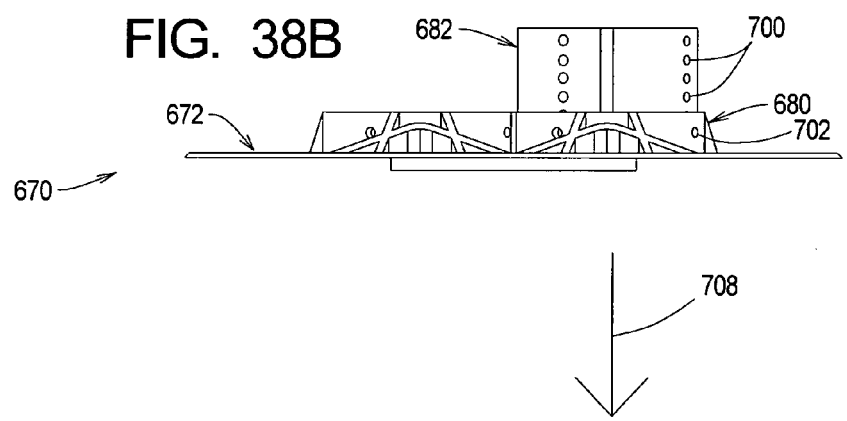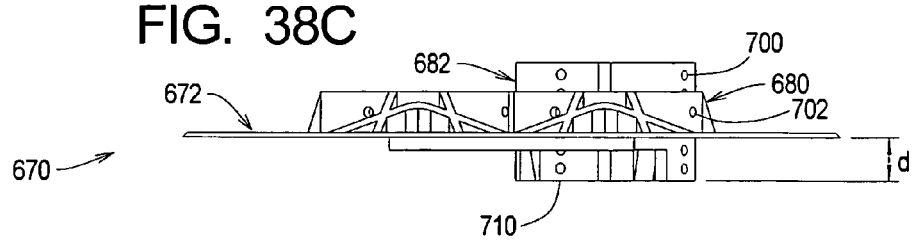

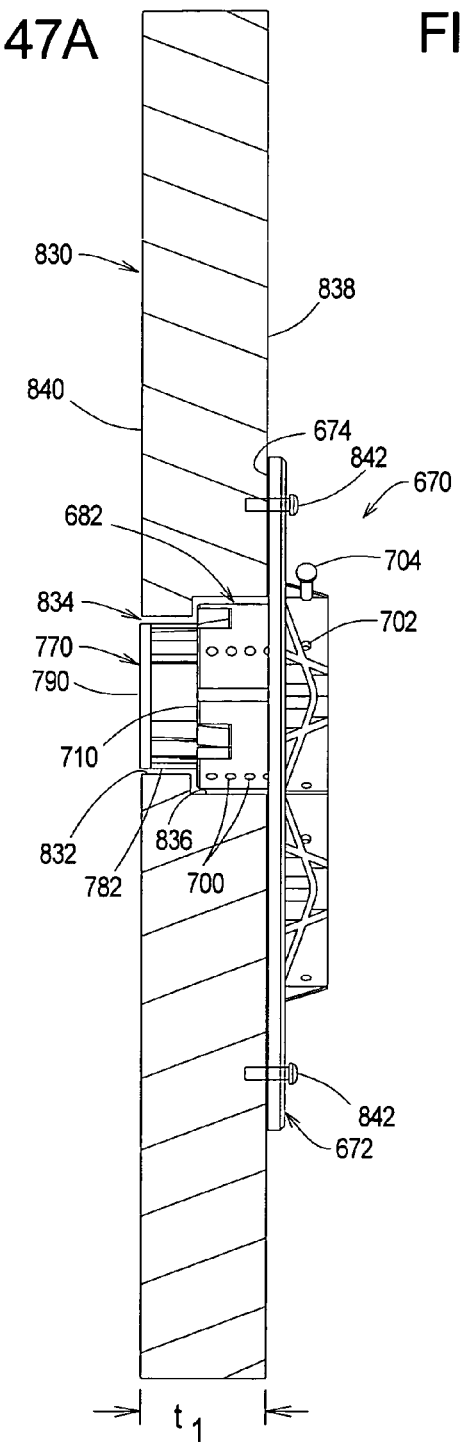
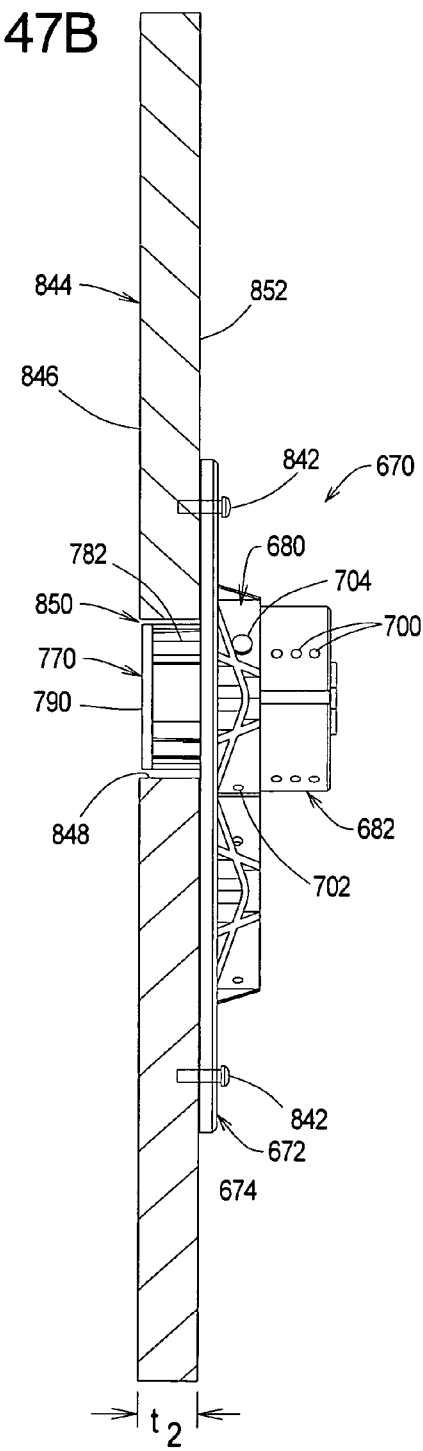

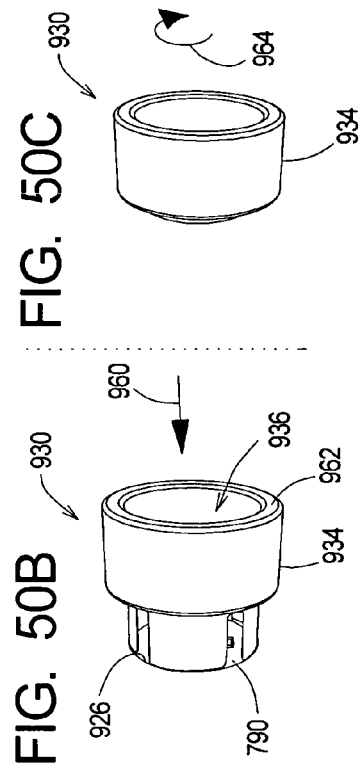
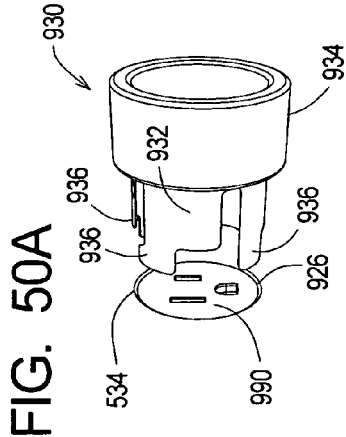
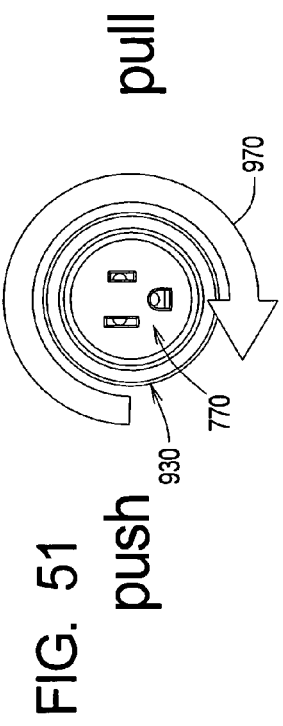
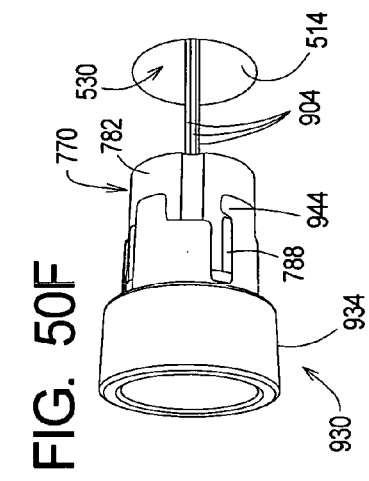
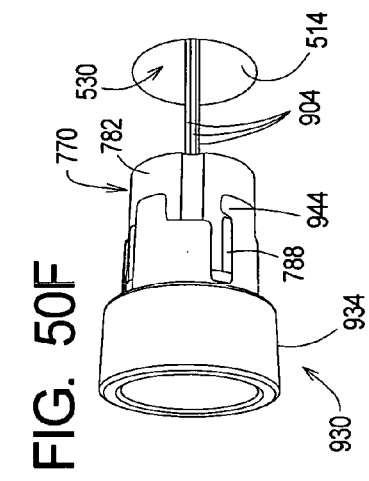
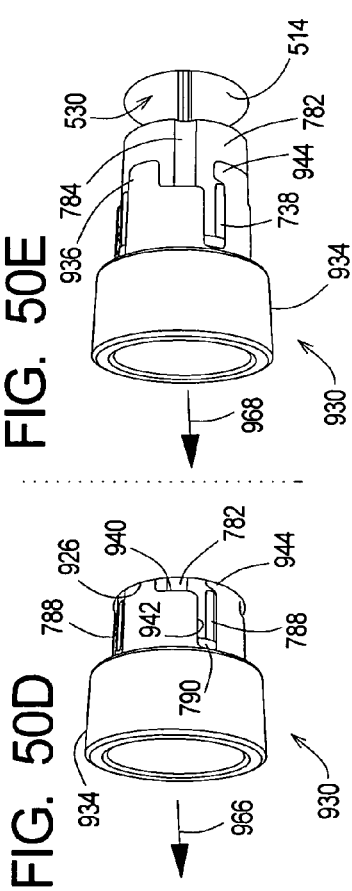

METHOD AND APPARATUS FOR FINISHED INSTALLATION OF ELECTRICAL OUTLET BOX WITHOUT USE OF EXTERNAL COVER PLATE

RELATED CASES

This application is a continuation-in-part application of non-provisional patent application Ser. No. 11/731,107, entitled "Method and Apparatus for Finished Installation of Electrical Outlet Box Without Use of External Cover Plate", which was filed Mar. 30, 2007 now U.S. Pat. No. 7,956,295. This application claims the benefit of U.S. provisional patent application Ser. No. 61/134,571, entitled "Method and Apparatus for Finished Installation of Electrical Outlet Box Without Use of External Cover Plate", which was filed Jul. 11, 2008.

BACKGROUND a. Field of the Invention

The present invention relates generally to electrical junction and outlet boxes, such as are used for installation of electrical outlets and light switches, and, more particularly, to a method and apparatus that enables such boxes to be installed in sheetrock walls and the like without a cover plate that is visible when installation is finished.

b. Related Art

Electrical outlet boxes (sometimes also referred to herein as junction boxes) are a ubiquitous feature of modern residential and commercial construction. Typically, the outlet box encloses one or more electrical outlets or switches, to which wires are run from within the surrounding wall structure, although in some instances sensors, lights and other components may be mounted in the outlet boxes; use with all such devices is contemplated by the present invention, and the term "outlet box" applies regardless of whether the device mounted therein is in an electrical outlet or serves some other function.

Despite advances in other areas of technology, electrical outlet boxes have remained little changed for at least the better part of a century. As is well known, outlet boxes ordinarily take the form of a shell (typically rectangular, although in some instances being hexangular or having other shapes) that is open at the front. The outlet box is nailed to a stud or otherwise mounted to the internal structure of a wall, with the open side facing toward the front. Wires are routed to the box and attached to the electrical outlet, switch or other component, which is then installed within the interior of the box. The open front of the box is then closed by a cover plate, having one or more openings through which the operative portion of the outlet, switch or other component protrudes.

This type of installation has been used for so many years that, from an aesthetic standpoint, most people now simply accept the presence of visible cover plate as a necessary evil. Of course, numerous efforts have been made to improve the appearance of outlet box covers, but with very mixed results: At best, they have turned the cover plate into a more or less decorative article, while at worst, they have produced an even more pronounced eyesore; in recent years, the trend has been to simply make the cover plate plain and utilitarian in appearance, in an effort to minimize its visual impact as much as possible.

The cover plates of conventional outlet boxes therefore exist as visual distractions in otherwise attractively finished interiors, both residential and commercial. While the problem is perhaps most pronounced in high-end construction, where a refined appearance is sought, even modest homes could benefit aesthetically from the elimination of visible cover plates.

At the same time, it must be borne in mind that junction boxes serve important structural and safety functions, i.e., they provide support for the electrical component and also enclose the wire ends and contacts that would otherwise be exposed. The functional requirements of outlet boxes are frequently spelled out in building codes, from which deviation is neither desirable nor practical. Consequently, any aesthetic improvement cannot be made at the expense of violating codes or compromising the functions of the outlet box itself.

Accordingly, there exists a need for a method and apparatus that enables an electrical outlet, switch or other component to be installed in a wall without the presence of a visible cover plate. Furthermore, there exists a need for such a method and apparatus that yields an aesthetically satisfactory result. Still further, there exists a need for such a method and apparatus that enables an installation to be made quickly and efficiently, and without requiring special tools or skills. Still further, there exists a need for such a method and apparatus that utilizes economical parts and materials. Still further, there exists a need for such a method and apparatus that will comply with applicable building codes, and that will not compromise the functions served by the junction boxes themselves.

SUMMARY OF THE INVENTION

The present invention has solved the problems cited above, and is a method and apparatus for forming an electrical outlet box installation with only the operative portion of the electrical component being visible on the wall in the finished installation. Broadly, the method comprises the steps of: (a) placing the electrical component in a junction box in the wall so that only an operative portion of the electrical component is located at a surface of the wall, and (b) placing a layer of wall surface material over the junction box while leaving exposed the operative portion of the electrical component, (c) whereby when finished substantially only the operative portion of the electrical component is visibly distinguishable at the surface of the wall.

The step of placing a layer of wall surface material over the junction box while leaving exposed the operative portion of the electrical component may comprise placing a plate assembly on the junction box so that the operative portion of the electrical component is exposed at an opening of the plate assembly and a generally planar flange portion of the plate assembly extends substantially parallel to the surface of the wall, and placing the wall surface material over the flange portion of the plate assembly while leaving exposed the opening of the plate assembly and the operative portion of the electrical component in the opening. The step of placing the plate assembly on the junction box may comprise mounting the flange portion of the plate assembly at the surface of the wall so that the flange portion lies generally flat thereon. The step of placing a wall surface material over the flange portion of the plate assembly may comprise applying a layer of fill material over the flange portion of the plate assembly and blending the layer of fill material into the surface of the wall around the flange portion of the plate assembly. The step of applying a layer of fill material over the flange portion of the plate assembly may comprise applying a layer of drywall compound over the flange portion of the plate assembly and onto the surface of the wall around the plate portion.

The step of mounting the flange portion of the plate assembly at the surface of the wall may comprise mounting the flange portion of the plate assembly at the surface of the wall so that a raised ridge about the opening of the plate assembly surrounds the electrical component therein, so as to define an inner edge of an area of the flange portion for deposition of the layer of fill material thereon. The step of mounting the flange portion of the plate assembly at the surface of the wall may further comprise mounting the flange portion of the plate assembly to the surface of the wall so that the raised ridge projects from the flange portion to lie substantially flush with the distal end of the operative portion of the electrical component. The step of applying a layer of fill material over the flange portion of the plate assembly and blending the layer of fill material onto the surface of the wall may comprise applying the layer of fill material over both the flange portion of the plate assembly and the distal end of the operative portion of the electrical component, and then reducing the thickness of the layer of fill material until the distal end of the operative portion of the electrical component and ridge about the opening of the plate assembly are exposed at the surface of the wall. The step of reducing the thickness of the layer of fill material may comprise sanding the layer of fill material from over the distal end of the operative portion of the electrical component and the ridge surrounding the opening of the plate assembly. The method may further comprise the steps of applying the layer of fill material over a thin protective cover mounted on the distal end of the operative portion of the electrical component, and removing the thin protective cover after the layer of fill material has been sanded from over the distal end of the operative portion of the electrical component.

The step of mounting the flange portion of the plate assembly at the surface of the wall may comprise mounting the plate assembly to a front side of the junction box, and the step of placing the electrical component in the junction box may comprise mounting the electrical component in the plate assembly. The step of mounting the electrical component in the plate assembly may comprise mounting the electrical component in a receptacle portion of the plate assembly so that the operative portion of the electrical component is exposed through the opening of the plate member. The step of mounting the electrical component in the receptacle portion may comprise detachably mounting the electrical component in the receptacle portion so that alternative electrical components are interchangeably mountable therein. The step of detachably mounting the electrical component in the receptacle portion of the plate assembly may comprise inserting the electrical component into the receptacle portion through the opening of the plate member so that the electrical component is releasably captured therein. The step of mounting the component in the receptacle portion may comprise mounting a plurality of the electrical components in individual receptacle portions in the plate assembly.

In a preferred embodiment, the invention provides a method of installing an electrical component in a wall, the method comprising the steps of: (a) providing a plate assembly having an opening and a generally planar flange portion, (b) mounting the electrical component in the opening of the plate assembly so that an operative portion of the electrical component is exposed at a front of the opening, (c) mounting the plate assembly to a junction box in the wall so that the flange portion extends substantially parallel to a surface of the wall, (d) connecting the electrical component to at least one wire lead in the junction box, and (e) placing a layer of wall surface material over the junction box and the flange portion of the plate assembly while leaving exposed the operative portion of the electrical component, (f) whereby when finished substantially only the operative portion of the electrical component is visibly distinguishable at the surface of the wall.

The invention also provides a plate assembly for installing an electrical component, the plate assembly comprising: (a) an opening for receiving the electrical component so that an operative portion of the electrical component is exposed therethrough, (b) a generally planar flange portion extending around the opening and having a substantially flat surface for receiving a layer of wall surface material thereover, and (c) means for mounting the plate assembly over a junction box in the wall so that the electrical component is positioned at a front of the junction box for connection to at least one lead therein and so that the flange portion lies generally parallel to the surface of the wall, (d) whereby when the flange portion of the plate assembly is finished over with the layer of wall surface material substantially only the operative portion of the electrical component will be visibly distinguishable at the surface of the wall.

The means for mounting the plate assembly over a junction box in the wall may comprise means for mounting the plate assembly at a front surface of the wall, and the front surface of the flange portion may comprise a front surface for having a layer of wall surface fill material applied thereover. In another embodiment, the means for mounting the plate assembly over a junction box in the wall may comprise means for mounting the plate member at a back surface of the wall, and the front surface of the flange portion may comprise a front surface for being positioned against the back surface of the wall surface material.

The invention also provides an electrical component installation, comprising (a) a wall having an opening formed therein; (b) an electrical component mounted to the wall so that an operative portion of the electrical component is located at a front surface of the wall; and (c) a layer of wall surfacing material placed about the operative portion of the electrical component, so that essentially only the operative portion of the electrical component is visible at the installation when finished.

These and other features and advantages of the present invention will be more fully appreciated from a reading of the following detailed description in association with the accompanying drawings.

BRIEF DESCRIPTION OF THE DRAWINGS

FIG. 1 is a cross-sectional view of an outlet box installed using a mudded-over plate assembly in accordance with the present invention, so that only the operative face of the electrical component itself is visible at the surface of the wall itself when the installation is finished;

FIG. 2 is an elevational view of the installation of FIG. 1, showing the manner in which only the operative surface of the outlets or other electrical component can be seen at the surface of the wall;

FIG. 4 is a cross-sectional view of an outlet box installation made using a plate assembly in accordance with a second embodiment of the present invention, in which the plate assembly includes a section that is removable to provide access to the interior of the outlet box and the electrical component without have to cut or break the mudded-over surface;

FIG. 5 is an elevational view of the outlet box installation of FIG. 4;

FIG. 7 is a cross-sectional view of an outlet box installation made using a plate assembly with a removable section similar to that shown in FIGS. 4-6B, with the removable section being secured to the underlying structure by magnets rather than screws;

FIG. 8 cross-sectional view, similar to FIG. 7, of an outlet box installation made using a cover plate assembly in accordance with another embodiment of the present invention, in which the removable section of the plate assembly is secured in place by hoop-and-loop fastener material;

FIG. 12 is elevational view of the cover plate of FIG. 11, showing the single opening through which the operative portion of the electrical component, such as a pushbutton or light assembly for example, protrudes there through;

FIG. 14 is a cross-sectional view of an outlet box installation made using a plate assembly in accordance with another embodiment of the present invention, which provides a receptacle for plug-in mounting of cooperatingly configured electrical components;

FIG. 15A is a plan view of the cover plate assembly of FIG. 14;

FIG. 15B is a cross-sectional view of the cover plate assembly of FIG. 15A;

FIG. 18 is a cross-sectional view of an outlet box installation made in accordance with another embodiment of the present invention, in which the electrical component is received in a receptacle that is in threaded engagement with the plate member, and in which the edges of the plate member are set within the edges of the opening in the wall rather than extending outwardly over the surface of the wall;

FIG. 19 is a cross-sectional view of an outlet box installation made in accordance with another embodiment of the present invention, similar to that shown in FIG. 18, but in which the plate member has a thin perimeter flange that bridges the gap at the edges of the wall opening;

FIGS. 36A-36B are front and rear perspective views of the plate assembly of FIG. 35A, showing the structure thereof in greater detail;

FIGS. 38A-38C are a series of edge views of the plate and receptacle assembly of FIGS. 37A-37B, showing the manner in which projection of the sleeve member is adjusted relative to the collar and plate members of the assembly;

FIGS. 43A-43B are front and side elevational views of a fifth electrical component that is interchangeably mountable in the plate members of FIGS. 29A-37B, namely, an F-connector for cable television or the like;

FIGS. 47A-47B are edge, cross-sectional views of the installation of the plate assembly and electrical component of FIGS. 46A-46B in walls of two different thicknesses;

FIGS. 50A-50F are a series of perspective views illustrating the steps of using the extractor tool of FIGS. 48A-48B to remove an electrical component from a finished installation, by inserting the prongs of the tool into an annular gap about the circumference of the electrical component so as to reach into and release the component from engagement with the receptacle of the plate assembly; and FIG. 51 is a front elevational view of the extractor tool of FIGS. 48A-48B, illustrating the movement of the tool during the removal sequence of FIGS. 50A-50F, namely pushing the tool in around the component, rotating the tool to capture the component, and then pulling the tool out to remove the component.

DETAILED DESCRIPTION

Figure 3B:
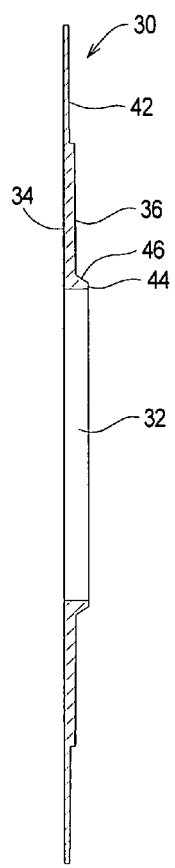
FIG. 3B is a cross-sectional of the plate assembly of FIG. 3A.

FIG. 1 shows an outlet box installation 10 made in accordance with the present invention. As used in this description and the appended claims, the terms "outlet box" and "junction box" are interchangeable and include all forms of housings that contain electrical components having portions that are exposed at the surface of a wall. Furthermore, the term "wall" includes not only structures having vertical surfaces, but also angled, contoured and horizontal surfaces, such as a concrete or wooden floor in which an outlet box is set, for example.

As can be seen, the installation 10 includes, in this embodiment, a conventional outlet box 12 that is mounted to a stud (not shown) or other support in the wall, so that the edges 14 at the open side of the box lie roughly flush with, or slightly recessed within, the front surface of the wall 16. In the installation that is shown, the wall is constructed of conventional sheetrock 18, which is the most common form in modern construction; it will be understood, however, that the wall may in some instances be constructed of plaster, masonry, or other materials.

An electrical component 20 is mounted in the interior 22 of the junction box, so that its operative surface 24 is exposed at, and stands slightly proud of, the surface of the wall 16; in the illustrated example, the electrical component is a double outlet, however as noted above the component may be a different type of outlet, a witch, a light or any other electrical device suitable to be mounted in an outlet box. The term "operative portion", as used in this description and the appended claims, refers to the interface or other portion of the electrical component that must be exposed at the wall surface in order for the component to perform its intended function, such as an outlet opening for an electrical cord, a toggle or button switch, an adjustment knob, a light or light fixture, a phone jack, and so on; in instances where the operative portion is flat it will, in general, preferably be mounted to lie flush with the surface of the surrounding wall, whereas in other instances (e.g., a toggle switch) the operative portion of the component may protrude somewhat and only its surround may be flush with the wall.

The installation 10 as described thus far is of a conventional form. In accordance with the present invention, however, the opening at the front of the outlet box is covered not by an exposed cover plate, but by a plate assembly having an upper surface that is in turn covered by wall surfacing material so as to not be visible when the installation is finished, leaving only the operative portion of the electrical component exposed to the eye.

In the embodiment illustrated in FIG. 1, the cover assembly is provided by a unitary plate member 30 that lies substantially flat against the wall surface, and has an opening 32 that conforms to and fits closely around the operative portion 24 of the electrical component.

As can be seen in FIG. 1 and also FIG. 3B, the back surface 34 of the plate member is substantially flat (planar) to conform with the surface of the wall, while the upper surface 36 is generally tapered or sloped outwardly away from the opening 32.

Figure 3A:
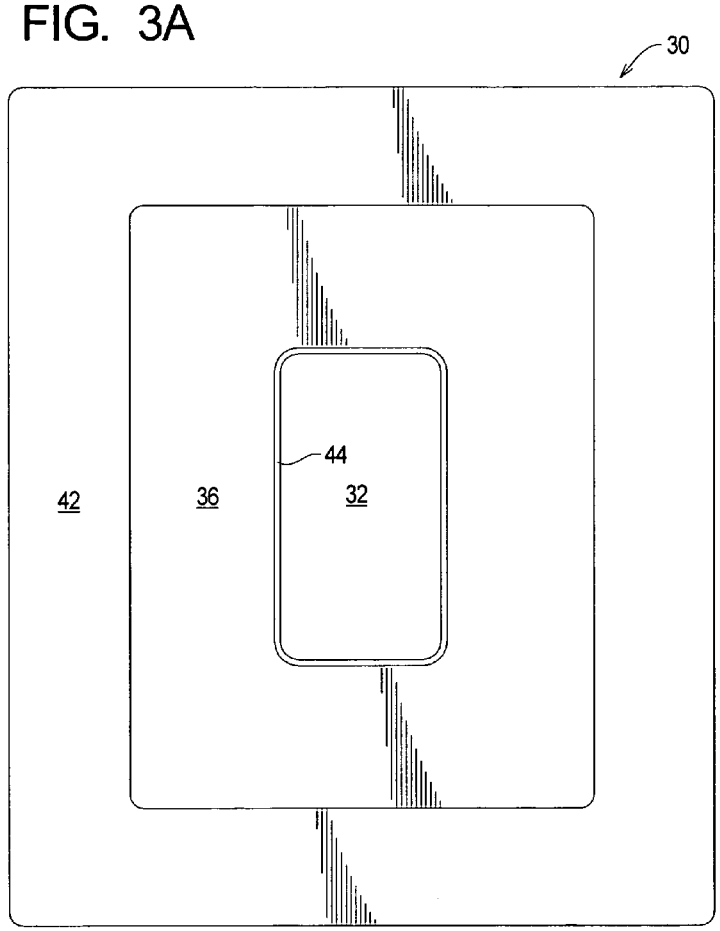
FIG. 3A is a plan view of the plate assembly of the installation of FIGS. 1-2.

Referring again to FIG. 1, it can be seen that the plate member is installed by placing it over the opening of the junction box 12, preferably with a small gap 38 between it and the electrical component 20. The outer perimeter of the plate member is pressed flat against the wall, and is held in place by wall board tape 40 or the like, which overlaps from the surface of the plate member onto that of the wall itself. As can be seen in FIG. 1 and also FIGS. 3A-3B, the perimeter of the plate member 30 is provided with a stepped portion 42 of a reduced thickness, which accommodates the height (thickness) of the wall board tape, so that the upper surface of the tape lies substantially continuous with the main upper surface 36 of the plate member. Thus, when installed, a smooth, substantially continuous surface is formed atop and around the plate member 30. The sloped surface terminates in a projecting wall 44 around the opening 32; preferably, the height of the wall is such that its upper edge lies substantially flush with (i.e., coplanar) the operative surface 24 of the electrical component, with the outer surface 46 of the wall preferably being sloped as shown in FIG. 3B.

The plate member is preferably formed of molded polycarbonate or other suitable, preferably UE-approved plastic, although other materials (e.g., metal, fiberboard, and so on) may be suitable. The exemplary dimensions are set forth in the following Table A:

TABLE A

| | |
|---|---|
| Overall Length | 178.5 mm |
| Overall Width | 145.0 mm |
| Length of Opening | 66.5 mm |
| Length of Opening | 33.0 mm |
| Thickness of Stepped Perimeter | 0.5 mm |
| Thickness at Outside Edge of Taper Surface | 1.0 mm |
| Thickness at Inside Edge of Taper Surface | 1.5 mm |
| Thickness at Inside Wall | 3.5 mm |

It will be understood that the forgoing dimensions are provided by way of illustrating one preferred embodiment and may vary in other embodiments depending on a variety of design factors.

In addition to, or in place of, the use of wall board tape, the plate member may be secured to the wall surface by an adhesive or by screws or other fasteners, in which embodiments the stepped perimeter 40 may be dispensed with if desired.

After the plate member has been mounted to the wall surface in the manner described, a layer of wallboard "mud" 46 is applied over the surface 36 of the plate member and the wall board tape 40, with the outer edges of the layer being feathered into the surface of the wall 16. The sloped surface 36 and stepped perimeter 40 cooperate with the wall board tape to form a continuous, sloped surface such that the mud layer 46 has a substantially uniform thickness over the surface of the plate, which in turn allows the installer to form a smooth, virtually imperceptible mound of mud with only a couple of quick swipes of a trowel. As the mud is being applied, the wall 44 provides an inner boundary, with the plastic (or other material) of the wall protecting the edge of the layer 46 from subsequent chipping or other damage over the life of the installation; the sloped outer surface 46 of the wall 44 that meets the surface 36 at an obtuse angle, provides the advantages of providing greater surface area (as opposed to a perpendicular wall) for adhesion/support of the mud or other fill material, while at the same time minimizing the size of the exposed edge that is visible in the completed installation. The surfaces of the plate member may also be provided with surface texturing to enhance adhesion of the fill material over the life of the installation.

Once the mud or other fill material is cured, the installation is complete and may be painted, covered with wallpaper, and so on. As is shown in FIG. 2, essentially all that can be seen (as distinct from the surrounding surface of the wall) is the operative portion 24 of the electrical component (i.e., the outlet surfaces in the example that is shown), and the thin upper edge of the wall 44. As compared with traditional installations using exposed cover plates, the visual impact of the installation is minimized and the finished appearance is greatly enhanced.

The wallboard "mud" described above is a relatively fluid, paste-like material that is well known to those skilled in the relevant art and that is very commonly used in interior finishing work, particularly when finishing sheetrock (gypsum board) walls. Wallboard tape is similarly ubiquitous in such work. As a result, installation of the plate member in accordance with the present invention requires no special materials, and uses only materials, tools and skills that the installer will already normally possess. It will be understood, though, that other types of fill materials may be used to form the layer over the plate member, such as other forms of paste and fluid materials that cure to form a surface matching that of the surrounding wall, or that paneling, wallpaper, or other wall surfacing may be placed over the top of the plate member rather than using a built-up layer of fill material. Similarly, other forms of tapes or securements may be used in place of the wall board tape that has been described.

Building codes in some jurisdictions require that the electrical component be accessible without disturbing the surface of the wall. FIG. 4 shows an installation that meets this requirement: As can be seen, rather than using a unitary plate member, this embodiment has a two-piece plate assembly 52 made up of an outer, fixed section 54 and an inner, removable section 56. The outer stationary member 54 corresponds to the plate member 30 described above, and likewise includes a flat back surface 58, sloped front surface 60 and stepped perimeter 62 that accommodates the wall board tape 64; the principal difference is that the wall 66 of the outer plate member does not adjoin the operative portion of the electrical component itself, but instead defines an opening sufficiently large that the inner perimeter projecting surrounds and does not extend inwardly over the edge 68 of a standard-sized cutout for the junction box 70, leaving a small step or shelf 72 on the surface of the wall uncovered around the edges of the opening.

The inner, removable plate member 56, in turn, is configured and sized to fit over the shelf 72 of the opening, to fill the gap between the fixed plate member 54 and the electrical component 74. The removable plate member includes a flat back surface 76 that corresponds to that of the fixed plate member, and a front surface 78 that corresponds to that of the fixed member and that is surrounded by outer and inner forwardly projecting walls 80, 82. As can be seen in FIG. 4, the outside distance between the two walls 80, 82 is slightly less than the distance between the inner edge of the fixed plate member 54 and the operation portion of the electrical component 74, consequently forming narrow gaps 84, 86 along the outer and inner edges of the removable plate member 56.

Figure 6B:
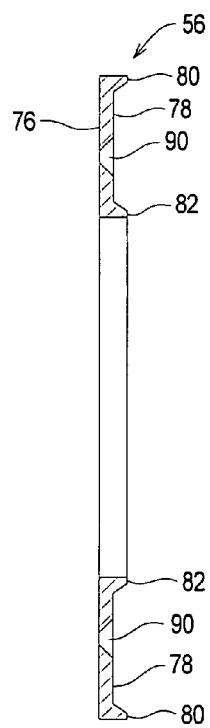
FIG. 6B is a cross-sectional view of the removable plate section of FIG. 6A.
Figure 6A:
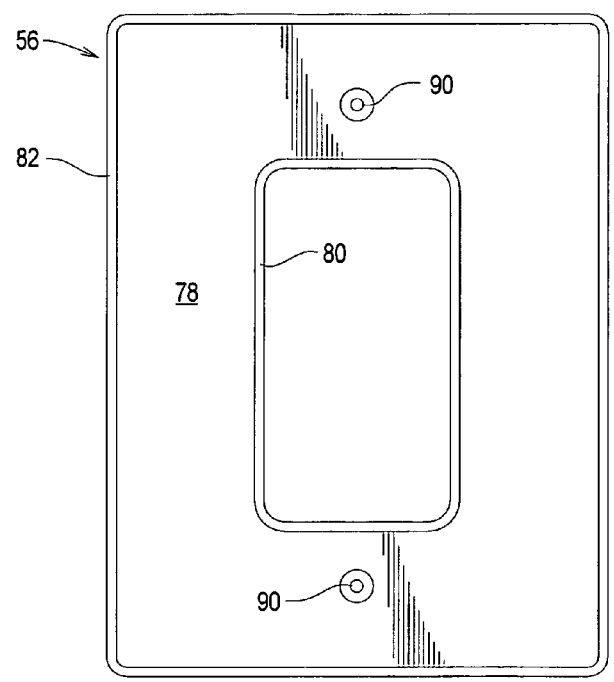
FIG. 6A is plan view of the removable section of the plate assembly of FIG. 5.

The depth of the fill area over the front surface 78 of the removable plate member 56 substantially matches that over the front surface of the fixed plate member 54. Screws 88 are passed through countersunk bores 90 (see FIGS. 6A-6B) in the removable plate member, and are received in cooperating threaded bores formed in flanges 94 that extend from the sides of the electrical component 74; the flanges may be formed as an integral portion of the electrical component, or may be formed on a separate piece or pieces that are mounted thereto. The electrical component is itself secured to the junction box by screws that pass through a second set of bores in the flanges 94, and that are received in cooperating threaded bores in flange portions 98 of the box 70.

Thus, when the screws are inserted and tightened, the removable plate member 56 is held in substantially coplanar relationship with fixed plate member 54, with its outer edge supported on the lip 72 of the cutout opening. Drywall mud or other fill material is then applied in substantially the same manner as described above, creating level fill areas 100, 102 over the tops with the two members. A knife or other implement is then run along the gaps 84, 86, to keep the removable plate member 56 free from both the stationary plate member 54 and the electrical component 74. When the installation is thus completed, as shown in FIG. 5, the operative portion 104 of the electrical component is again virtually the only thing visible, the presence of the removable plate member being betrayed only by the narrow slit-like gap 86 (which is virtually invisible when standing away from the wall).

At such time as it becomes necessary to remove/replace the electrical component 74 or access the interior 106 of the junction box, a small area of the fill layer 102 is chipped out to expose the screws 88, which are then loosened to permit removal of the inner plate member 56. A pry tool, such as knife or screwdriver, can be inserted into one of the other of the gaps 84, 86 to help free the plate member, if necessary. After the plate member 56 has been replaced, the spots over the screws can be repaired by applying a small amount of spackling compound or similar material.

FIGS. 7 and 8 show embodiments of the invention similar to that of FIGS. 4-6B, except that the removable plate member is secured by alternate means that are not visible in the finished installation, but that do not require chipping out or otherwise removing fill material when gaining access to the junction box/electrical component. Like reference numerals will be used in FIGS. 6-7 for like components as in FIG. 4.

FIG. 7 shows an installation 110 in which the removable plate member 112 is detachably mounted to the flanges 114 of the electrical component by pairs of magnets 116a, 118a and 116b, 118b; the plate member 112 can therefore easily be removed by inserting a knife or similar implement into one or the other of the slots 120, 122 at the edges of the plate member and exerting a prying force so as to separate the magnets. FIG. 8, in turn, shows an installation 130 in which the removable plate member 132 is secured to the underlying flanges 134 of the electrical component by cooperating strips 136a, 138a and 136b, 138b of hook-and-loop fastener material, e.g. VEL-CRO™; the strips of hook-and-loop material can likewise be separated by inserting a knife or other implement in gaps 140, 142 and exerting a prying force.

FIGS. 7 and 8 also show that the removable plate member may optionally be provided with a preformed front surface (e.g., molded of the same plastic or other material as the plate member itself), rather than having a channeled or recessed area for drywall mud or other fill material. While perhaps not as elegant as the completely filled-over installation that is shown in FIG. 4, this version is nevertheless significantly sleeker and less obtrusive than a traditional cover plate.

Figure 9:
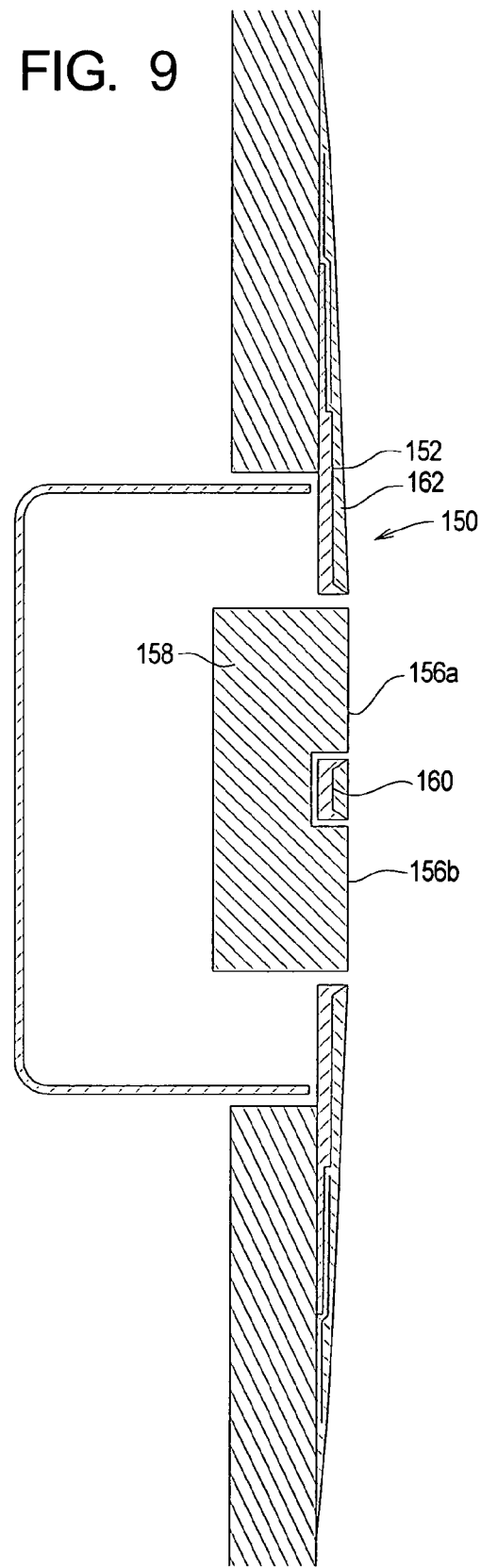
FIG. 9 is a cross-sectional view of an outlet box installation made using a plate assembly in accordance with another embodiment of the present invention, in which the mudded-over plate surrounds each of the outlet openings separately, so that they are exposed individually rather than grouped together in a single surface as in FIGS. 1-2.
Figure 10:
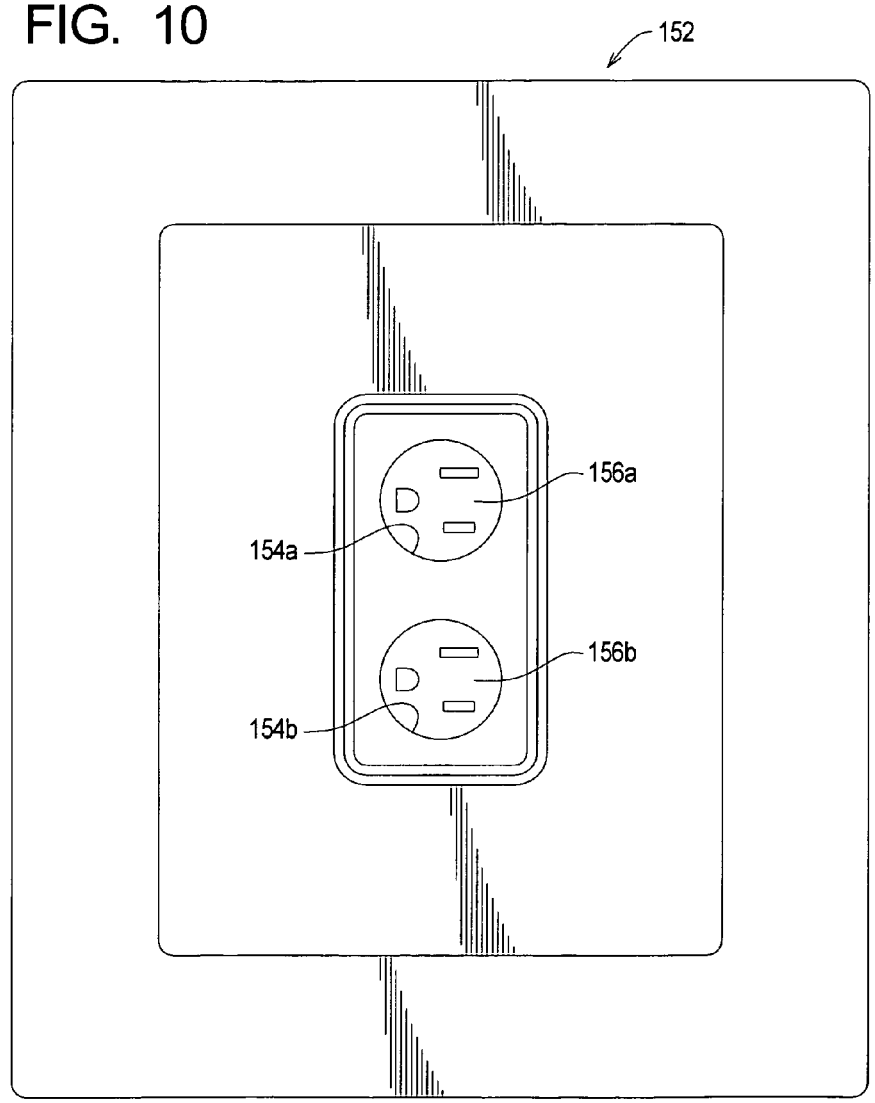
FIG. 10 is a elevational view of the plate assembly of FIG. 9, showing the manner in which the outlets are exposed individually at the openings therein.

FIGS. 9-12 show installations using plate assemblies having openings for electrical components that have round rather than rectangular operative surfaces. In particular, FIG. 9 shows an installation 150 using a plate member 152 having first and second circular openings for the round-faced outlets 156a, 156b of electrical component 158. The plate member includes a bridge portion 160 that extends between the two outlet faces, and that is filled with the same layer 162 of wallboard mud or other fill material as the rest of the plate member and surrounding area.

Figure 11:
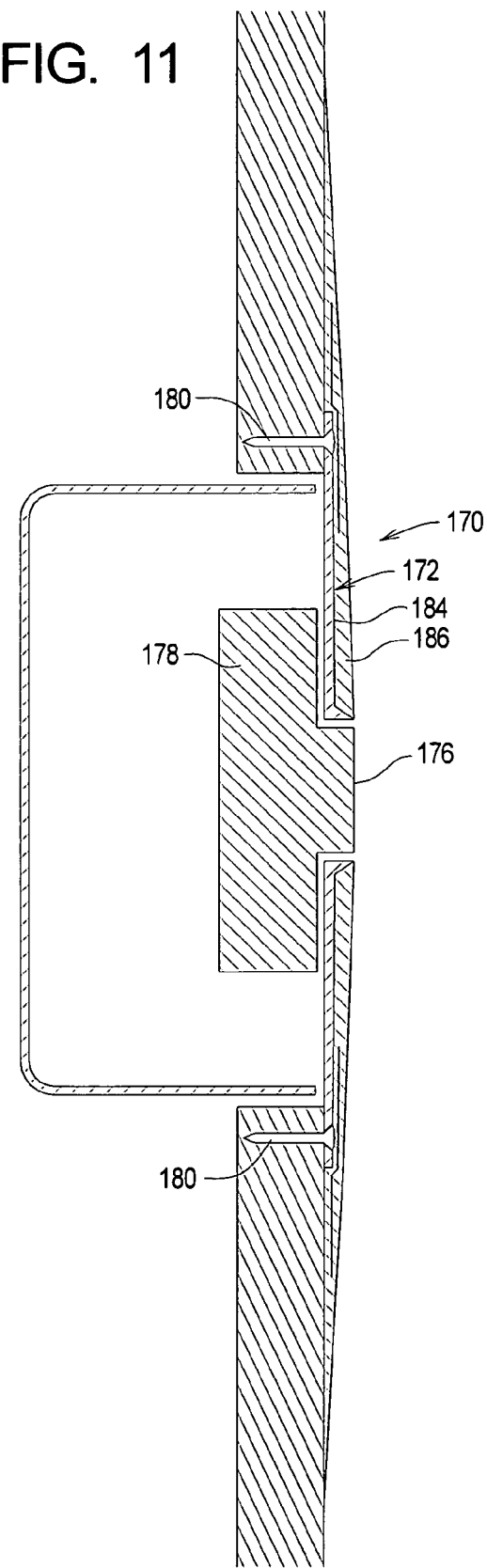
FIG. 11 is cross-sectional view, similar to FIG. 9, of a junction box installation made using a plate assembly in accordance with an embodiment that is similar to that in FIGS. 9-10, except that the plate assembly has a single opening for the electrical device rather than two.

FIG. 11, in turn, shows an installation 170 made using a plate member 172 having a single circular opening 174 (see FIG. 12) that surrounds the round operative surface 176 of the electrical component 178, e.g., a single electrical outlet or a pushbutton switch. The plate member 172 of FIGS. 11-12 also differs from those described above in being secured to the surrounding wall by screws 180 or similar fasteners that pass through cooperating openings 182 in the plate member and into the underlying material of wall. The use of screws rather than wallboard tape permits elimination of the stepped perimeter described above, although it may still be included if desired to permit alternate forms of mounting. The plate member 172 also illustrates an embodiment in which the upper surface of the plate member may be flat, rather than sloped/tapered as described above. This simplifies the construction of the plate member and also provides a thicker, potentially more durable buildup of fill material around the opening, although at the expense of possibly requiring additional and more careful forming/shaping of the fill layer 186.

FIGS. 13A-13G illustrates sequential steps in forming an installation using a plate assembly in accordance with the present invention. For clarity, certain surrounding structures and materials (e.g., wall studs) are not shown.

Figure 13A:
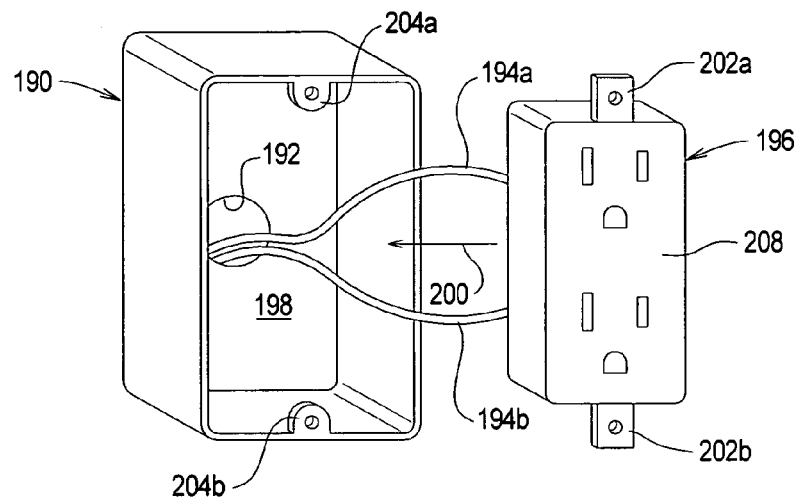
FIGS. 13A-G are sequential, perspective views, showing the steps in forming a junction box installation using a plate assembly in accordance with the method of the present invention.
Figure 13B:
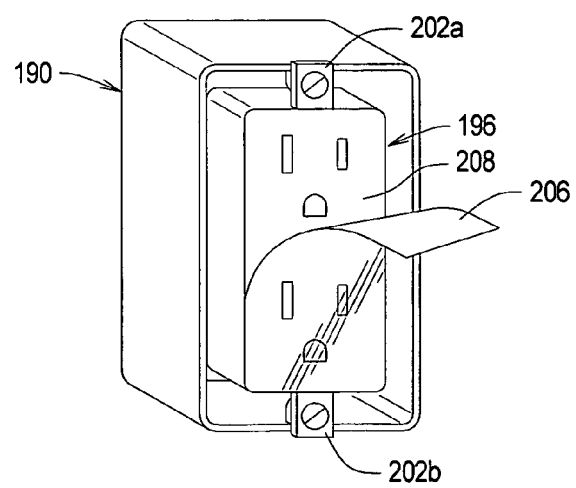

FIG. 13A shows an outlet box 190 having a knockout opening 192 in one of its walls, through which at least one set of wires 194a, 194b are pulled. The wires are connected to the electrical component 196 (in this example, a double electrical outlet) in a conventional fashion. The electrical component is then inserted into the open interior 198 of the outlet box, in the direction indicated by arrow 200, and secured in place by screws (not shown) that are passed through openings in flanges 202a, 202b on the electrical component and then into threaded bores 204a, 204b at the front of the outlet box. A piece of adhesive tape 206 or similar removable material is then placed over the operative surface 208, as shown in FIG. 13B; for ease of understanding, the tape strip 206 is shown as being transparent, however it will be understood that in many or most instances the material (e.g., masking tape) will be opaque.

Figure 13C:
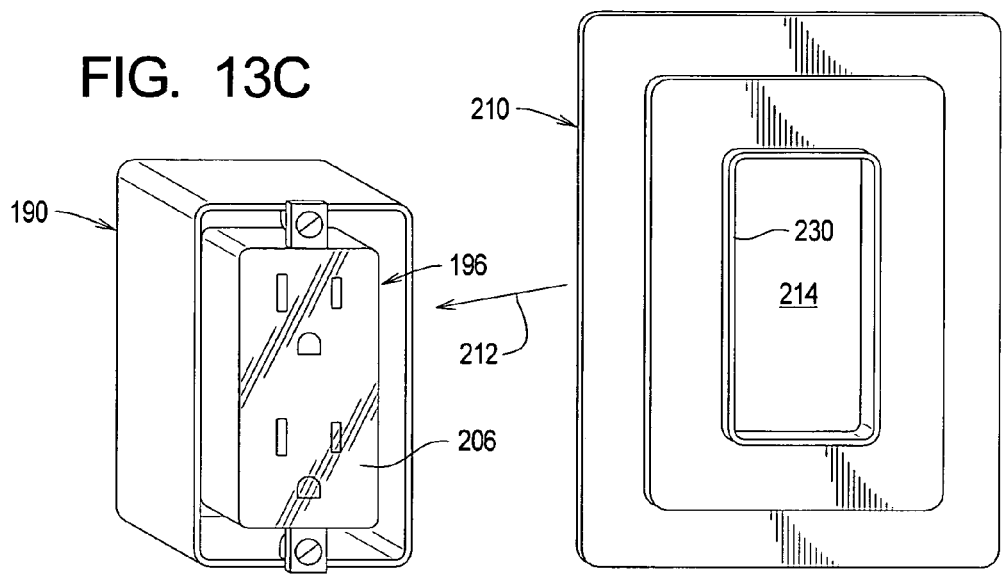
Figure 13D:
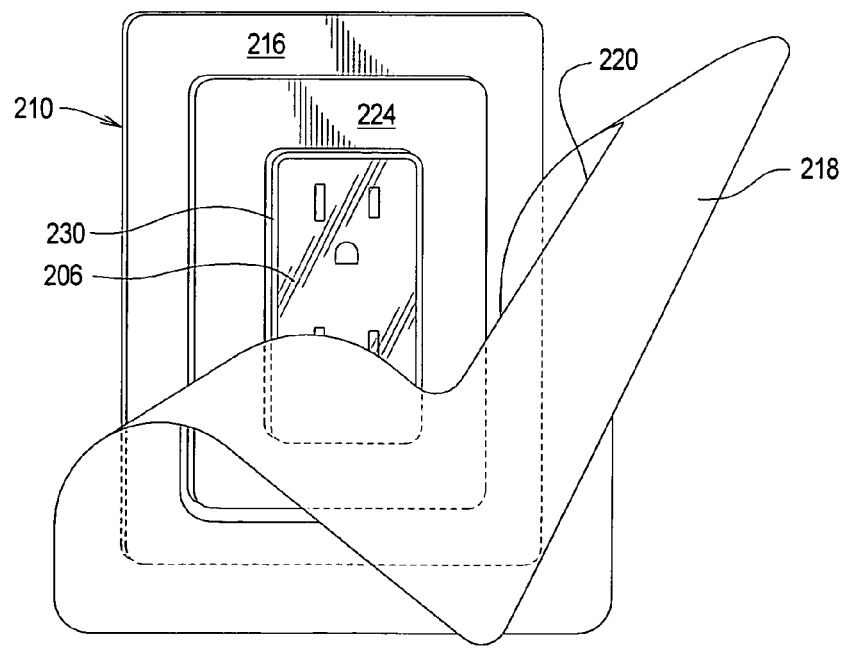
Figure 13E:
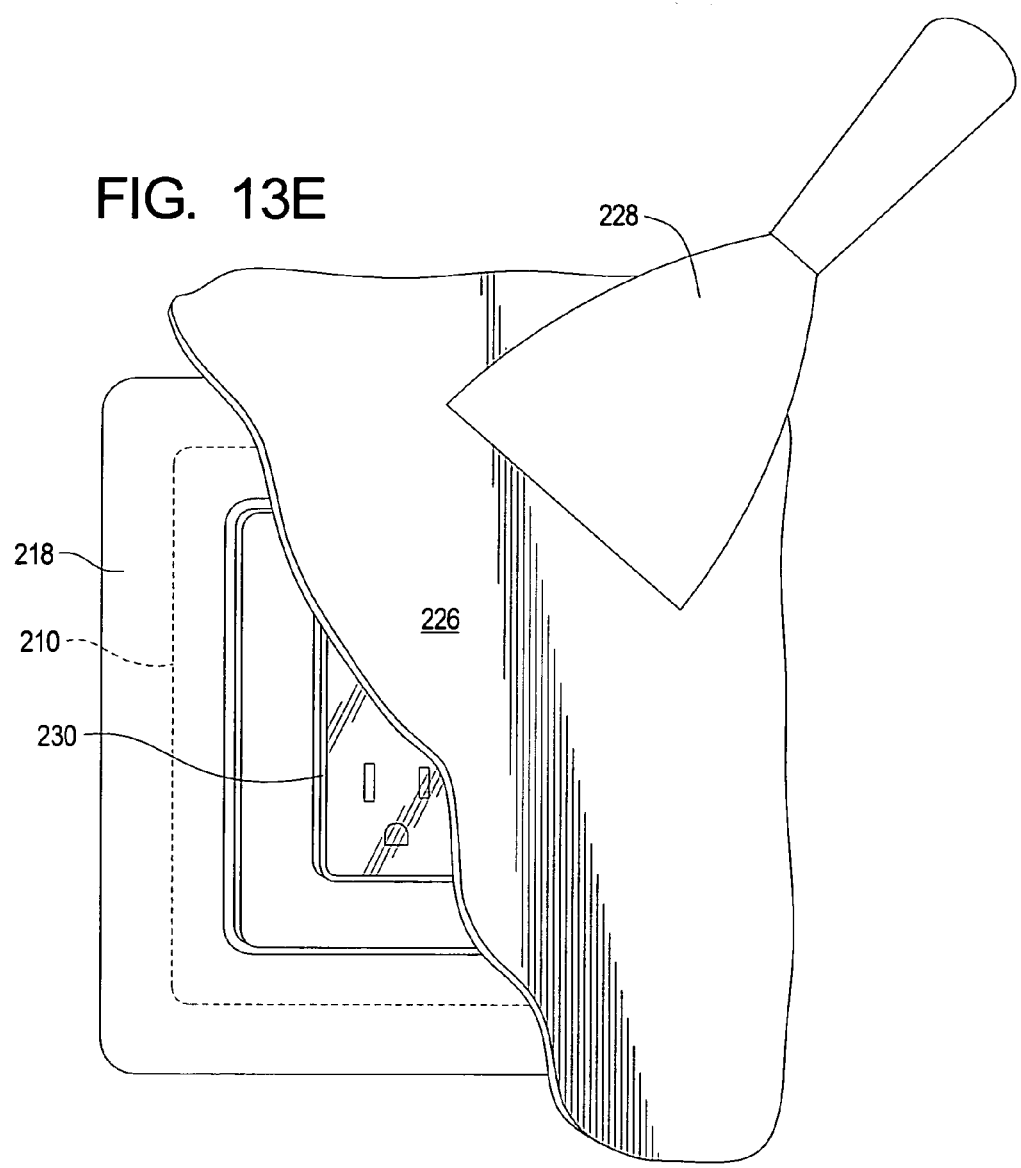

Next, the plate member 210 is placed over the front of the outlet box, in the direction indicated by arrow 212 in FIG. 13C, so that the back surface of the plate member rests flat against the surrounding wall surface (not shown) and the operative portion of the electrical component 196 is received within the correspondingly shaped opening 214 of the plate member. Wallboard tape is then laid over the stepped border 216 of the plate member so that it also extends outwardly over the surrounding wall surface, thus holding the plate member firmly in place. In the example shown in FIG. 13D, the wallboard tape (or similar adhesive sheet material) is formed as a single patch 218 with a central cutout opening 220 that is sized to fit around the main surface 224 of the plate member, which facilitates rapid and convenient mounting of the plate member; it will be understood, however, that a series of straight strips of tape (or similar material) may be laid over the border around the plate member, rather than using a unitary adhesive patch as shown.

Mounted as described, the plate member surrounds the operative face 206 of the electrical component and covers the opening of the outlet box. A layer of wallboard mud 226 or other fill material is then spread over the entire area, using a spatula 228 or other suitable finishing tool. The fill material is spread out beyond the edges of the tape 218 holding the plate member to the wall, and feathered into the wall surface, so that the fill layer will blend into the wall and its outer edges will not be discernable. The protruding wall 230 around the component opening cooperates with the blade of the spatula or other finishing tool to act as a depth guide when forming the layer, allowing the installer to apply/remove fill material so that the upper edge of the wall is only barely exposed, and also ensures an even lip all around the opening. The narrow exposed edge of the wall is subsequently painted over, and therefore invisible when the installation is finished.

Figure 13F:
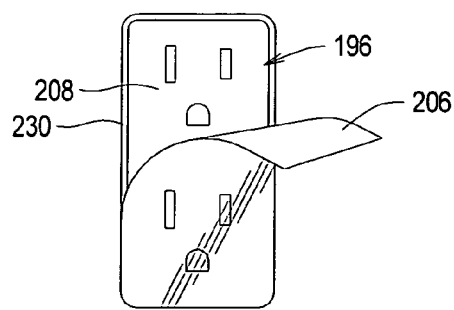

Depending on the consistency and other characteristics of the mud or other fill material, the material is allowed to partially or fully cure, and the strip of tape 206 is then removed to expose the operative surface 208 of the electrical component 196, as shown in FIG. 13F. In so doing, the exposed edge of the wall 230 provides the installer with a visual reference, so that a knife or other tool can be used to help peel up the strip 206 without damaging the surrounding layer of fill material.

Figure 13G:
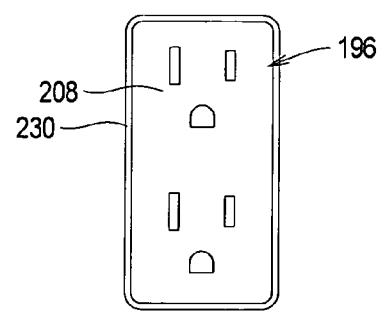
Figure 16A:
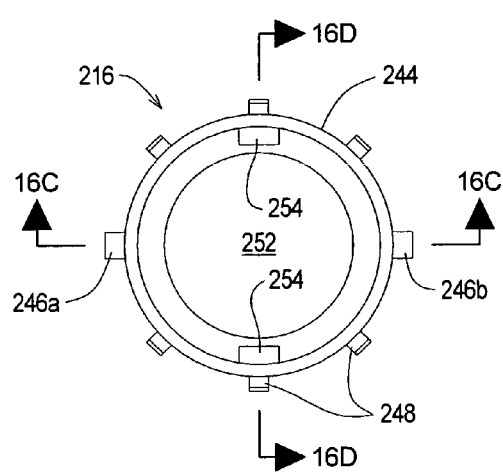
FIG. 16A is a plan view of the receptacle member of the cover plate assembly of FIG. 14.
Figure 16B:
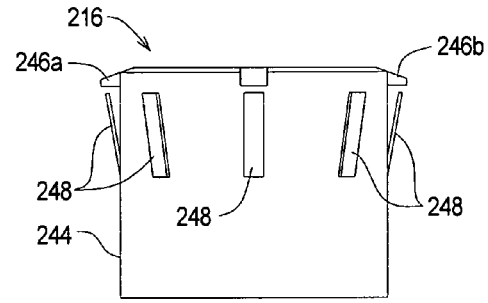
FIG. 16B is an elevational view of the receptacle member of FIG. 16A, showing the projecting alignment tabs and locking figures on the exterior thereof.
Figure 16C:
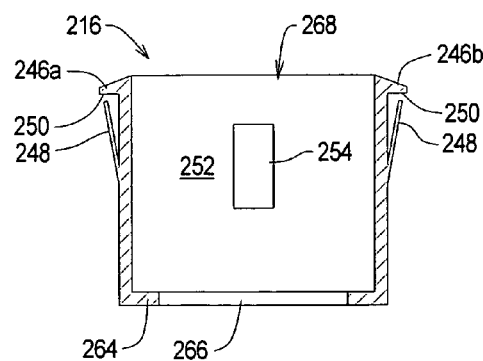
FIG. 16C is a first cross-sectional view of the receptacle member of FIG. 16A, taken along line 16C in FIG. 16A, showing the external and internal alignment tabs of the receptacle member in greater detail.
Figure 16D:
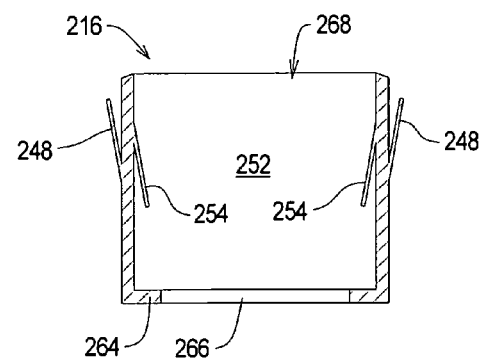
FIG. 16D is a second cross-sectional view of the receptacle member of FIG. 16A, taken along line 16D in FIG. 16A, showing the configuration of the external and internal locking features thereof in greater detail.

With the installation thus completed, only the operative surface 208 of the electrical component and the thin, exposed edge of the wall 230 are visibly distinguishable from the surrounding wall surface (for ease of understanding the latter is shown somewhat larger than normal in FIG. 13G).

As discussed above, building codes frequently require that it be possible to remove the electrical component without breaking the surface of the wall. Rather than the assembly using fixed and removable plate members as previously described, the installation 210 in FIG. 14 meets this requirement by employing an assembly 212 in which there is a single, fixed plate member 214 and a receptacle member 216 mounted to the plate member that receives a specially configured electrical component 218 in a "plug-in" fashion; given that the electrical component is specially configured, this embodiment is particularly suited to new construction, whereas the embodiments described above are generally more suited to retrofit applications.

In the installation 212, the front side of the plate member 215 is generally similar to that described above, having a sloped surface 220 and stepped perimeter surface 222 that accommodates the wallboard tape 224; likewise, the back face of the plate member 214 includes a flat surface 226 that extends out over the opening and surrounding surface of the wall 228. Similarly, the interior 236 of the outlet box encloses the inwardly protruding ends of the receptacle member 216 and electrical component 218, as well as the wiring 238 that is connected to the latter.

However, as can be seen in FIGS. 15A-15B, the opening 240 in the plate member 214, rather than bordering directly on the electrical component itself, receives the receptacle member 216 in which the electrical component is in turn mounted. As can be seen in FIG. 15A, the opening 240 is preferably circular, with alignment notches 242a-d being formed in its perimeter. The receptacle member (see FIGS. 16A-16D), in turn, includes a cooperatingly-shaped, generally cylindrical body 244 that is sized to pass through and fit closely within the opening 240 of the plate member, with alignment tabs 246a, 246b that are received within the alignment notches about the perimeter of the opening; the cooperating tabs and notches thus allow the receptacle member to be installed in the plate member at 90° increments of rotation, so as to be able to mount the associated electrical component in a vertical or horizontal orientation as desired.

The outside of the receptacle member also includes a plurality of flexible, outwardly biased finger members 248, that extend upwardly and outwardly from the cylindrical exterior of the body 244. As can be seen in FIG. 14, the fingers 248 form a spring-type connection between the receptacle member and the plate member 214: As the receptacle member is pressed into the opening 240 of the plate member, the locking fingers 248 deflect resiliently to pass through the opening. An undercut 250 on the locking tabs eventually abuts a lip 252 at the bottoms of the alignment notches, at which point the resilient fingers 248 spring back out to a position in which their ends engage the back surface 226 of the plate member, thereby locking the receptacle member firmly in place. The receptacle member can therefore be easily and quickly installed by simply inserting it into the plate opening 240 and pressing it home; it will be understood, however, that other forms of mounting and locking mechanisms may also be used.

Figure 17A:
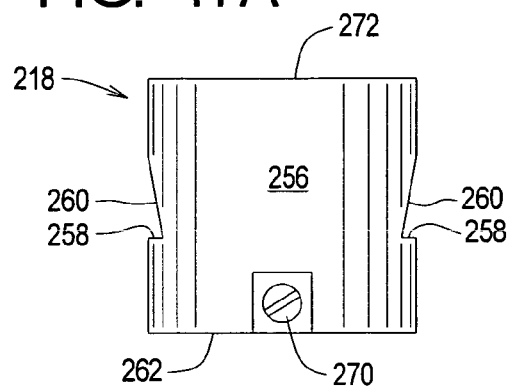
FIG. 17A is an elevational view of a cooperatingly shaped electrical component that is received in the receptacle member of the cover plate assembly of FIG. 14A.
Figure 17B:
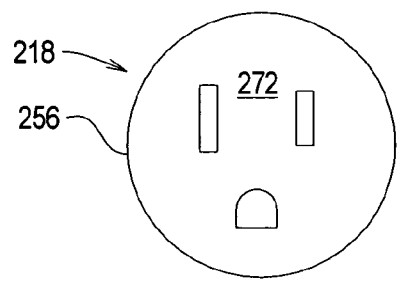
FIG. 17B is a top plan view of the electrical component of FIG. 17A.
Figure 17C:
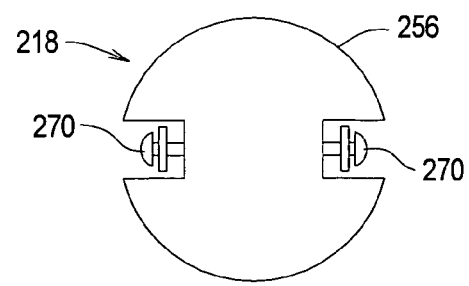
FIG. 17C is a bottom plan view of the electrical component of FIGS. 17A-B.

The hollow interior 252 of the receptacle member includes additional resiliently flexible locking fingers 254, that extend outwardly and inwardly from the inner surface of the wall of the cylindrical body 244. The electrical component 218 (see FIGS. 17A-17C) is specially configured and has a cylindrical body 256 with cooperating locking notches 258 and angled recesses 260 to accommodate the locking fingers 254 when in their outwardly extended configuration. Thus, when the electrical component is pressed fully into the receptacle member the fingers 254 spring out to engage the notches 258 so as to prevent the electrical component from being withdrawn, while at the same time the end 262 of the body contacts an angular flange 264 about the bottom of the receptacle member to prevent further travel in an inward direction.

Thus, to install the electrical component, the wires are led through the back and front openings 266, 268 and attached to screw contacts 270 or other connections on the electrical component. The electrical component is then placed in opening 268 and pressed home until the snap connection locks in place, with only the operative face 272 of the component being exposed. Inasmuch as the front of the plate is covered with the layer of drywall mud 274 or other fill material, the operative surface of the electrical component is therefore again essentially the only part that will be visible when the installation is finished.

When it is desired to remove the electrical component from the installation (e.g., for replacement or repair), the cylindrical sleeve of a removal tool (not shown) is inserted into the small annular gap 274 between the electrical component and the socket member 216, and pressed inwardly along the sides of the component. As this is done, the leading edge of the cylindrical sleeve glides over the fingers 254 and presses them out of engagement with the locking notches 258; a compression spring may optionally be provided, between the body of the electrical component and the bottom of the receptacle, so that the component "pops" out of the receptacle as the fingers are disengaged. The electrical component can then be withdrawn from the receptacle 216, together with the cylindrical sleeve of the removal tool.

Exemplary dimensions for the embodiment shown in FIGS. 14-17C are set forth in the following Table B:

TABLE B

| | |
|---|---|
| Plate Overall Length | 208.50 mm |
| Plate Overall Width | 156.00 mm |
| Width of Steeped Border | 25.00 mm |
| Thickness of Stepped Border | 0.50 mm |
| Thickness and Outer Edge of Sloped Surface | 1.00 mm |
| Thickness of Inner Edge of Sloped Surface | 1.50 mm |
| Thickness at Inside Wall | 2.00 mm |
| Diameter of Center Opening (exclusive of lip) | 42.25 mm |
| Outside Diameter of Receptacle (exclusive of locking fingers) | 40.50 mm |
| Inside Diameter of Receptacle (exclusive of locking fingers) | 36.50 mm |
| Inside Depth of Receptacle | 33.53 mm |
| Diameter of Electrical Component | 35.00 mm |
| Depth of Electrical Component | 33.50 mm |

Again, it will be understood that any forgoing dimensions are provided by way of illustrating a preferred embodiment of the present invention, and may vary in other embodiments depending on the range of design factors.

The illustrated embodiment thus provides a highly convenient and inexpensive means for removably mounting an electrical component within a receptacle member, however, it will be understood that other forms of locking and mounting mechanisms may be used. Moreover, it will be understood that, in addition to the electrical outlet that is shown, other forms of electrical components (e.g., switches, lights, light fixtures and so on) may be similarly configured with interchangeable mounting in the receptacle member. Also, in some embodiments the receptacle member may be formed integrally with the plate member. Moreover, the assembly may be configured for installation of multiple electrical components rather than a single component as shown.

FIGS. 18-25D illustrate examples of these other mechanisms and components, as well as additional forms of plate assemblies.

FIG. 18 shows an installation 280 having a plate member 282 in which a receptacle member 184 is mounted, not by external locking fingers but instead by threaded engagement with the opening 286. The exterior 288 of the receptacle body is consequently provided with threads 290 that extend over at least a portion of the length thereof. As can be seen in FIG. 18, a locking ring or nut 292 engages the threaded length of the body, while the threads terminate at the forward end of the body at the back surface 294 of the annular shoulder or flange 296 about the opening 298 for the component 300. The annular shoulder 296 corresponds to the wall portions that extend about the openings in the plate members described above, and preferably also has a sloped outer surface as shown, while the upper lip 302 of the shoulder likewise corresponds to the lip of the wall portions described above.

The threaded engagement between the receptacle member 284 and the plate member 282 allows the distance by which the lip 302 of the receptacle projects from the front surface of the plate member to be selectively adjusted, so as to accommodate variations in the depth by which the outlet box is set within the wall. The adjustment is accomplished by loosening the locking ring 292 and rotating the receptacle member 284 relative to the plate member so as to move the annular shoulder 296 towards or away from the front of the plate member, until the lip 302 is positioned so that it will lie flush with (or slightly proud of) the front surface 304 of the wall 306, at which point the locking ring is tightened against the back of the plate member. The wires (not shown) are drawn through the bottom opening 316 of the receptacle and connected to the terminals of the component 300, which is then inserted into the receptacle member through its front opening 302 so that it becomes locked in place by resilient fingers 318, in the manner described above. The plate member is then mounted to the threaded flanges or ears of the junction box 308, using screws 310 or other suitable fasteners, so that the inward end 312 of the receptacle member is received within the interior 314 of the outlet box.

FIG. 18 also illustrates an embodiment in which the perimeter of the plate member 282 does not extend out over the surface 304 of the wall, but is instead set within the edges 318 of the wall opening, preferably lying substantially flush with the surface 304 of the wall; the desired height of the plate member (i.e., flush with the wall surface) can be obtained by recessing the front edge of the junction box into the wall by a distance that is approximately equal to the thickness of the plate member itself, e.g., by measuring or using a spacer/depth gauge during installation of the outlet box. The gaps 320 between the edges of the plate member and the wall opening are then covered with wallboard tape 322, with a layer of mud 324 or other fill material being subsequently applied over the tape and the plate member and wall in the manner described above; also similar to the procedure described above, the inside edge of the fill layer is formed at the lip 302 of the wall around the component opening, while the outside edges are feathered into the wall surface 304.

In FIG. 19, in which like references numerals are used to refer to like elements, there is shown an installation 330 that is generally similar to the installation of FIG. 18, but in which the plate member 332 has a thin flange or flanges 334 formed about its perimeter that bridges the gaps 320 at the wall opening. As can be seen, the flange portions 334 are set in a plane that is somewhat forward of that of the main face 336, so that the layer 338 of mud or other fill material can be applied over the latter to a thickness that provides good strength and durability around the opening for the component; the flanges 334 are relatively narrow by comparison to the breadth of the main plate face 336, so that the relatively thin layer of fill material that is applied there over is bolstered by the thicker material immediately inside and outside of the flanges.

It will be understood that the plate configurations shown in FIGS. 18 and 19 may be used with other embodiments of the invention (such as those shown in FIGS. 1-14), and not only with the screw-in type receptacle members.

Figure 20A:
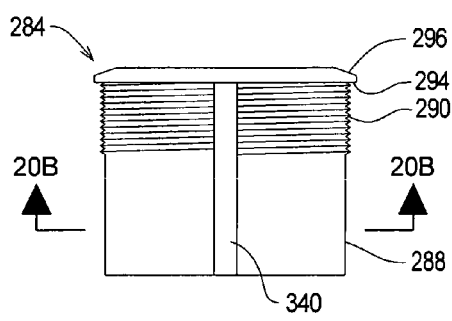
FIG. 20A is an elevational view of the threaded receptacle member of the installations of FIGS. 18 and 19, showing the configuration thereof in greater detail.
Figure 20B:
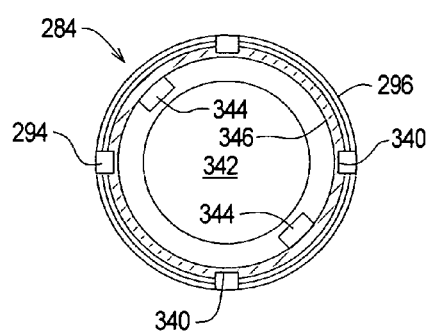
FIG. 20B is a cross-sectional view of the threaded receptacle member of FIG. 20A, taken along line 20B in FIG. 20A.
Figure 20C:
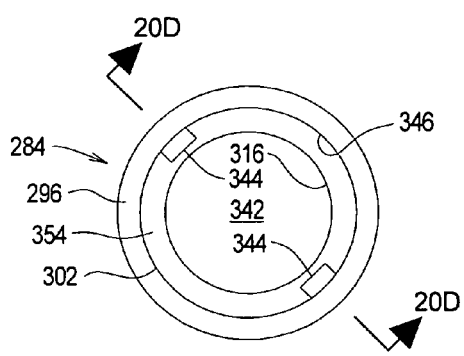
FIG. 20C is a plan view of the receptacle member of FIGS. 20A-20B.
Figure 20D:
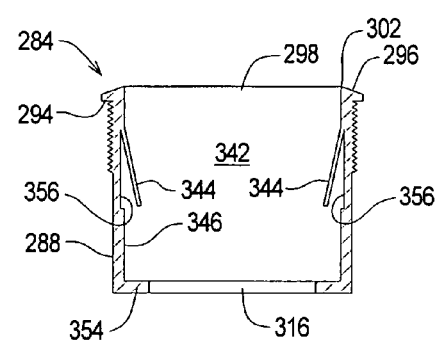
FIG. 20D is a cross-sectional view of the receptacle member of FIGS. 20A-20C, taken along line 20D in FIG. 20C.

FIGS. 20A-20D show the configuration of the threaded receptacle member of FIGS. 18-19 in greater detail. As noted above, and as is shown in FIG. 20A, the threads 290 extend over the forward portion of the cylindrical exterior 288 of the receptacle member 284; the threads may extend any desired length over the body of the receptacle member, however it is anticipated that a range of travel of about ¼-½ inch, allowing for the locking ring/nut, will suffice for the majority of installations. The annular shoulder 296 is formed at the forward (front) end of the cylindrical body, with the threads 290 preferably extending all the way thereto so that the back surface 294 of the shoulder can be tightened directly against the front surface of the plate member if desired. The threads may optionally be interrupted by longitudinal channels or cutouts 340, to accommodate the tabs of a locking washer (not shown) that is slipped over the threads, or other alignment or locking features, if desired. As can be seen in FIGS. 20B-D, the receptacle member 284 has a hollow interior 342 for receiving the electrical component, in a manner similar to that described above, and likewise includes resilient locking fingers 344 that likewise extend downwardly and inwardly from the inner surface 346 of the receptacle to engage cooperating notches on the electrical component that is installed therein.

Figure 21A:
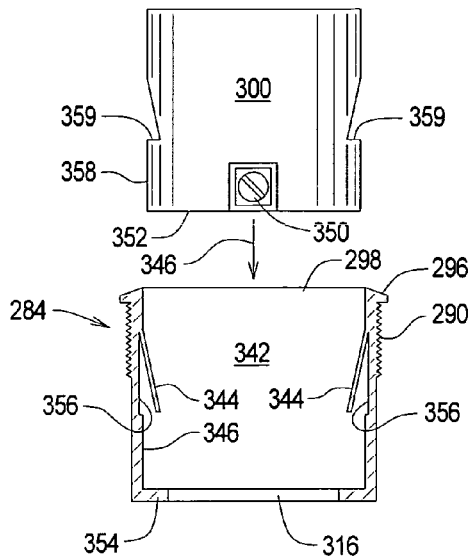
FIGS. 21A-21B are cross-sectional views showing the steps of installing an electrical component within the receptacle member of FIGS. 20A-20D.
Figure 21B:
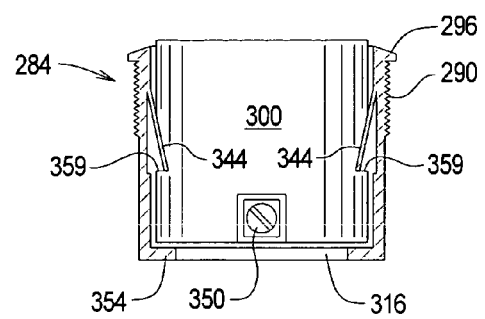

FIGS. 21A-B show the sequential steps of installing the electrical component 300 in the receptacle member 284, while FIGS. 22A-D show the steps involved in removing the component from the receptacle member. Since these are similar to the steps for installation/removal from the receptacle described above, they will only be recapped here.

As can be seen in FIG. 21A, the electrical component 300 is inserted into the interior 342 of the receptacle member 284 in the direction indicated by arrow 346, via opening 298, the wires (not shown) having previously been pulled through the bottom opening 316 of the receptacle and attached to the contacts 350 of the component. The component is pressed home until its bottom end 352 contacts the flange 354 about the bottom opening 316, thus arresting movement into the receptacle member. At this point, the resilient locking fingers, having been deflected into recesses 356 in wall 346 in order to allow the lower end portion 358 of the component to pass there over, snap back out and engage the cooperating locking notches 359 so as to hold the component against being withdrawn. The component is thus locked firmly in the receptacle member, as shown in FIG. 21B.

Figure 22A:
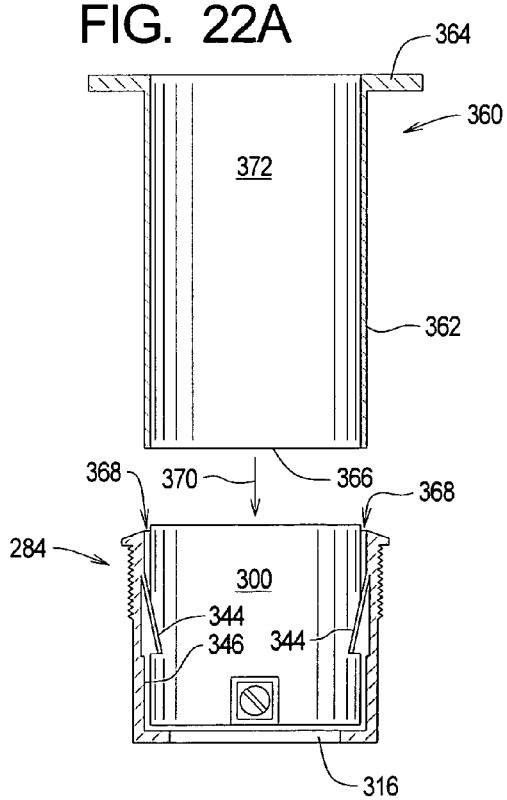
FIGS. 22A-22D are cross-sectional views showing the steps in removing an electrical component from the receptacle member of FIGS. 20A-20D.

FIGS. 22A-D, in turn, show the steps in removing the component from the receptacle member, using a removal tool 360 in a manner similar to that described above. As can be seen in FIG. 22A, the main body of the removal tool is formed by a cylindrical, thin-walled sleeve 362, with a flange 364 being mounted at one end of the flange to provide a finger grip for the user.

To remove the electrical component 300 from the socket 284, the thin, circular working edge 366 of the tool is inserted into the narrow annular gap 368 between the inner wall 346 of the receptacle and the electrical component 300, in the direction indicated by arrow 370. As this is done, the generally cylindrical body of the electrical component enters and is received within the cooperating hollow interior 372 of the removal tool.

Figure 22B:
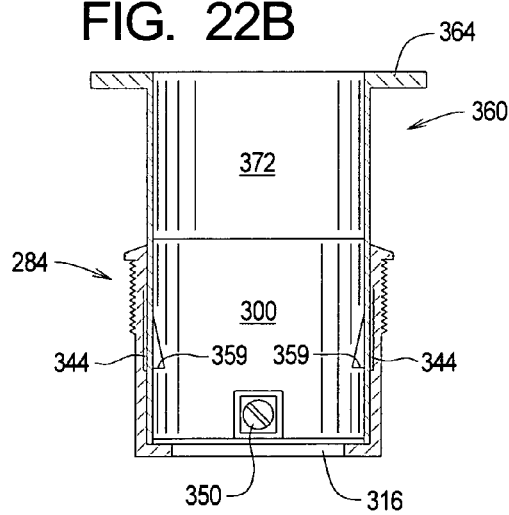
Figure 22C:
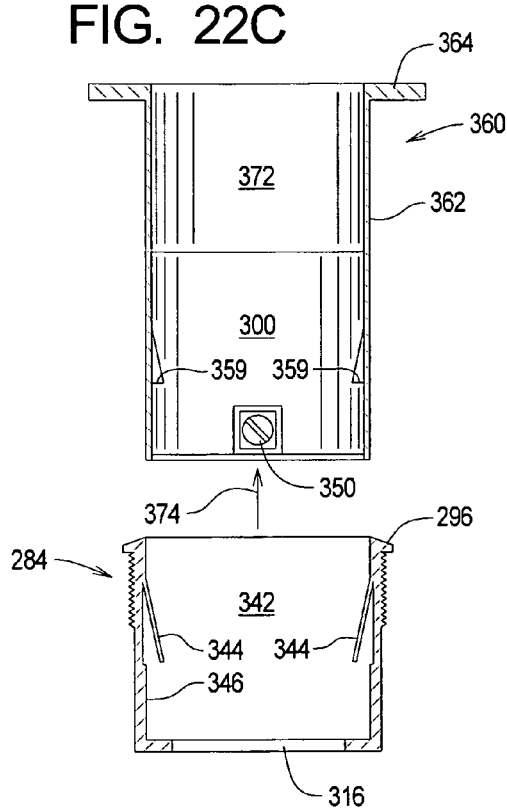
Figure 22D:
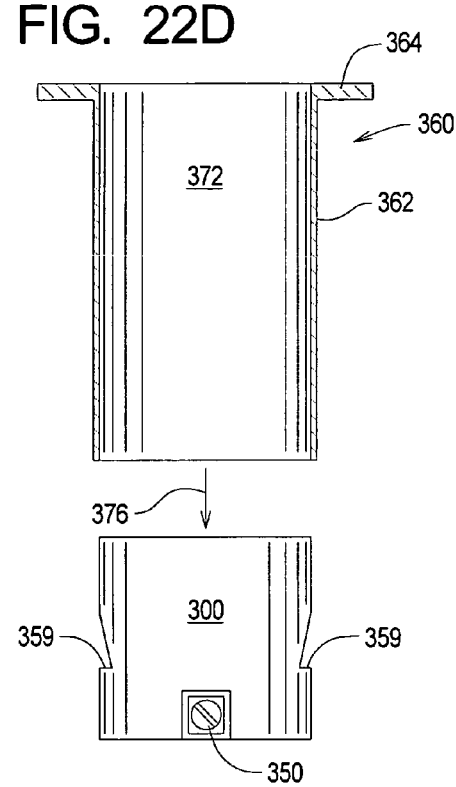

As the edge 362 at the end of the removal tool passes over the resilient locking fingers 344, the fingers are deflected outwardly and into recesses 356, disengaging them from the locking notches 360 in the electrical component as shown in FIG. 22B. The tool is then withdrawn from the receptacle, together with the electrical component that is carried in the interior 372 of the sleeve, in the direction indicated by arrow 374 in FIG. 22C, the exterior of the sleeve keeping the locking fingers pressed into their recesses as this is done. The electrical component is then removed from within the tool itself, in the direction indicated by arrow 376 in FIG. 22D, by pulling on the attached wires (not shown) or by pressing with a tool inserted through the opening 278 at the opposite end of the sleeve.

Removal of the electrical component can therefore be accomplished very quickly and conveniently, without in any way disturbing the finish of the wall.

Figure 23A:
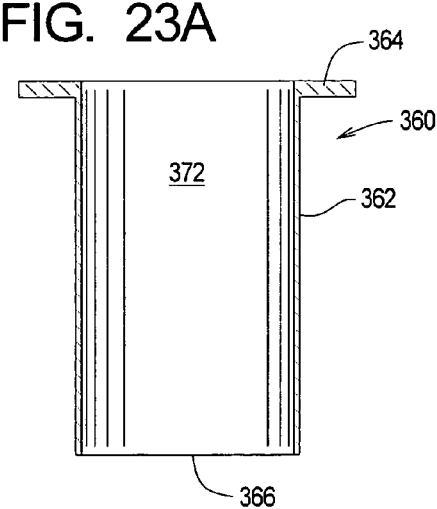
FIGS. 23A-23B are cross-sectional and plan views of the removal tool used in the steps shown in FIGS. 22A-22D.
Figure 23B:
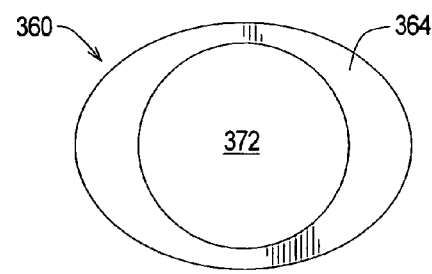

FIGS. 23A-B shows the removal tool in greater detail. The flange 364 has an oval shape in the embodiment that is illustrated, however, it will be understood that any suitable shape may be used. Moreover, the interior 372 of the sleeve 362 may be sized to form a slight interference fit with the body of the electrical component, or may be provided with a rubberized or similar surface for forming a frictional engagement with the body of the component, to establish a grip that aids in withdrawing the electrical component from the receptacle member.

As noted above, the electrical components that are installable in the receptacle members may be of many different types, two of which are illustrated in FIGS. 24A-D and FIGS. 25A-D. In particular, FIGS. 24A-D show a dimmer switch 380 having a generally cylindrical body 382 that is mountable in a receptacle member in the manner described above. The upper (front) end of the dimmer switch is provided with a rotatable knob 384 that, in this example, can be configured to pop out from the wall when pressed, so that it can be rotated to adjust the lights, after which the knob can be pressed back into a recessed position with its outer surface lies flush with the surrounding wall. The lower portion 386 of the switch, in turn, includes screw contacts 388 (or similar connections) that extend towards the sides, leaving the bottom end 390 of the switch body clear to contact the bottom wall of the receptacle member in the manner described above.

Figure 24A:
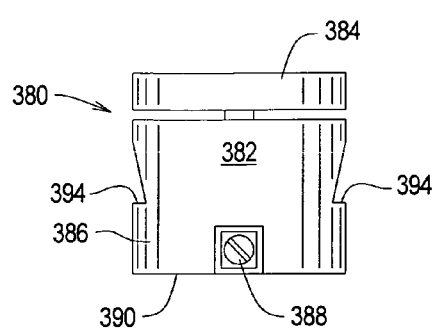
FIG. 24A is an elevational view of a first electrical component that is mountable in the receptacle member of FIGS. 20A-20D, in the form of a dimmer switch having a rotatable knob at its outer end.
Figure 24B:
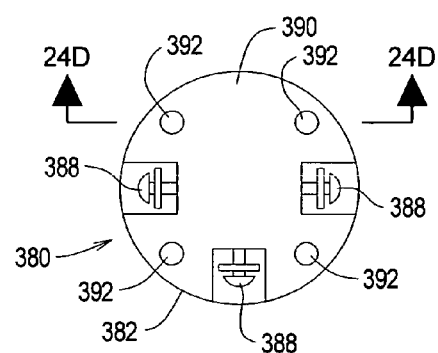
FIG. 24B is a bottom plan view of the dimmer switch of FIG. 24A.
Figure 24C:
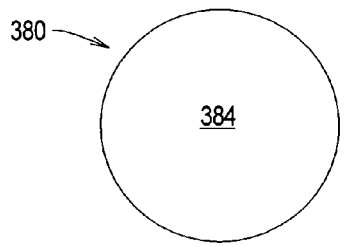
FIG. 24C is a top plan view of the dimmer switch of FIGS. 24A-24B.
Figure 24D:
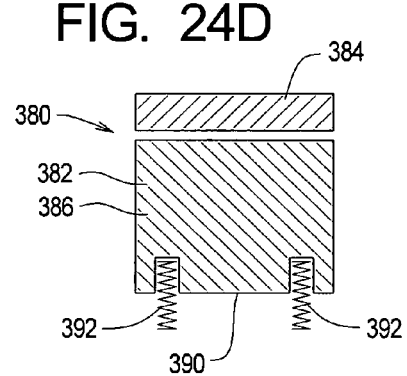
FIG. 24D is a cross-sectional view of the dimmer switch of FIGS. 24A-24C, taken along line 24D in FIG. 24B.
Figure 25A:
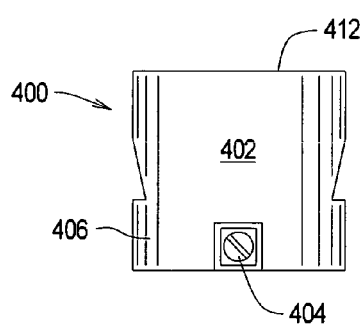
FIG. 25A is an elevational view of a second electrical component that is mountable in the receptacle member of FIGS. 20A-20D interchangeably with the electrical component of FIGS. 24A-24D, in the form of a grounded electrical outlet.
Figure 25B:
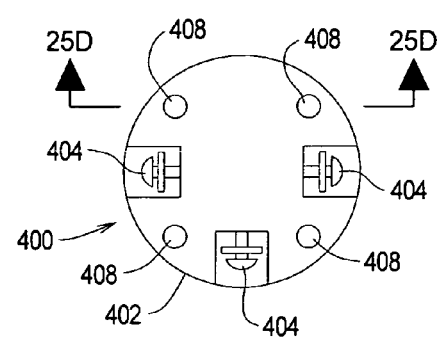
FIG. 25B is a bottom plan view of the grounded electrical outlet of FIG. 25A.
Figure 25C:
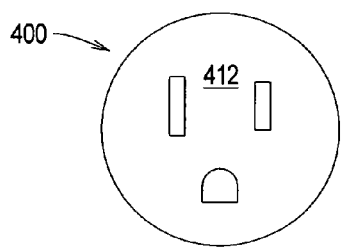
FIG. 25C is a top plan view of the grounded electrical outlet of FIGS. 25A-25B.
Figure 25D:
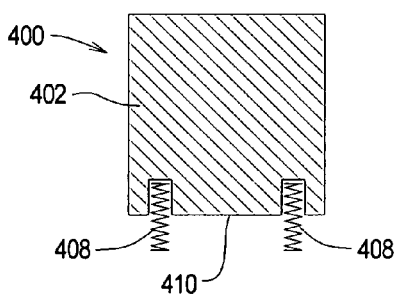
FIG. 25D is a cross-sectional view of the grounded electrical outlet of FIGS. 25A-25C, taken along line 25D in FIG. 25B.

Coil springs 392 are in turn mounted within recesses in the bottom 390 of the component, so that their lower ends extend downwardly there from when in an uncompressed configuration, as shown in FIG. 24D. As is shown in FIG. 24B, the springs 392 are located near the circular perimeter of the bottom surface 390, so that they will contact the annular surface 354 at the bottom of the receptacle member and be compressed as the component is inserted into the receptacle. Then, when the removal tool is inserted to disengage the locking fingers from notches 394 in the manner described above, the springs "pop" the component up from the bottom of the receptacle and into the interior of the tool, thus facilitating removal.

FIGS. 25A-25D, in turn, show another example of electrical component that can be mounted in the receptacle members, interchangeably with the dimmer switch and other similarly configured components, in this case a grounded electrical outlet 400. The outlet similarly includes a generally cylindrical body 402, electrical connections 404, a lower portion 406, and springs 408 set within and from its lower end 410. The difference between the two components lies only in their operative portions, the outlet 400 having a flush, stationary outlet surface 412 with plug openings, in place of the rotatable knob of the dimmer switch.

As noted above, many other components may be similarly configured for mounting in the receptacle members, including volume controls, cable jacks, telephone jacks, speaker outlets, pendant light connections, and lights and light fixtures, to give just a few examples.

Although the assemblies described above have the electrical component located centrally, this is not necessarily the case, and the "plug-in" embodiment described in the preceding section in particular provides an ability to locate single or multiple electrical components at various, offset positions within the plate assembly, and therefore in the finished installation. Moreover, by changing the orientation of the plate assembly or assemblies, a large number of variations in positioning can be achieved using a relatively small number of components.

Figure 26A:
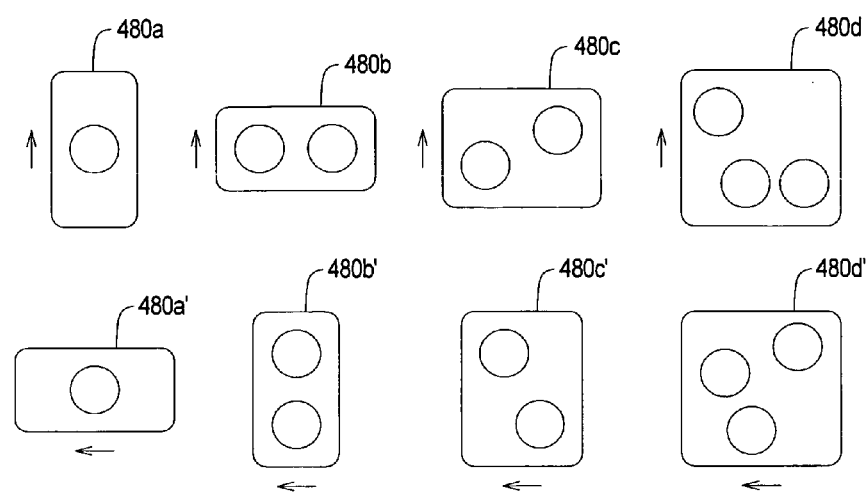
FIG. 26A is a plan view of multiple plate assemblies, similar to that shown in FIG. 14 but having one or multiple receptacles for offset locations, showing the manner in which these can be oriented in different directions to create varying appearances.

For example, FIG. 26A shows four cover plate assemblies 480a-d having receptacles for components positioned at differing, offset (as opposed to central) locations. The top row shows the assemblies in a first orientation, while the lower row shows the plates rotated at 90°, with the initial orientation being indicated by the associated arrows. A comparison of the top row of images 480a-d with the lower row of images 480a'-d' shows the very different appearance that can be presented by the same plate assembly, when simply turned from one orientation to another.

Figure 26B:
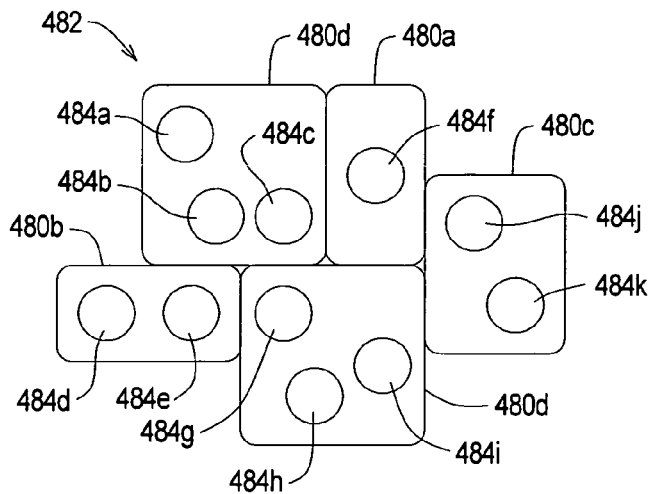
FIG. 26B is an elevational view of a plurality of the plate assemblies of FIG. 26A mounted together so that the operative portions of the electrical components are displayed in an apparently random pattern.
Figure 26C:
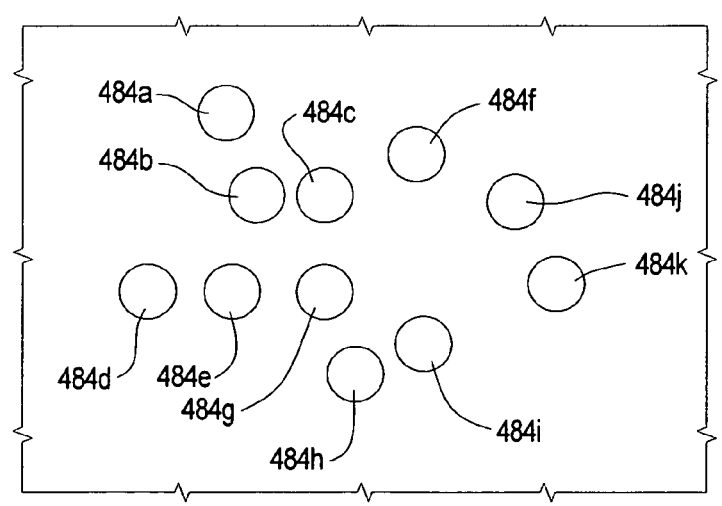
FIG. 26C is an elevational view of the finished installation using the plate assemblies of FIG. 26B, showing the pattern in which the operative portions of the components appear at the surface of the wall.

The assemblies having offset receptacles may be used individually to form installations that are more visually interesting than when using centered components. Furthermore, as is shown in FIG. 26B, several of the assemblies can be mounted together to construct a visually striking grouping 482. As can be seen, the grouping is formed using plate members having only the four configurations 480a-d that are shown in FIG. 26A. Nevertheless, when the installations are finished, the operative surfaces 484a-k appear to be distributed in a virtually random manner, creating visual interest and avoiding a rigid or structured appearance. The visual interest can be heightened by using different colors for the exposed surfaces, which can also be used to distinguish between the components and/or their functions (e.g., to distinguish between different switches or other controls). Moreover, the components may be lighted so that an illuminated pattern appears on the wall when the room is darkened. It will also be understood that the plate assemblies with offset component can be used to create structured patterns or images, and not just random-appearing patterns as described above.

Figure 27:
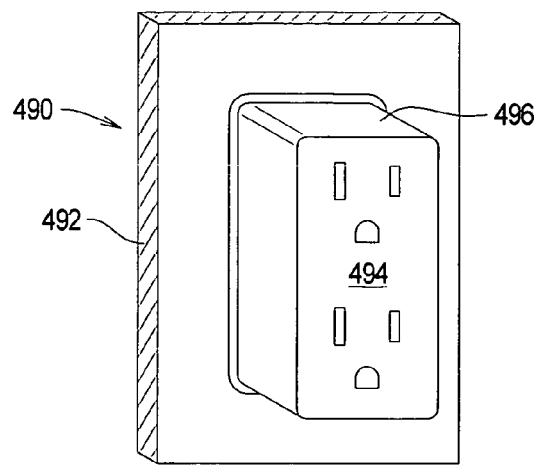
FIG. 27 is a perspective view of an outlet box assembly in accordance with another embodiment of the present invention, in which the operative surface of the outlet or other electrical component protrudes by a distance that is approximately equal to a predetermined thickness of a wall material covering material.
Figure 28:
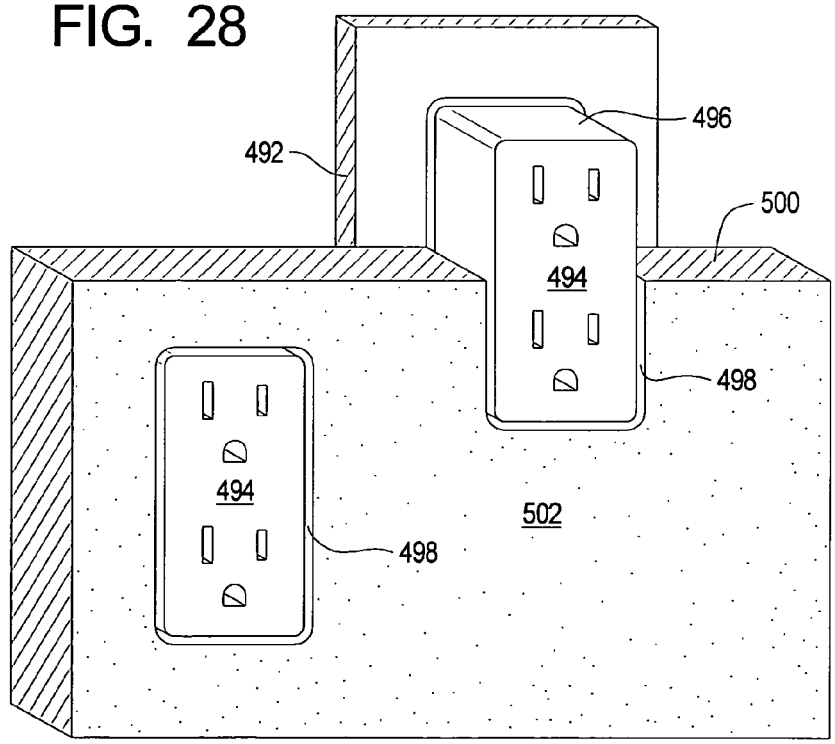
FIG. 28 is a perspective view, partly in cutaway, showing the manner in which the junction box assembly of FIG. 27 is installed so that the protruding face of the electrical component is positioned substantially flush with the surface of the wall covering material.

FIGS. 27-28 illustrate another embodiment of the invention, in which there is an assembly 490 having a plate member 492, from which the operative surface 494 of the electrical component 496 projects by a distance approximately equal to the thickness of a surfacing material that is installed over both the wall and the plate member, such as a layer of paneling, stone or stucco, for example. To form the installation, a cutout 498 is made in the paneling, stone or other material that forms the overlay 500, so that when the overlay is installed the operative surface 494 of the electrical component lies proximately flush with the surface 502 of the former. If desired, the gap between the opening 498 and electrical component 496 can be filled with putty, caulk or other material.

FIGS. 29A-47 illustrate an additional embodiment of the invention, differing from those described above, both in the contour of the plate member and also in the configuration of the receptacle for the electrical component, the receptacle being formed integrally with the plate member and utilizing a different locking mechanism.

Figure 29A:
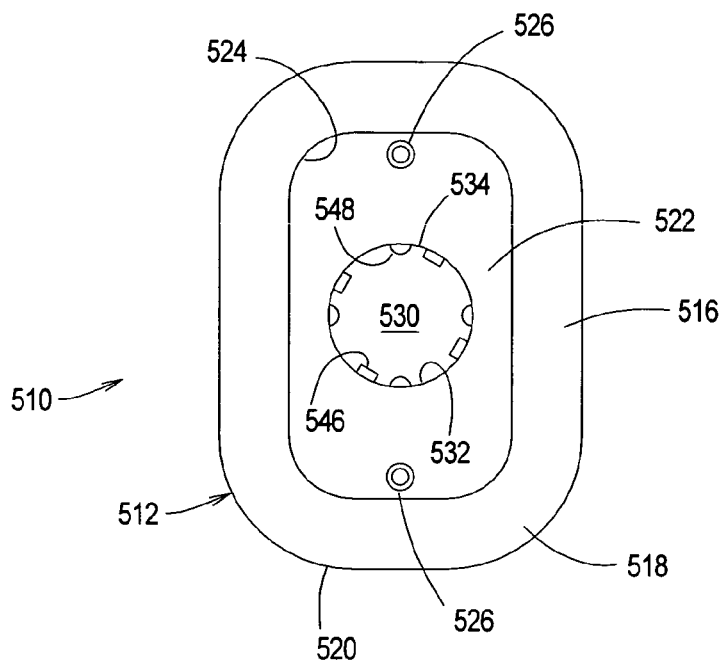
FIG. 29A is a front elevational view of a plate assembly in accordance with another embodiment of the present invention, in which the surface of the plate is recessed around the opening for the electrical component, and which features an integral "plug-in" receptacle for mounting of the component.
Figure 29B:
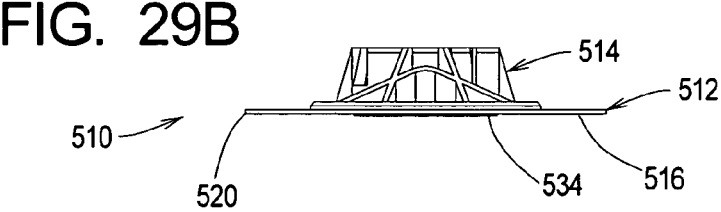
FIG. 29B is a top, edge view of the plate assembly of FIG. 29A, showing the rearward projecting structure of the receptacle in greater detail.
Figure 29C:
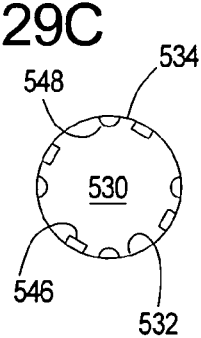
FIG. 29C is front, elevational view of the opening for an electrical component that is visible when installation of the plate assembly of 29A-29B is finished.

Accordingly, FIGS. 29A-29B show an integrated face plate and receptacle assembly 510, in which the plate portion 512 and receptacle portion 514 are formed together as a single unit. As can be seen, the flange of the plate portion 512 includes a relatively broad border 516 having smoothly rounded outer edges and relatively large-radius corners 516. As shown in FIG. 29B, the border 516 of the plate portion is formed of a thin material, so as to be raised only very slightly above the surface of the wall when placed thereon, and includes a radiused edge 520 that tapers back in the direction of the wall surface. This combination of thin, rounded features, with the absence of sharp corners, makes it easy to blend the flange of the plate member into the surrounding wall surface with a minimal buildup of drywall compound, and also helps to reduce the possibility of the compound cracking during the life of the installation. Furthermore, as noted above, the border may include surface texturing to enhance adhesion of the drywall compound, such as grooves, stippling, dimples or holes, for example.

As can be seen with further reference to FIG. 29A, the border 516 of the plate portion surrounds a recessed panel area 522, with the inner edge 524 of the border and extending generally parallel to the outer edge of the border and likewise being rounded/curvilinear. Screw holes 526 are set within the panel area 522, with the depth of the panel area (i.e., the distance that the panel area is recessed rearwardly of the border 516) being sufficient that the drywall compound filling this area will fully cover the edge of the screws when installed, to a depth so that it is sufficient to avoid inadvertent exposure of the screw heads during the finishing process (as described below) and to also avoid cracking of the compound over the life of the installation. It will be understood, however, that the recessed panel area may not be present in all instances, and that in some embodiments the plate member may have a substantially flat front surface similar to other plate members shown herein.

A circular opening 530 is formed centrally in the panel area 522, this being the front opening into the receptacle portion 514 (see FIG. 29B). The edge 532 of the opening is bordered by a raised annular ridge or lip 534 that protrudes towards the front of the assembly; as can be seen in FIG. 29B, the lip 534 stands slightly proud of both the panel area and the surrounding border 516, the reason for which will be described below.

Figure 30A:
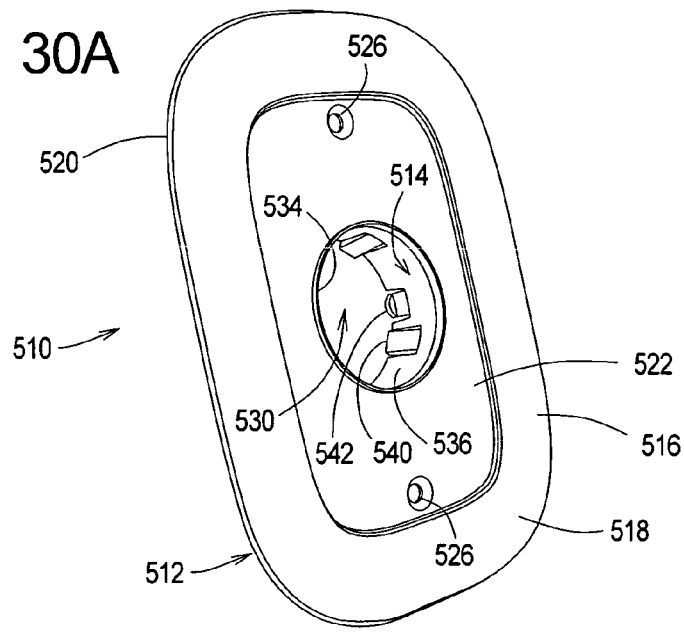
FIGS. 30A-30B are front and rear perspective views of the plate assembly of FIG. 29A, showing the structure thereof in greater detail.
Figure 30B:
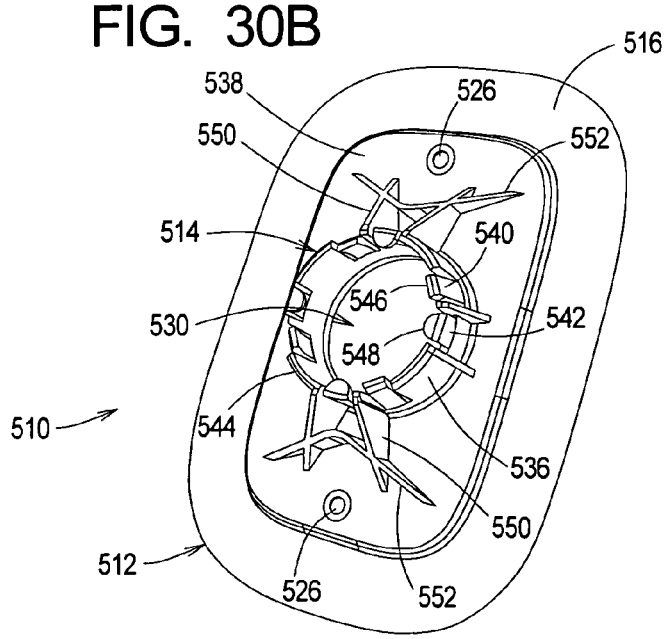

FIGS. 30A-30B show the configuration of the assembly 510 in greater detail, and in particular the configuration of the receptacle portion 514. As can be seen, the receptacle portion is formed integrally with the plate portion 512, the former being in the shape of a generally cylindrical wall 536 that projects from the rearward side 538 of the panel area 522. The cylindrical wall 536 of the receptacle is subdivided into lengthwise-extending locking tabs 540 and alignment fingers 542. The tabs and fingers are defined by narrow slots that extend from the rearward edge 544 of the cylindrical wall, such that their base ends are attached to the wall and their distal ends are free to flex inwardly and outwardly (i.e., radially), owing to the slight flexibility of the molded plastic or other material of which the assembly 510 is formed. The distal ends of both the locking tabs and alignment fingers are angled inwardly, towards the central opening 530, with the ends of the locking tabs terminating in generally flat, transverse edges 546, while the ends of the alignment fingers have flanges or stop portions 548 that project inwardly at approximately right angles to the main length of the fingers. As can be better seen in FIG. 29C, both of these features project inwardly about the opening 530 when the plate assembly has been installed, so as to engage the operative electrical component when the latter is installed therein, as will be described below.

For enhanced strength and stability while holding the electrical component, the cylindrical wall 536 of the socket portion is buttressed by additional, angled walls 550 that extend between the cylindrical wall of the socket and the rear surface 538 of the panel 522, with the walls 550 in turn being braced by inwardly angled cross walls 552.

The illustrated embodiment includes four each of the locking tabs and alignment fingers 546, 548, arranged in pairs at equally-spaced intervals about the perimeter of the receptacle. This arrangement is generally optimal, in terms of both holding the installed electrical component stable and also ease of installation/removal of the component, as will be described below, however, it will be understood that other numbers and arrangements of these locking and alignment features may be utilized in some embodiments, with the electrical components being configured accordingly.

The integrated plate-receptacle assembly that is shown in FIGS. 29A-30B has a single receptacle portion, such that the electrical component will be generally centered in the junction box when the installation is complete. FIGS. 31A-34B, in turn, show embodiments that are similar but have differing arrangements of sockets for alternate placement of the electrical components. With regard to FIGS. 31A-34B, like reference numerals will be used to refer to like elements as in FIGS. 29A-30B.

For example, FIGS. 31A-32B show an embodiment in which there is a plate and receptacle assembly 560 that includes two socket portions 562a, 562b rather than the single socket portion of the preceding embodiment. In this case, the plate portion 564 is generally square in front view, rather than rectangular, therefore corresponding generally in shape to the front opening of a conventional double-outlet junction box. Like the embodiment described above, the plate includes a thin but broad border portion 566 having rounded corners, with an inner edge 570 that circumscribes a slightly recessed central panel area 572 that surrounds the openings 574a, 574b of the two receptacle portions.

Figure 31A:
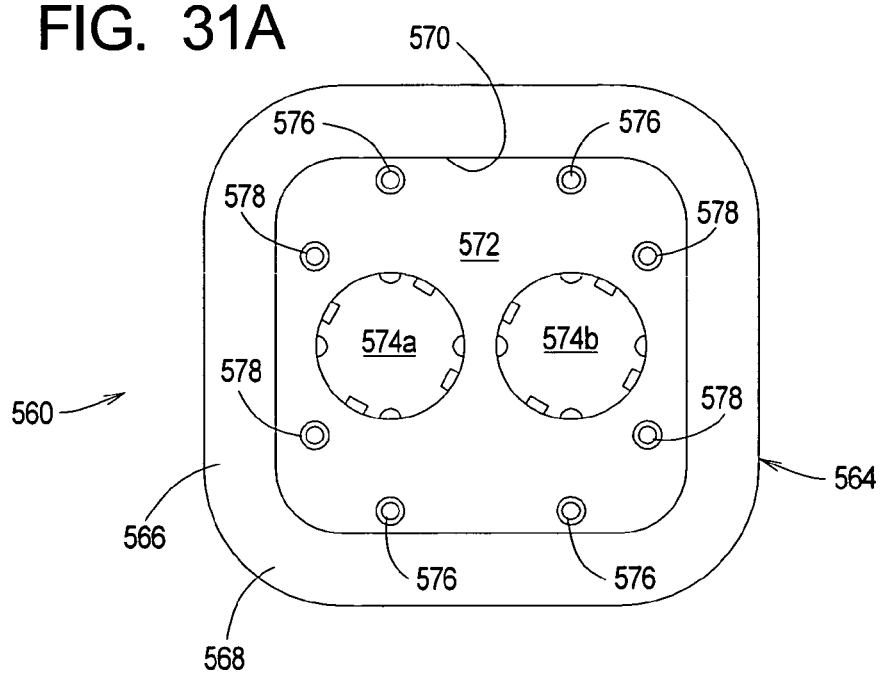
FIG. 31A is a front elevational view of another plate assembly, similar to that of FIG. 29A but having first and second receptacles for receiving two electrical components therein.
Figure 31B:
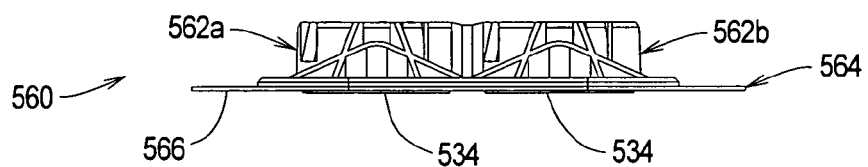
FIG. 31B is a top edge view, similar to FIG. 29B, of the plate assembly of FIG. 31A, showing the rearward projecting structure thereof in great detail.
Figure 31C:
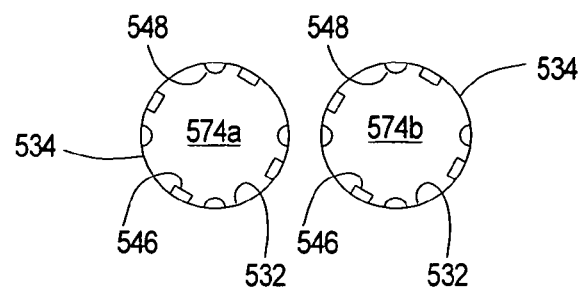
FIG. 31C is a front elevational view, similar to FIG. 29C, showing the two openings of the plate assembly of FIG. 31A that are visible in the finished installation.

In the particular embodiment of FIGS. 31A-32B, the receptacle portions are aligned in a row generally parallel/perpendicular to the edges of the plate member, while the screw holes 576 and 578 are arranged in sets of four so as to enable the assembly to be mounted in a double-outlet junction box with the openings arranged either horizontally (as shown in FIGS. 31A and 31C) or vertically as desired. It will be understood that only one set of holes will ordinarily be occupied by screws in the installation, however, both the filled and unfilled holes will be covered and concealed when the plate assembly is mudded over with drywall compound.

Figure 32A:
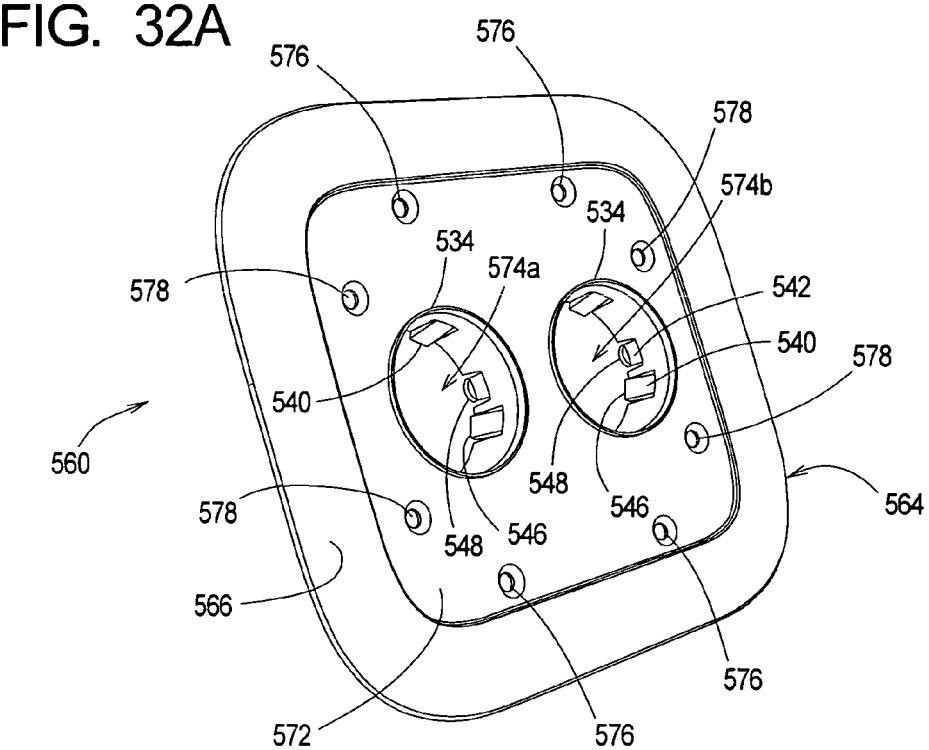
FIGS. 32A-32B are front and rear perspective views of the plate assembly of FIG. 31A, showing the structure thereof in greater detail.
Figure 32B:
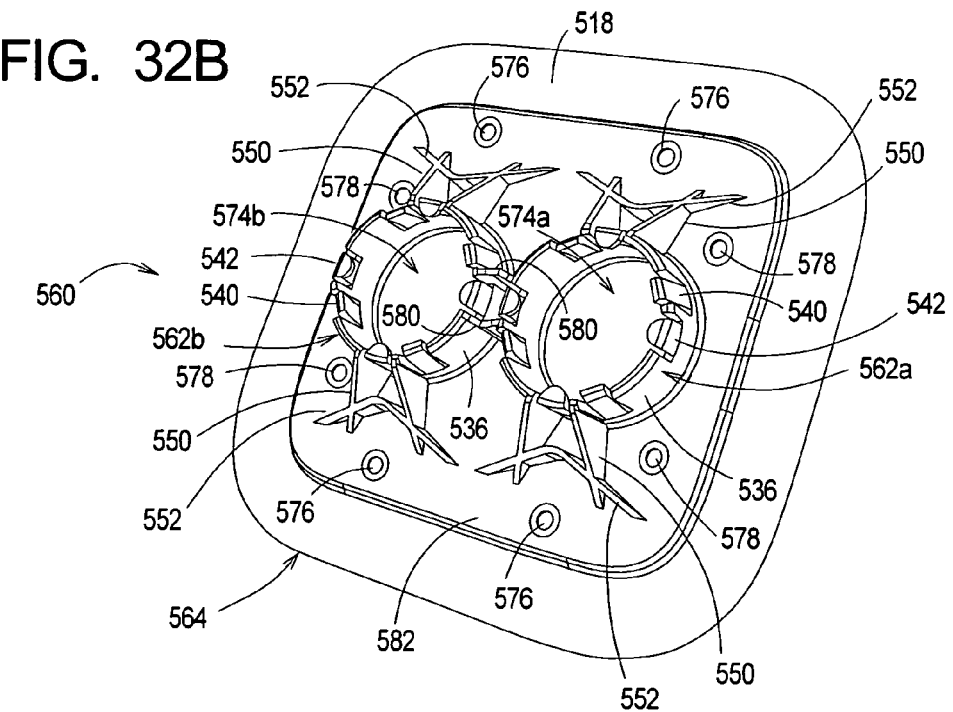

Aside from preferably being siamesed by short bridge walls 580, in order to increase rigidity across the relatively wider span of the two-hole plate, the receiver portions 562a, 562b are each substantially identical to the single receptacle described above with reference to FIGS. 29A-30B. Accordingly, as can be seen in FIGS. 32A-B and also FIGS. 31B-C, each of the receptacle portions includes a cylindrical sleeve or collar 536 as described above, that extends rearwardly from the back surface 582 of the panel area of the assembly, with the series of locking tabs and alignment fingers being spaced about the circumference of the sleeve. Likewise, each of the cylindrical sleeves is buttressed by the angled walls 550 and 552 that extend between the outside of the sleeve and the back 582 of the plate portion.

Figure 33A:
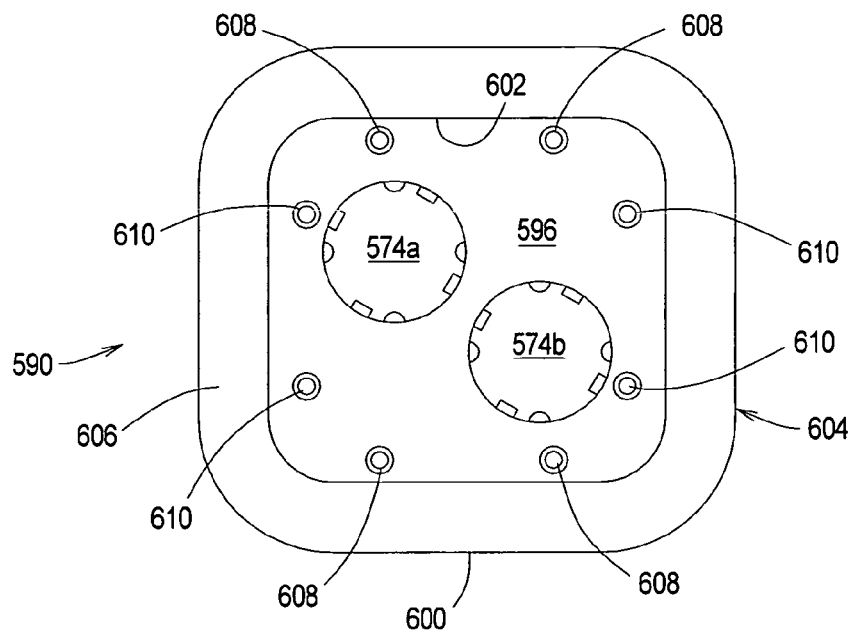
FIG. 33A is a front elevational view of another plate assembly, similar to FIG. 31A, having first and second receptacles for receiving electrical components, that are offset at an angle rather than being aligned parallel to the edges of the plate assembly.
Figure 33B:
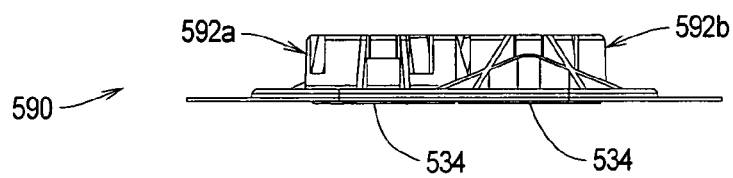
FIG. 33B is a top edge view, similar to FIG. 29B, of the plate assembly of FIG. 33A, showing the rearward projecting structure of the socket receptacles thereof in greater detail.
Figure 33C:
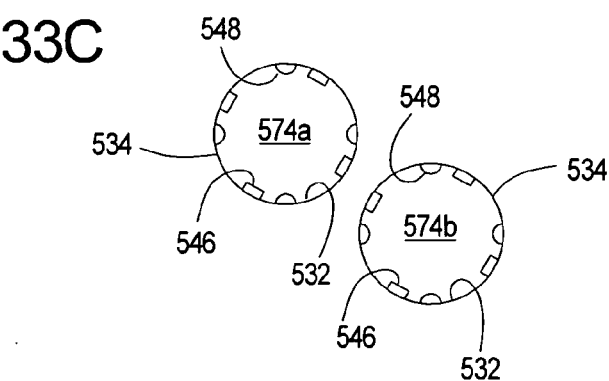
FIG. 33C is a front elevational view, similar to FIG. 29C, of the offset receptacle openings of the plate assembly of FIG. 33A when in a finished installation.

FIGS. 33A-34B show an embodiment that is similar to that of FIGS. 31A-32B in that it likewise includes a pair of receptacle portions, but in which the receptacle portions are offset so that their respective openings 594a, 594b appear stepped or angled relative to one another when the installation is completed, as shown in FIG. 33C, rather than being arranged vertically or horizontally. As can be seen in FIG. 33A, the offset openings are formed within the recessed panel area 596 such that a line passing through the center points of each extends at an angle (approximate 45° in the example shown) to the edges 600, 602 of the plate portion 604. The remaining parts of the plate portion, including the border 606 and two sets of screw holes 608, 610, are substantially identical to those of the embodiment shown in FIGS. 31A-32B, such that the assembly 590 can be mounted to the junction box with the openings 594a, 594b angled one way or another as desired.

Figure 34A:
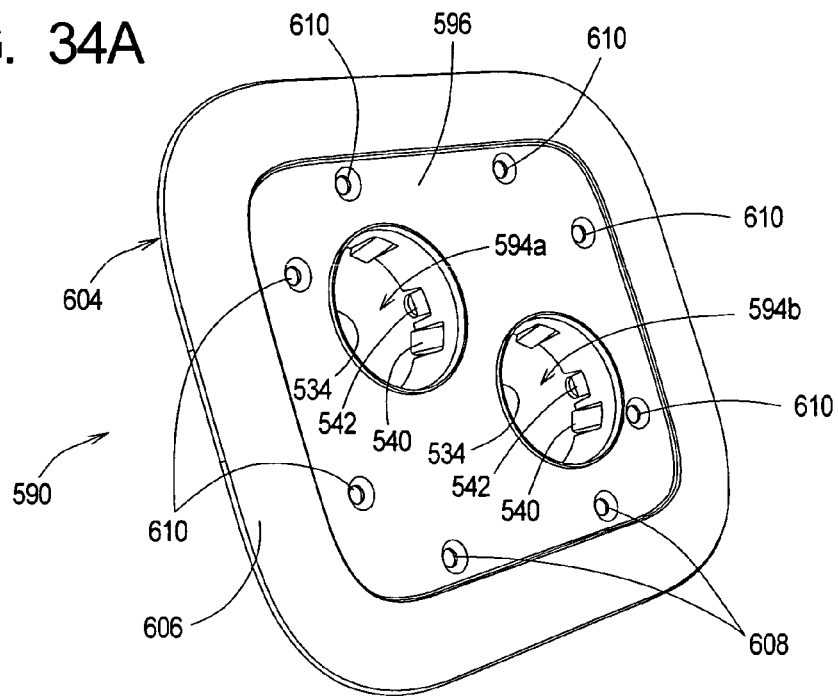
FIGS. 34A-34B are front and rear perspective views of the plate assembly of FIG. 33A, showing the structure thereof in greater detail.
Figure 34B:
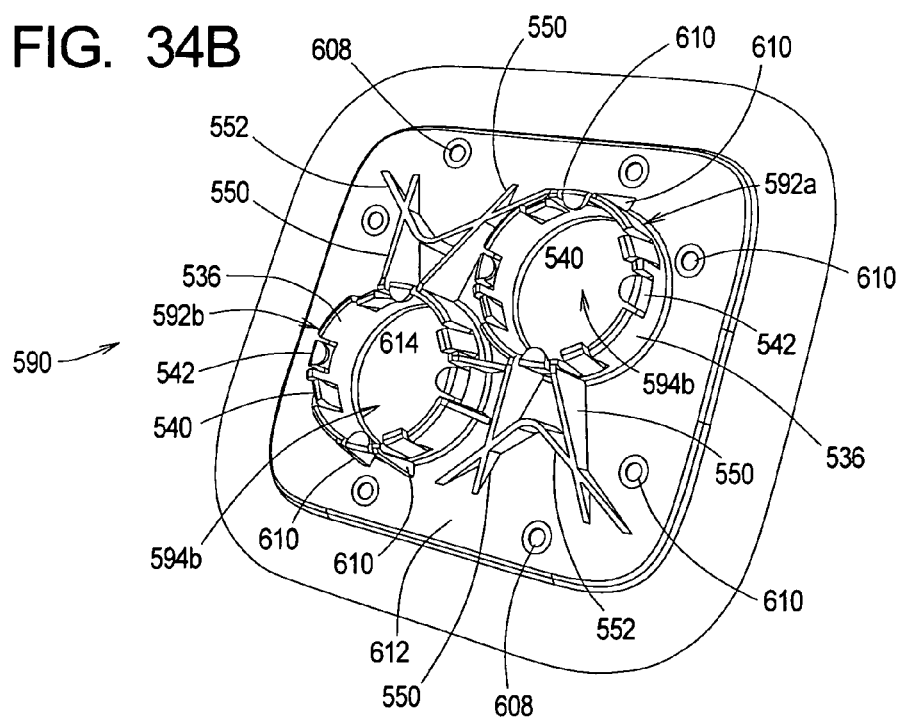

As can be seen in FIG. 34B and also in FIG. 33B, the configuration of the receptacle portions 592a, 592b, at the rear of the assembly, is substantially the same as described above, except that due to the proximity of the receptacles to the edges of the plate member the elongate buttressing walls 550, 552 are intact on one side only; shorter walls or gussets 612 are formed on the opposite sides of the receptacles, between the cylindrical walls 536 and the rear surface 612 of the plate portion, with additional pairs of short walls 614

(only one set of which is visible in FIG. 34B) being formed at right angle locations to provide additional, make up strength.

FIGS. 35A-36B show a plate and receptacle assembly having a receptacle that internally is substantially similar to those of the embodiments of FIGS. 29A-34B, so that the same form of electrical component can be interchangeably mounted therein, but in which the receptacle is formed as a separate piece that is in threaded engagement with the plate member so that the depth/projection of the receptacle is adjustable relative to the plate member. This feature enables the position of the front of the electrical component to be adjusted relative to the plate member, so that the former can be positioned flush with the outer surface of wall surface materials of different thicknesses that overlie the plate member, such as paneling, masonry, stucco and so on.

Figure 35A:
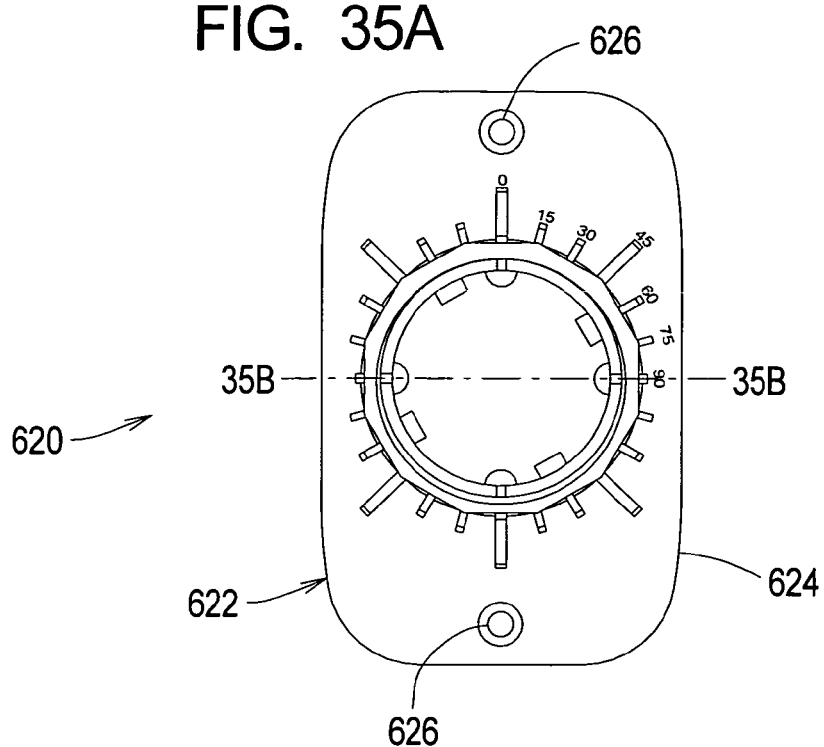
FIG. 35A is a rear elevational view of a plate assembly in accordance with another embodiment of the present invention, in which the "plug-in" mechanism of the socket for receiving an operative component is substantially the same as that in FIGS. 29A-34B, but in which the socket is mounted in a sleeve that is in threaded engagement with main plate of the assembly, so as to permit the projection/depth of the socket relative to the plate to be adjusted so that the operative end of the electrical component is able to lie flush with the surfaces of wall materials having differing thicknesses.
Figure 35B:
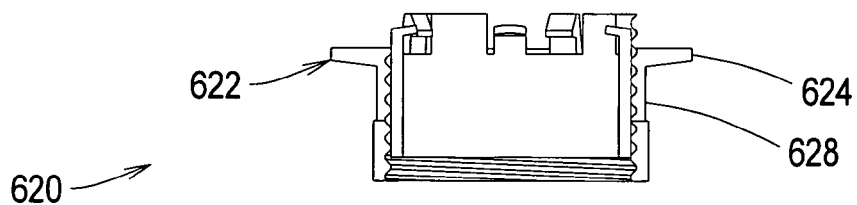
FIG. 35B is a cross-sectional view of the plate assembly of FIG. 35A, taken along line 35B-35B in FIG. 35A, showing the threaded engagement between the main plate and the threaded socket member in greater detail.

As can be seen FIGS. 35A,-35B, and also FIGS. 36A-36B, in this embodiment the plate member 622 is generally smaller and thicker, with a blunt outer edge 624, since it is generally mounted behind or to the back of the wall material and therefore need not blend into the outer surface of the wall. The embodiment that is shown in FIGS. 35A-36B is for mounting a single electrical component, and consequently the plate member 622 includes only two screw holes 626 for mounting to the junction box, however, it will be understood that there may also be multiple receptacle embodiments, similar to those described above, and that they may likewise have having additional screw holes for mounting the assembly alternate ways within a junction box.

As can be seen with further reference to FIGS. 35B and 36B, an internally-threaded collar 628 is formed integrally with the main flange 630 of the plate member and extends rearwardly from the back surface thereof, the exterior of the collar being buttressed by a plurality of radially-extending gussets or walls 632.

The receptacle member 634, in turn, includes a generally cylindrical, externally-threaded sleeve that is received within the collar 628, with the threads 638 on the outside of the sleeve 636 engaging the threads 640 on the inside of the collar. The cylindrical wall 638 at the forward end of the sleeve is subdivided to form the locking tabs 642 and alignment fingers 644 similar to those described above. The operative surfaces of the end features 646, 648 of the locking tabs and alignment legs are substantially identical similar to those of the features 548, 546 described above; the socket member therefore interchangeably receives and engages the electrical components in the same manner as the fixed receptacle portions of the embodiments shown in FIGS. 29A-34B.

A jam or lock nut 650 is threaded onto the rearward end of the sleeve, with its internal threads 652 also engaging the threads 638 on the exterior of the sleeve. The sleeve 636 can therefore be rotated so as move it forwardly or rearwardly through the collar 628 of the plate member 622, thereby increasing or decreasing the distance by which the forward end of the socket projects from the front of the plate, so that the surface of the operative portion of the electrical component will lie flush with the overlying wall material when installed therein. When the desired distance (i.e., the desired amount of projection) has been achieved, the ring-shaped jam nut is tightened against the back of the plate member, until the forward surface 654 of the nut contacts the rearward surface 656 of the collar 628 (and also the upper edges of the buttressing walls 632), so that the resulting pressure on the threads prevents further rotation of the sleeve 636 and locks the receptacle portion 634 in place.

In order to ensure proper alignment of the operative component, either vertical/horizontal or at some other angle, certain of the buttress walls 632 are marked with indicia that the installer can align with lengthwise grooves 660 that are formed through the threads 638 of the sleeve member, and/or with raised teats or pegs 662 that are formed on the rearward edge of the sleeve so as to be visible from behind the assembly. In the embodiment that is shown, the buttressing walls 632 are arranged at 15° intervals (i.e., 0°, 15°, 30°, 45°, and so on) so that they provide a dual function of not only strengthening the collar but also providing a reference for the installer. Furthermore, the radially-extending walls 632 and also the grooves 660 and raised pegs 662 are not only readily visible, but they can also be felt during the installation process: The assembly can therefore be quickly and easily installed with the receptacle portion set at the correct depth and alignment, even where access is somewhat obstructed or viewing is difficult, or where the installer must work by reaching around from the front of the wall. It will be understood, however, that other or additional forms or alignment features may be utilized in some embodiments. It will also be understood that although the screw-type length adjustment mechanism of the embodiment shown in FIGS. 35A-B and 36A-B is advantageous in terms of strength, adjustability and ease of use, other embodiments may utilize other mechanisms for adjusting the depth/projection of the receptacle portion, such as various sliding/telescoping mechanisms, worm gear or pinion gear mechanisms, or interchangeable sleeves with different lengths, for example.

Figure 35C:
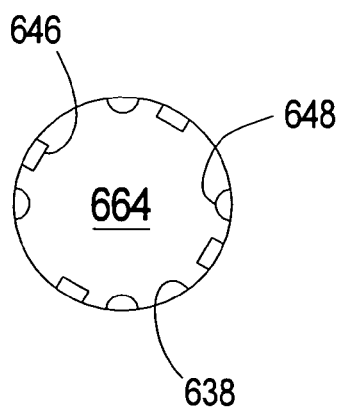
FIG. 35C is a front elevational view of a finished installation of the plate assembly of FIGS. 35A-35B, with the visible opening of the single socket being substantially identical to that of FIG. 29C.

When the installation is completed and finished over, as can be seen in FIG. 35C, the appearance is substantially identical to that of the other installations described above, with the locking tab/alignment leg features 646, 648 projecting into the opening 664 for engaging the body of an electrical component when the latter is inserted into the receptacle of the assembly.

Figure 37A:
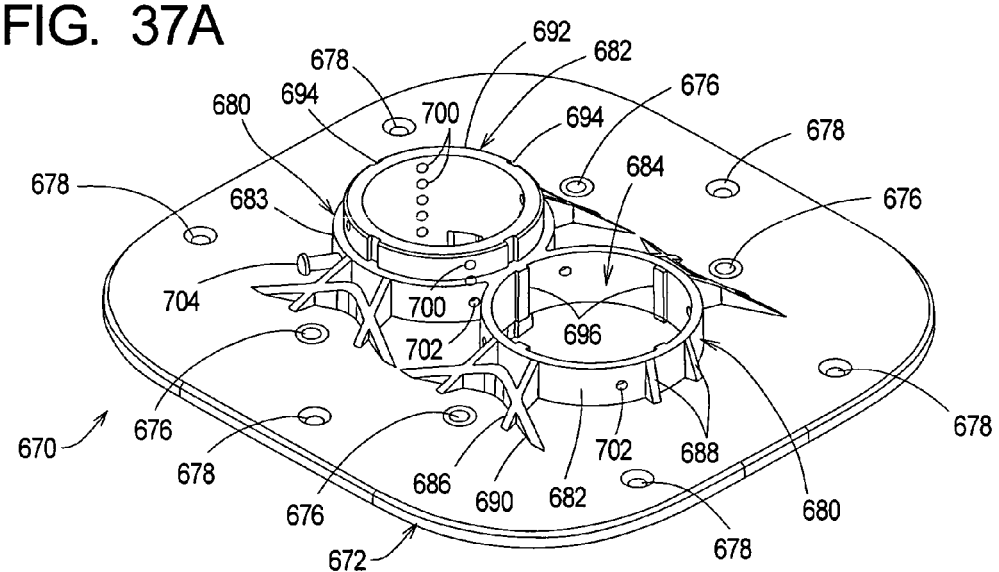
FIGS. 37A-37B are rear and front elevational views of a plate and receptacle assembly in accordance with another embodiment which allows the projection of the electrical component to be adjusted for the thickness of the wall, that utilizes a sliding telescope mechanism rather than the screw-type mechanism of FIGS. 35A-36B.
Figure 37B:
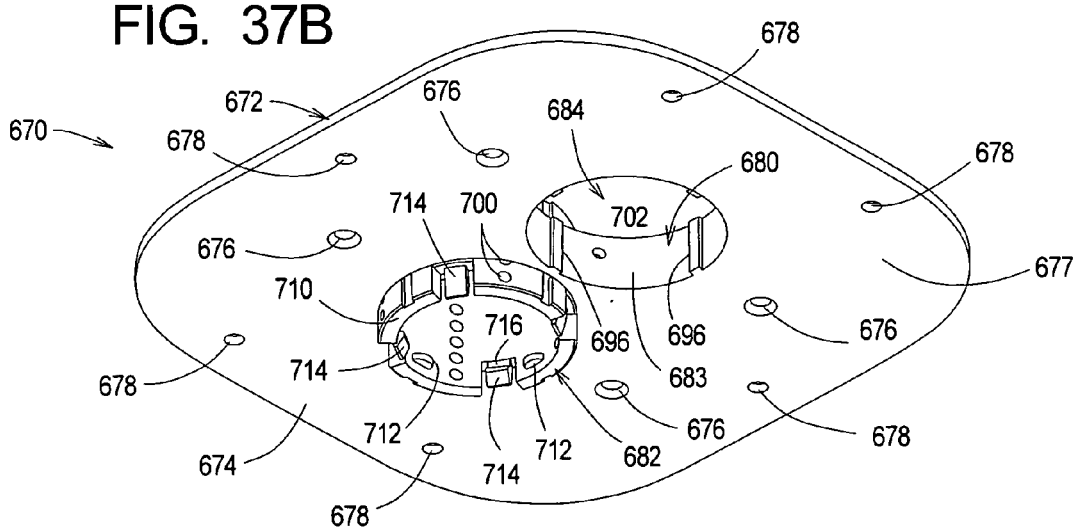
Figure 39A:
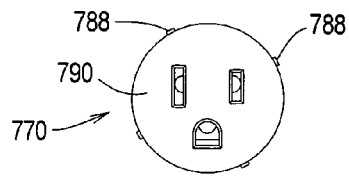
FIGS. 39A-39B are front and side elevational views of a first electrical component that is interchangeably mountable in the plate members of 29A-37B, namely a grounded electrical outlet.
Figure 40A:
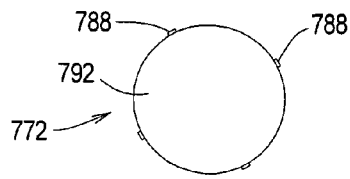
FIGS. 40A-40B are front and side elevational views of a second electrical component that is interchangeably mountable in the plate members of 29A-37B, namely, a line voltage push-button on/off switch.
Figure 41A:
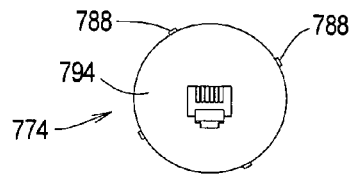
FIGS. 41A-41B are front and side elevational views if a third electrical component that is interchangeably mountable in the plate members of 29A-37B, namely a telephone connection jack.
Figure 39B:
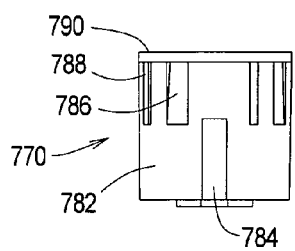
Figure 40B:
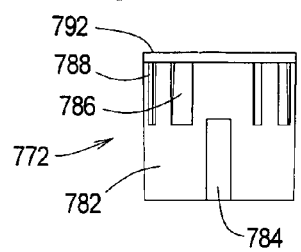
Figure 41B:
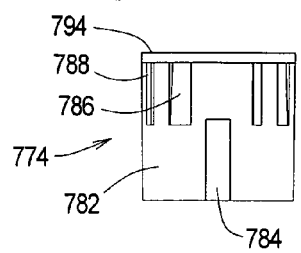
Figure 42A:
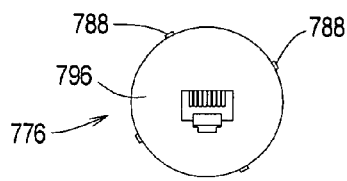
FIGS. 42A-42B are front and side elevational views of a fourth electrical component that is interchangeably mountable in the plate members of FIGS. 29A-37B, namely, a data connection jack.
Figure 43A:
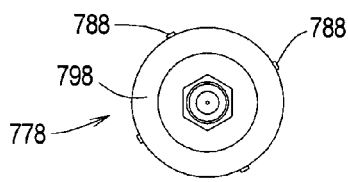

FIGS. 37A-B show a plate and receptacle assembly 670 in accordance with another embodiment shows projection of the electrical component to be adjusted for the thickness of the overlying wall material. As with the preceding, adjustable-depth embodiment, this embodiment is particularly intended for use with tile, masonry, paneling and other wall surface materials having a substantial thickness.

Since, as with the preceding embodiment, the assembly is intended to be mounted to the back of the wall surface material in most installations, rather than to a front surface thereof, the plate member 672 of the assembly has a generally flat, planar front surface 674 for lying flat against the rear surface of the wall material. The plate member includes screw holes 676 for mounting the assembly to the front of a junction box, which are countersunk at the front surface 677 of the plate member so that the heads of the screws will not interfere with the plate member lying flat against the back of the wall covering material. Additional screw holes 678 are spaced about the periphery of the plate member, further out from the junction box screw holes 676, and are countersunk on the opposite (back) side of the plate member, for mounting the periphery of the plate member to the back of the wall material in the manner that will be described below.

As can be seen with further reference to FIG. 37A, the receptacle portions (of which there are two in the illustrated example) each have a two-piece construction, namely, a stationary collar member 680 that is mounted to the back of the plate and a sleeve member 682 that is slideably received in the collar member.

As can be seen, the collar members 680 include cylindrical walls 683 that define tubular passages 684. The walls 683 are formed integrally with and extend rearwardly from the plate member 672, and are strengthened by outwardly extending support walls 686, 688 and angled buttress walls 690, in a manner similar to that described above.

The sleeve member 682, in turn, includes a cylindrical wall 692 having an outside diameter just slightly smaller than the inside diameter of the wall 683 of the collar member 680, so that the sleeve member will fit within and form a sliding engagement therewith. The cylindrical wall 683 is preferably relatively thick, for reasons that will be described below, and includes lengthwise alignment channels 694 forward about its exterior that engage cooperating lengthwise-extending ridges 696 on the inside of the collar member to maintain alignment between the two pieces; in the embodiment that is illustrated, the collar and sleeve pieces have four cooperating channels 694 and ridges 696, spaced at 90° intervals, however, it will be understood that a lesser or greater number of these feature may be used.

A series of holes or bores 700 are formed through the wall 692 of the sleeve member, in lengthwise rows and preferably at equally-spaced intervals. As can be seen in FIG. 37A, the alignment established by the channels 694 and ridges 696 on the sleeve and collar members serves to align the rows of bores 700 with corresponding bores 702 in the wall 683 of the collar member 680; in the example that is illustrated, there are again four rows of holes 700 in each sleeve member and four corresponding holes 702 in each collar member, spaced at 90° intervals, but it will be understood that there may be fewer or additional sets of holes in some embodiments. When the bores 702 in the collar member are aligned with a corresponding set of four bores 700 in the sleeve member, pins or screws 704 are inserted through the bores to lock the sleeve and collar together and prevent further movement between the two pieces.

As can be seen in FIGS. 38A-C, this combination of features permits the projection of the receptacle portion to be adjusted relative to the plate portion of the assembly, in incremental steps accordingly to the spacing of the holes 700 in the sleeve member 682. As can be seen in FIGS. 38A-B, the sleeve member 682 is inserted in the assembly by bringing it into alignment with the collar portion 680, with the channels 694 aligned with the corresponding ridges in the collar member, and then sliding the sleeve member into the collar member in the direction indicated by arrow 706. The sleeve member is then slid through the collar in the direction indicated by arrow 708 (or the reverse, if desired) in FIG. 38C, until a forward (distal) end 710 projects from the front of the plate member 672 by the desired distance, as indicated by "d" in FIG. 38C. The sleeve member is then locked in place in the collar member by inserting screws 704 (or pins or similar pieces) through the cooperating bores 700, 702.

The cooperating holes 700, 702 in the sleeve and collar members therefore permit telescoping adjustment between the two pieces in an incremental fashion, according to the spacing between the holes in the sleeve members. As will be described below, this enables the operator to adjustably position the operative end of the electrical component at a spaced distance forwardly of the plate member, so that the operational end of the component will lie flush with the front surface of the wall material while the plate member is mounted at the back of the material. In the illustrated embodiment, the holes 700 are set at a spacing of 2 mm, so that adjustment can be made at increments of 2 mm, however, it will be understood that any suitable spacing may be used; in order to achieve a finer spacing while still maintaining a hole size that is adequately large for strength and convenience of installation, the holes may be staggered or there may be additional rows and sets of holes 700, 702 about the sleeve and collar members; furthermore, additional holes can be drilled through the sleeve and/or collar onsite if necessary to achieve precise positioning for a particular installation.

As can be seen in FIG. 37B, the forward end 710 of each sleeve member includes small, inwardly (radially) projecting, semicircular alignment flanges 712, that correspond to the inwardly projecting flanges on the ends of the alignment legs described above. Positioned intermediate the flanges 712, in turn, are inwardly projecting locking tabs 714 that correspond to the locking tabs described above, except for being shorter in length. In order to ensure flexibility despite their shorter length, the inwardly-angled locking tabs are undercut at notches 716 to reduce the thickness of the material at the base of the tabs; also, as noted above, the walls 692 of the sleeve members are relatively thick, providing adequate room for the inset tips of the locking tabs to flex outwardly in the course of releasing an electrical component from the receptacle, as will be describe below. The shortened length of the forward end of the sleeves (i.e., the distance from the distal edge 710 to the alignment flanges and locking tabs) allows the end of the sleeve portion to be positioned within the wall material behind the operative end of the electrical component, as will be described below, so that only the end of the component will be located at the wall surface and no part of the sleeve member itself will be exposed.

Figure 44A:
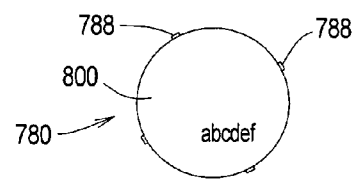
FIGS. 44A-44B are front and side elevational views of a sixth electrical component that is interchangeably mountable in the plate members of FIGS. 29A-37B, namely, an LCD control having a dial/tap screen that enables the user to operate a number of systems from a single interface.
Figure 42B:
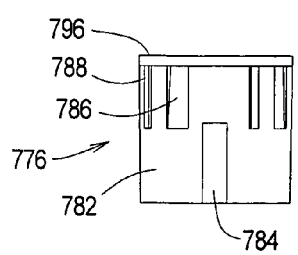
Figure 43B:
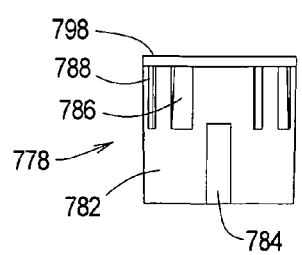
Figure 44B:
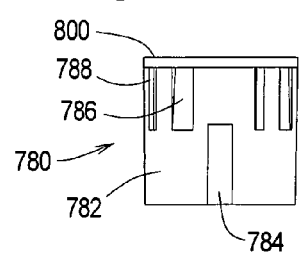

FIGS. 39A-44B show a series of electrical components that are interchangeably mountable in the plate and receptacles assemblies of FIGS. 29A-37B, namely, a grounded electrical outlet 770 (FIGS. 39A-B), an pushbutton on/off switch 772 (FIGS. 40A-B), a telephone jack 774 (FIGS. 41A-B), a data jack 776 (FIGS. 42A-B), a cable "F" connector 778 (FIGS. 43A-B) and an LCD dial/tap screen control 680 (FIGS. 44A-B). As with the embodiments previously described, it will be understood that numerous other, similarly-configured electrical components can be provided.

As can be seen in FIGS. 39A-44B, the components are substantially the same in external configuration, with the exception of the features at the operative ends thereof, that interface with the cord, human operator, and so on, and are therefore interchangeably mountable in any and all of the plate/receptacle assemblies of FIGS. 29A-37B. In the illustrated embodiment, the electrical components each include a generally cylindrical body 782, with a plurality of alignment channels 784 being formed about a perimeter of the cylindrical body and extending forwardly from the rearward (base) end thereof and terminating just forward of a lengthwise midpoint of the body; in the embodiment that is illustrated, there are four channels at 90° intervals about the body 782, that cooperate with the four alignment legs of the receptacle portions (as previously noted, it will be understood that in some embodiments there may be fewer or more alignment channels/legs). A series of locking channels 786, in turn, extend from the front (distal) end of the body and terminate near the longitudinal midpoint thereof. The arrangement of alignment and locking channels terminating near the longitudinal midpoint of the body permits the receptacle to have alignment legs and locking tabs that are approximately equal in length (e.g., see FIG. 30B), but it will be understood that this aspect is not critical and that the channels and legs/tabs may have any suitable length such that they cooperate to align and lock the electrical component in the receptacle in the manner described below.

As can be seen, the locking channels 786 alternate with the guide channels 784, that is, they are offset angularly from one another so as to not be in direct alignment and are instead positioned intermediate one another. In addition, a plurality (four in the illustrated embodiment) of slightly raised ribs 788 are formed about the perimeter of the cylindrical body, near its forward (distal) end; the ribs serve the dual purposes of centering the forward end of the electrical component within the opening of the receptacle so as to form a slight but uniform gap about the component for insertion of the removal tool, as will be described below, while and also providing grip points for the tool during removal of the component.

End caps 790 are mounted to the forward ends of the cylindrical bodies 782, all of the end caps being circular so as to fit concentrically within the receptacle openings and preferably having generally flat forward surfaces, but having different features/structures located within the front surfaces depending on function. For example, the end cap 790 of the operative component 770 in FIGS. 39A-B has openings for a three-prong grounded plug, end cap 792 in FIGS. 40A-B has a touch-type pushbutton controlling a line-voltage on-off switch, end cap 794 in FIGS. 41A-B has an opening containing a jack for a plug-in telephone cord, end cap 796 in FIGS. 42A-B has an opening containing a jack for a plug-in data cable, end cap 798 in FIGS. 43A-B has an "F" connector for a television cable, and end cap 800 in FIGS. 42A-B has an LED touch screen control; it will be understood that these are only a few examples, and that other electrical components, may have other forms of end caps pending on their functions. In each case, the cylindrical body 7 behind the end cap houses the associated connections, switches, and so on of the electrical component, as are known to those skilled in the relevant art. Wire leads (not shown in FIGS. 39A-44B) form the electrical connection between the component and its associated system.

FIGS. 45A-45E illustrate the steps involved in making and finishing an installation using the components of FIGS. 29A-44B. This example features a single-opening assembly, however, it will be understood that the steps are substantially the same for the multiple component assemblies.

In the illustrated embodiment, the surface of the end cap is covered by a temporary shield 802, with which the component is preferably originally supplied, the shield suitably being formed of a thin adhesive plastic material, for example.

Figure 45A:
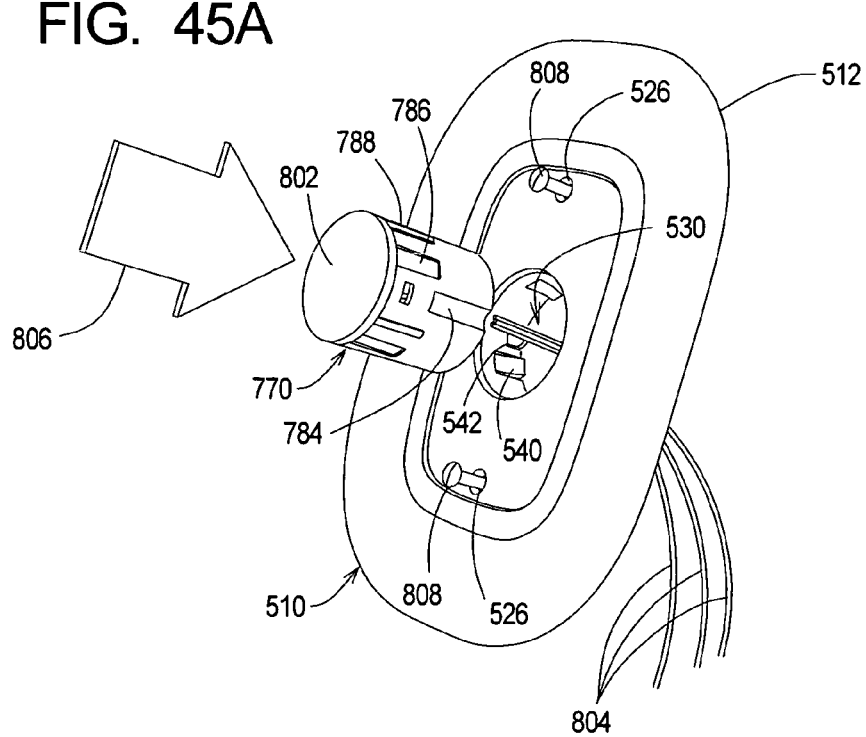
FIG. 45A is a perspective view of the plate assembly of FIG. 29A and the plug-in type electrical component of FIG. 39A showing the first step in the installation procedure, namely, mounting the electrical component to the plate assembly by pressing the electrical component into the receptacle opening from the front of the plate assembly.

As can be seen in FIG. 45A, the wire leads 804 are passed through the opening 530 in the plate portion 812 of the assembly 510, with the cylindrical body of the component then being pressed into the receptacle in the direction indicated by arrow 806. In so doing, the body of the component is rotated slightly, if necessary, in order to bring the channels 884 into alignment with the cooperating end flanges on the ends of the alignment legs 542, allowing the component to slide rearwardly through the receptacle. The engagement between the legs and the channels 784 also serves to align the locking tabs with the corresponding channels 786 in the body of the component; since channels 786 do not extend fully to the rearward end of the body the inwardly angled rearward ends of the tabs are initially depressed (i.e., bent outwardly), however, upon reaching the channels the ends of the tabs are released from compression so as to spring or "snap" back inwardly, so that the blunt end walls of the tabs form a locking engagement with notches at the end walls of the channels. Simultaneously, the flanges 548 on the ends of the alignment legs (see FIGS. 30A-B) move into abutment with end walls of the alignment channels 784, arresting further movement of the component into the receptacle, thus cooperating with the locking tabs in channels 786 to lock the component firmly in place within the receptacle portion of the assembly, holding the component against either inward or outward movement during operation. The electrical component is further stabilized by the ridges 788 about the cylindrical body, that engage the cylindrical wall 536 of the receptacle portion (see FIGS. 30A-B), both to hold the component against lateral shifting movement and also to maintain the narrow (e.g., 1 mm) annular gap between the body of the component and the wall of the receptacle.

Figure 45B:
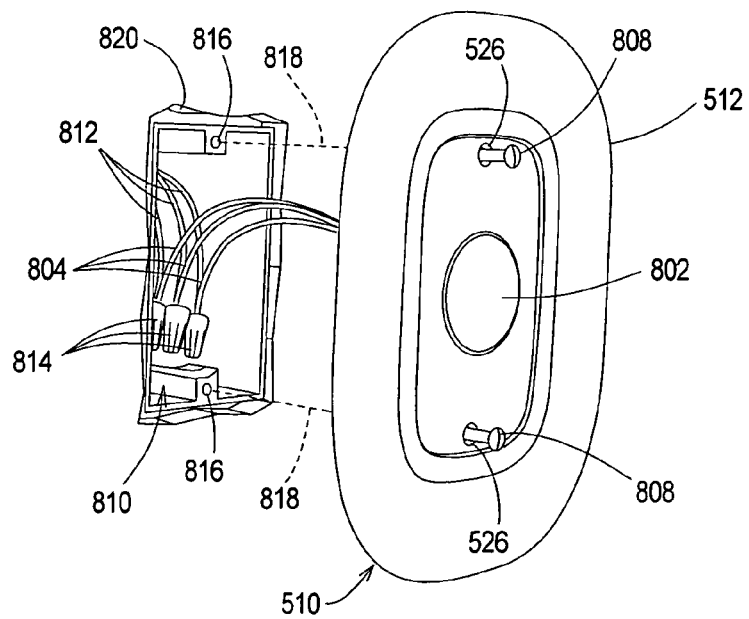
FIG. 45B is a perspective, environmental view of the assembled plate member and operative component of FIG. 45A, and an electrical junction box to which the assembly is to be mounted, showing a second step in the installation procedure, namely, placing the assembly over the junction box with the wires of the operative component connected by twist-on wire connectors or other suitable connections, and then driving the screws from the front of the plate member into the cooperating openings of the junction box.

Screws 808 are inserted through the holes 526 on the plate portion, and the assembly is brought into proximity with the junction box 810 as shown in FIG. 45B, where the leads 804 are connected to the system wires 812, using twist-on wire connectors 814 or other suitable connectors. The screws 708 are brought into alignment with the corresponding bores 816 in the junction box, as indicated by dotted lines 818, then driven in to secure the assembly in place over the mouth of the junction box and the surrounding opening 820 in the wall.

Figure 45C:
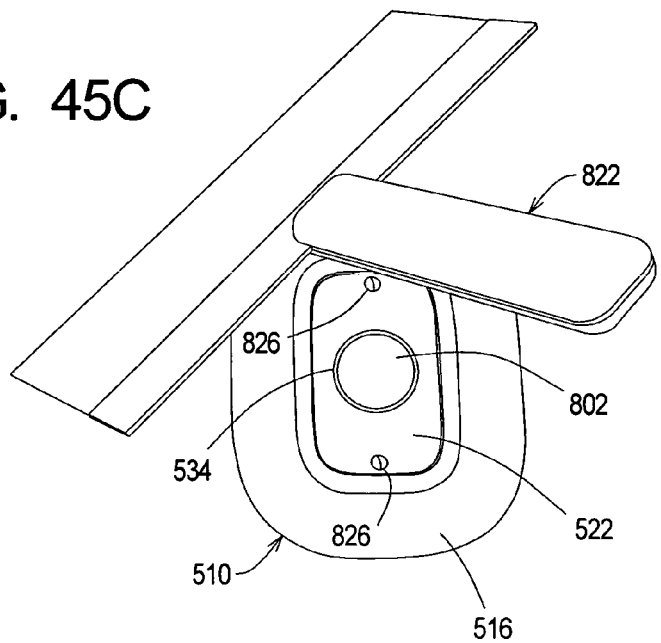
FIG. 45C is a front perspective view of the plate assembly and electrical component assembly of FIGS. 45A-45B, showing the next step in the installation procedure, namely, the application of drywall filler compound over the entire front surface of the assembly including the recessed portion of the face of the plate and the heads of the screws that are set therein.

As can be seen in FIG. 45C, the entire assembly, installed in the wall as described above, is mudded over with drywall compound, using an applicator 822 or other suitable tool. As noted above, a layer of adhesive tape may first be applied over the perimeter of the plate member. The compound covers not only the border 516 of the plate portion 510, but also fills the recessed panel area 522 over the heads of the screws 526 and covers the shield 802 over the operative end of the electrical component and the surrounding annular lip 534.

Figure 45D:
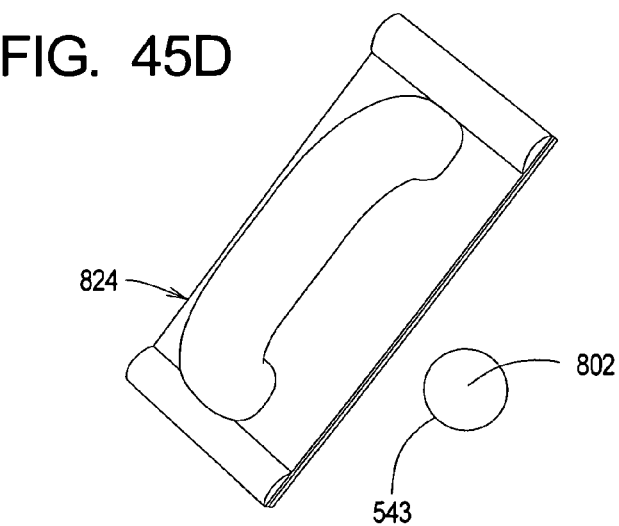
FIG. 45D is a front elevational view of the assembly of FIGS. 45A-45C, showing the next step in the installation procedure, namely, sanding down the surface of the hardened drywall filler compound until the protective cover of the operative portion of the electrical component and the ridge surrounding it are exposed at the surface of the wall.
Figure 45E:
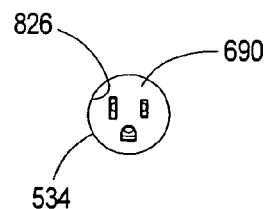
FIG. 45E is front perspective view of the assembly of FIGS. 45A-45D, showing the final step in the installation procedure, namely, the removal of the protective cap from over the operative portion of the electrical component so as to expose the operative portion at the surface of the wall.

After the drywall compound is sufficiently cured/hardened, the area over the installation is sanded, using a sanding board 824 or other suitable tool as shown in FIG. 45D, to smooth the layer of compound and reduce its depth so that it will blend into and be visually indistinguishable from the surrounding surface of the wall. The sanding continues until the shield 802 over the component and the surrounding ridge 534 become exposed, the latter standing proud of the other features of the plate portion so as to act as a depth gauge, with the result that the front of the receptacle and electrical component can be uncovered from the drywall compound without exposing any of the other parts of the assembly, which remain invisible to the viewer.

At this point, the area may be painted, if desired. When finishing of the wall surface is complete, the circular shield piece 702 is peeled off or otherwise removed, exposing the end surface 690 of the electrical component (i.e., the grounded electrical outlet in the example that is illustrated), the surface of the component being fresh and unblemished to do having been covered by the shield piece during the installation and finishing process. Removal of the shield also exposes the narrow annular gap 726 between the end cap of the electrical component and the surrounding ridge 534 of the plate, for insertion of the removal tool in the manner that will be described below.

FIGS. 46A-47B show an alternate form of installation, using one of the embodiments that mounts at the back of the a wall surface material that has a substantial thickness, such as masonry, stucco, tile, paneling and so on. FIG. 47A shows the installation in a first wall of such material which has a relatively greater thickness "$t_1$", while FIG. 47B shows the installation in a wall which has a relatively lesser thickness "$t_2$". The example shows installations using the telescoping sleeve/collar embodiment of FIGS. 37A-38C, however, it will be understood that installations using the screw-type embodiment, of FIGS. 35A-36B can be made in a similar manner, the primary difference being operation of the depth-adjustment mechanism.

Figure 46A:
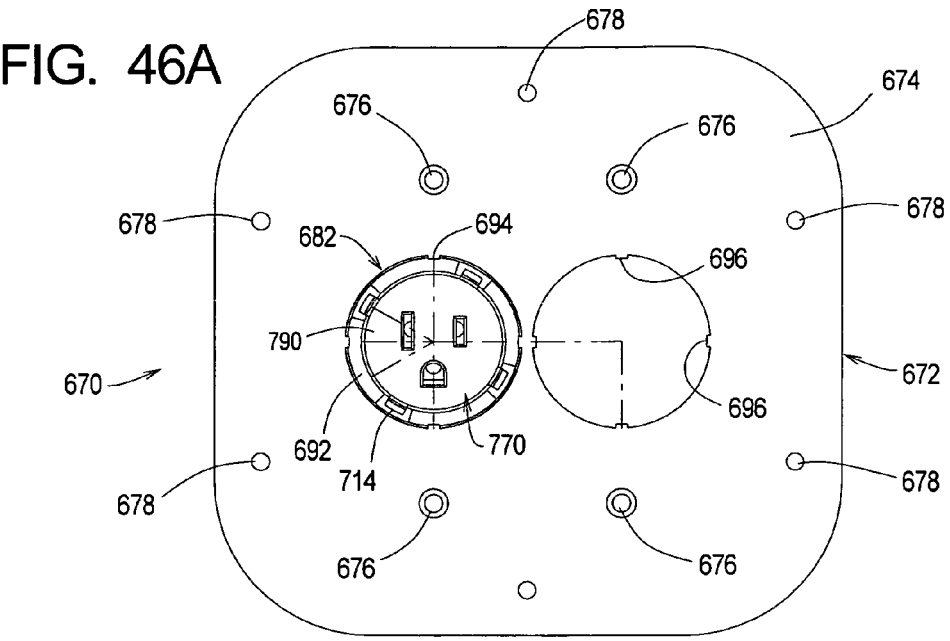
FIGS. 46A-46B are front elevational, top plan and rear elevational views of the plate and receptacle assembly of FIGS. 37A-37B with an electrical component mounted therein as a first step in installation of the assembly.
Figure 46B:
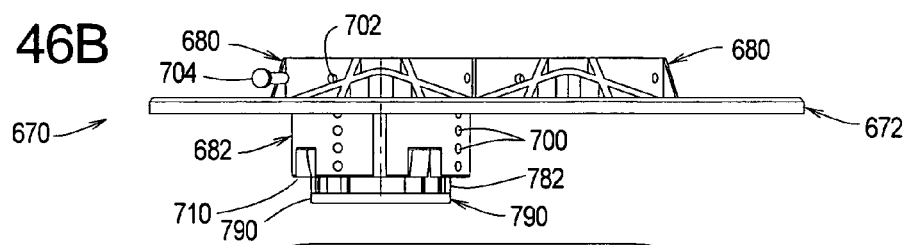
Figure 46C:
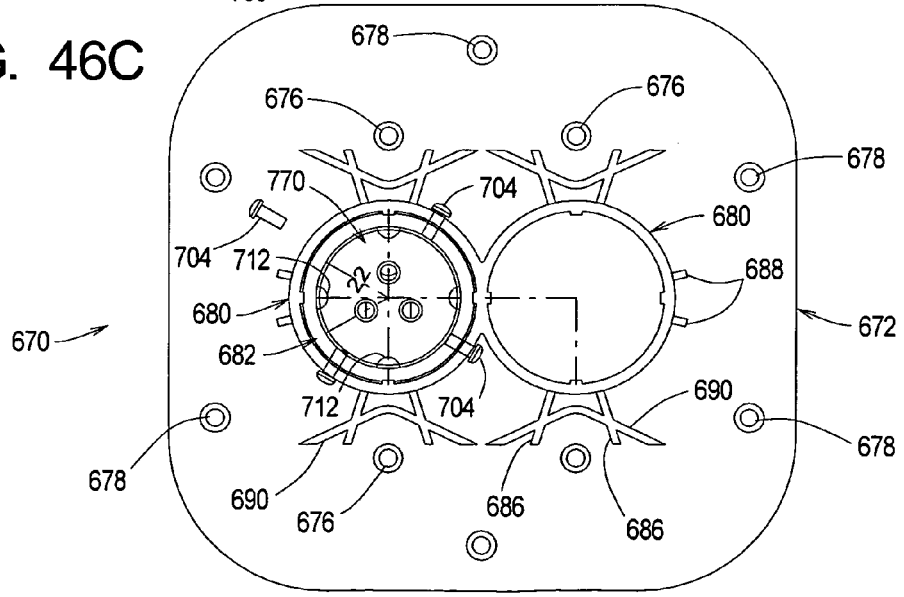

As can be seen in FIGS. 46A-C, the electrical component is inserted into the front of the sleeve portion of the assembly, so that the guide flanges and locking tabs 712, 714 engage the body of the component and lock it in place in substantially the same manner as described above. Due the shortened length of the sleeve, as compared with the receptacle portions of the nonadjustable embodiments described above, the body 782 of the component is not fully enclosed within the sleeve, and instead a portion of it (e.g., 1 cm) projects uncovered from the distal edge 710 of the sleeve member. As will be described below, this aspect allows the assembly to be installed with only the operative component and no other part of the assembly being located at the surface of the wall; this aspect is important for use with tile, paneling, masonry, and other wall materials, since it is generally not feasible to over-finish the installation with a layer of drywall compound or other fill material in a manner described above.

The installer measures or otherwise determines the thickness "$t_1$" of the wall material and adjusts the position of the sleeve member within the collar member of the assembly in the manner shown in FIGS. 38A-C, until the combined length of the sleeve member and the electrical component that projects forwardly of the front surface 674 of the plate member 672 matches the wall thickness, i.e., so that the operative end 790 of the component will lie flush with the front of the wall. Screws 704 are then passed through the cooperating holes 700, 702 in the manner described above to lock the sleeve member and electrical component in position relative to the plate member.

Referring to FIG. 47A, showing the installation in a relatively thicker wall material 830, a first bore 832 is formed completely through the wall, using a hole saw or other suitable instrument. The diameter of the bore 832 is sized to accommodate the body 782, with additional clearance to form a small (e.g., 1 mm) annular gap 834 for insertion of the removal tool, as will be described below. A second, larger-diameter bore 836 is formed annularly with the first bore 832, extending forwardly from the rear surface 838 of the wall 830, to a depth part way through the wall that is sufficient to accommodate that portion of the sleeve member 682 that projects forwardly from the surface 674 of the plate member 672, when the position of the sleeve member is adjusted for the operative end 790 of the component to lie flush with the front surface 840 of the wall. A drilling template may be provided for precise alignment when cutting the two holes 832, 836.

The plate member 672 is then placed against the back of the wall material 830, so that the front surface 674 of the plate member 672 lies flat against the rear surface 848 of the wall, and then screws 842 or other fasteners are driven through the holes 678 in the plate member (see FIGS. 46A and 46B) and into the material of the wall to secure the assembly in place. A small finish ring (not shown) may then be removably installed (e.g., pressed into) the annular gap 834 to seal the front of the assembly and cover any possibly rough edges of bore 832.

FIG. 47B shows the assembly installed in a wall 844 having a lesser thickness "$t_2$". As can be seen the installation is generally the same, except that the sleeve member 682 is recessed further through the collar member 680 due to the reduced thickness of the wall, to the point where only the body 782 of the component projects in front of the plate member in order for the operative end 790 of the component to lie flush with the front surface 846 of the wall. Consequently, only a single bore 848 needs to be cut through the wall in order to accommodate the body of the electrical component, the bore again being sized to create an annular gap 850 around the operative end of the component. The plate assembly is then mounted against the back 852 of the wall material in the same manner as described above, using screws 842 or other fasteners, and a removable finish ring can be installed in the tool removal gap 850 to form a reveal around the operative end 790 of the component.

FIGS. 44A-45C show a manual removal tool 930 which is used to extract the electrical components from the receptacles of the installed assemblies. As will be described, the tool allows the components to be removed in a rapid and convenient manner.

Figure 48A:
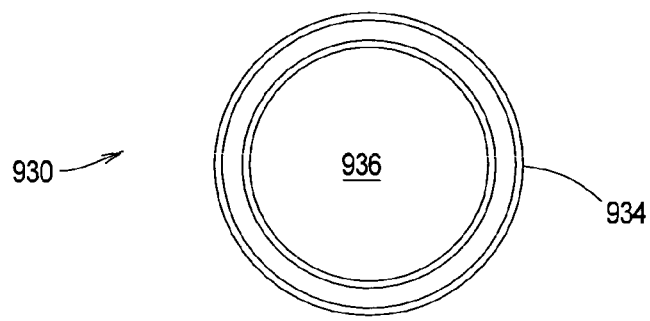
FIGS. 48A-48B are front and side elevational views of an extractor tool that is utilized to remove the plug-in electrical components from the installed plate assemblies of FIGS. 29A-37B.
Figure 48B:
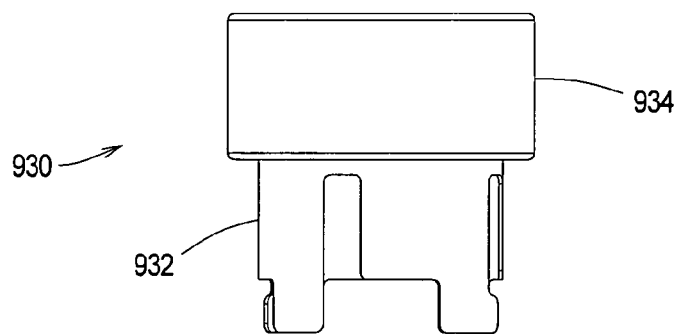

As can be seen in FIGS. 48A-B, the removal tool 930 has a generally cylindrical overall configuration, with a thin-walled sleeve portion 932 that projects at one end and a thicker walled collar portion 934 at the other that provides a grip area for pushing/pulling and turning the tool using the fingers of a hand. Both portions surround a central opening or bore 936 which is sized to receive the electrical components, with just enough clearance to slide over the cylindrical bodies of the components. The wall thickness of the sleeve portion 932 is sized so as to that it is able to enter the narrow annular gap 526 between the electrical component and the circular ridge of the plate portion of the assembly. The sleeve portion 932 of the tool can therefore be inserted between the electrical component and the receptacle in which the component is contained, in the manner that will be described below.

Figure 49A:
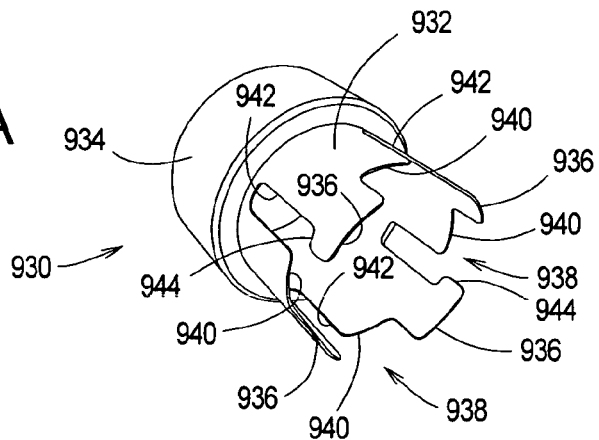
FIGS. 49A-49C are rear, front, and front perspective views of the extractor tool of FIGS. 48A-48B, showing the structure thereof in greater detail, FIG. 49C further showing a protective cap member that is installable over the prongs of the extractor tool so as to prevent damage thereto when the tool is not in use.
Figure 49B:
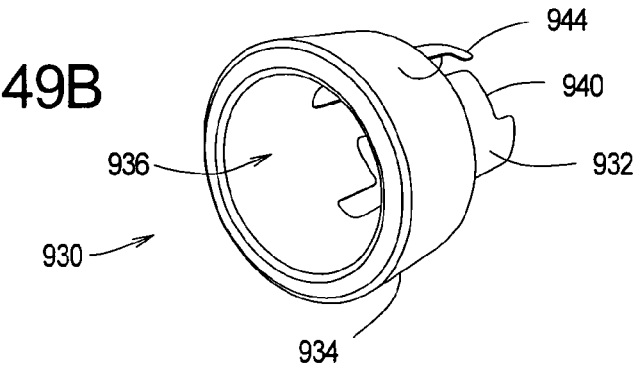
Figure 49C:
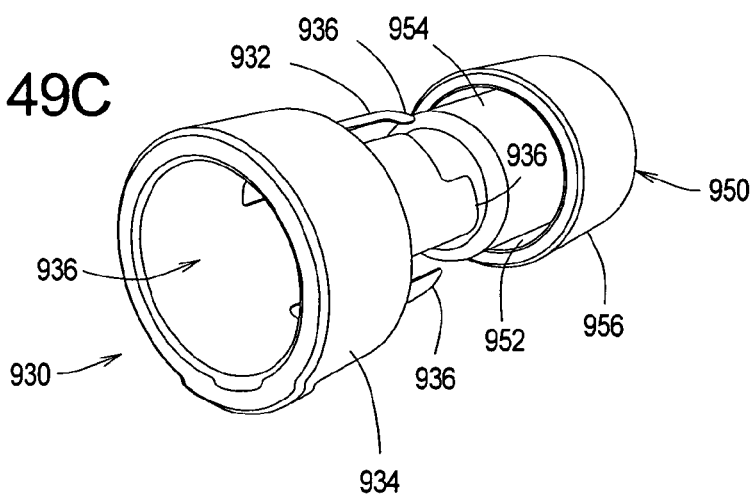

As can be better seen in FIGS. 49A-B, the sleeve portion 932 of the tool is divided into a plurality (four in the embodiment that is illustrated) of prongs 946 by L-shaped slots 938. These slots are spaced at 90° intervals, to cooperate with the corresponding features on the bodies of the electrical components: each includes a circumferentially-extending segment 940 along the distal edge of the sleeve 932, and a longitudinal segment 940 that extends forwardly in the sleeve at a generally right angle to the first segment. As can be seen with further reference to FIGS. 49A-B, the bottom of each of the longitudinal segments 942 is partially enclosed by a tab 944 that extends from the long side of the "L", towards the circumferential segment 940, so that the tabs 944 form hooks at the bottom of each of the longitudinal segments 942.

The removal tool 930 is suitably formed of a metal, such as steel or stainless steel, having sufficient strength that the prongs will not deflect or deform excessively in operation, although plastics and other generally rigid materials may also bee [[be]] used.

Since the prongs 936 are comparatively delicate and may therefore be bent or crushed with careless handling, a protective slip-on cover 950 is preferably provided, having a closed bottom annular cavity 952 that is formed between a central plug portion 954 and an outer sleeve portion 956, into which the prongs 936 slip so as to be supported and protected when the tool is not in use. The cover 950 is suitably formed of a sturdy rubber or other somewhat yielding, cushioning material, although it will be understood that rigid materials may also be used.

FIGS. 50A-50F illustrate use of the tool to extract an electrical component from the receptacle in which it is mounted; in this example, the electrical component is the grounded electrical outlet that was installed as shown in FIGS. 45A-E.

As can be seen in FIG. 50A, the tool is first aligned coaxially with the installed electrical component, with the collar 934 being gripped between the user's fingers. The thin-walled sleeve portion 932 of the tool aligned with the annular gap 926 around the component, with the user rotating the tool as necessary so that the prongs 936 will enter in the spaces between the ribs 788 (e.g., see FIG. 37A).

The sleeve portion of the tool is then inserted into the annular gap 726, in the direction indicated by arrow 960 in FIG. 46B. The alignment of the prongs, between the ribs 788 on the component body, ensures that the distal ends of the prongs will contact and then ride under the angled end faces of the locking tabs 540 that are located in channels 786 (e.g., see FIG. 37B), forcing them outwardly from locking engagement with the notches at the ends of the channels and freeing the component to move outwardly from the receptacle. The relatively broad annular end surface 962 of the collar portion of the tool provides an area against which the operator can apply additional hand pressure, if necessary, to release the locking tabs from engagement.

After riding under the locking tabs the sleeve portion of the tool travels further into the gap 726, with the body of the electrical component being received in the cylindrical bore 736 of the tool. When the tool is fully inserted, as shown in FIG. 46C, the upper edges of the circumferential segments of the slots come into contact with the inwardly projecting flanges 548 of the alignment legs (see FIG. 29C), so that the latter act as stops to arrest insertion of the tool at the proper depth and also provide bearing surfaces for rotation of the tool.

As the tool is being inserted, the raised ridges 788 on the body of the component enter the longitudinally extending runs 942 of the L-shaped slots 938. The operator then rotates the tool slightly in a clockwise direction, as indicated by arrow 964 in FIG. 46C, so that the hook-shaped tabs 944 move behind the ridges 788 and capture them within the longitudinally extending segments 942 of the slots, as shown in FIG. 46D. Since, as noted above, the locking tabs have by this point been depressed out of engagement with the body of the component, the operator can now withdraw the component by pulling outwardly on the collar 934 of the tool, as indicated by arrows 966, 968 in FIGS. 50D-E; in so doing, the tabs 944 contact the rearward ends of the ridges 788 to transmit the pulling force to the body 782 of the component, drawing it out of the opening 530 of the receptacle 514. Simultaneously, the flange portions of the alignment legs slip out of the channels 784 and off the rearward end of the body 782.

Further extraction of the component, as shown in FIG. 46F draws the electrical leads 704 out through the opening 730 of the receptacle 514, eventually drawing out and exposing the twist-on wire connectors 714 (see FIG. 43B) or other connectors, so that the component can be disconnected and replaced or repaired as desired. The new (or repaired) component can then be reinstalled by pressing it back into the opening of the receptacle, in the manner shown in FIG. 43A.

As can be seen in FIG. 51, the foregoing steps involved in removal of the electrical component, as shown in FIGS. 50A-F, can in practice be combined into a simple, fluid series of motions, namely pushing the tool 930 in around the electrical component, turning the tool around the component as indicated by arrow 970, and then pulling the tool out with the component captured within it. This makes removing and replacing of the components an exceptionally easy and quick process, and in fact much more rapid and convenient than is the case with prior components that use conventional outlet and junction box covers.

The generally cylindrical receptacle and component configurations, in conjunction with the tool shown in FIGS. 48A-51, are therefore particularly advantageous, although it will be understood that other forms of latching and connecting mechanisms may be used to join the electrical components to the plate assemblies in some embodiments.

It will be observed that in all of the embodiments described above, the operative portion of the electrical component (or its surround in the case of components with projecting operative portions) lies generally at or flush with the finished surface of the wall, and that the underlying outlet box and associated plate are covered by the same finishing material of the wall, so that the operative portion of the component is virtually the only part that can be seen and visually distinguished from the surrounding wall when the installation is completed.

It is to be recognized that various alterations, modifications, and/or additions may be introduced into the constructions and arrangements of parts described above without departing from the spirit or ambit of the present invention.

What is claimed is:

1. A method for installing an electrical component in a wall, said method comprising the steps of:
  placing said electrical component in a junction box in said wall so that only an operative portion of said electrical component is located at a surface of said wall;
  placing a layer of wall surface material over said junction box while leaving exposed said operative portion of said electrical component; and
  conforming said layer of wall surface material with a surrounding area of said surface of said wall so as to form a flush, substantially uniform surface that extends over and around said junction box and said surrounding area of said surface of said wall;
  so that when finished said layer of wall surface material appears substantially level and continuous with said surface of said wall and substantially only said operative portion of said electrical component is visibly distinguishable at said surface of said wall.

2. The method of claim 1, wherein the step of placing a layer of wall surface material over said junction box while leaving exposed said operative portion of said electrical component comprises:
  placing a plate assembly on said junction box so that said operative portion of said electrical component is exposed at an opening of said plate assembly and a generally planar flange portion of said plate assembly extends substantially parallel to said surface of said wall; and
  placing said wall surface material over said flange portion of said plate assembly while leaving exposed said opening of said plate assembly and said operative portion of said electrical component therein.

3. The method of claim 2, wherein the step of placing said plate assembly on said junction box comprises:
  mounting said flange portion of said plate assembly at said surface of said wall so that said flange portion lies generally flat thereon.

4. The method of claim 3, wherein the step of placing a wall surface material over said flange portion of said plate assembly and configuring said layer of wall surface material with a surrounding area of said surface of said wall comprises:
  applying a layer of fill material over said flange portion of said plate assembly; and
  blending said layer of fill material into said surface of said wall around said flange portion of said plate assembly.

5. The method of claim 4, wherein the step of applying a layer of fill material over said flange portion of said plate assembly comprises:
  applying a layer of drywall compound over said flange portion of said plate assembly and onto said surface of said wall around said flange portion.

6. The method of claim 4, wherein the step of mounting said flange portion of said plate assembly at said surface of said wall comprises:
  mounting said flange portion of said plate assembly at said surface of said wall so that a raised ridge about said opening of said plate assembly surrounds said operative portion of said electrical component therein so as to define an inner edge of an area of said flange portion for depositation of said layer of fill material thereon.

7. The method of claim 6, wherein the step of mounting said flange portion of said plate assembly at said surface of said wall further comprises:

mounting said flange portion of said plate assembly to said surface of said wall so that said raised ridge projects from said flange portion so as to lie substantially flush with a distal end of said operative portion of said electrical component.

8. The method of claim 7, wherein the steps of applying a layer of fill material over said flange portion of said plate assembly and blending said layer of fill material into said surface of said wall comprise:

applying a layer of fill material over both said flange portion of said plate assembly and said distal end of said operative portion of said electrical component; and reducing the thickness of said layer of fill material until said distal end of said operative portion of said electrical component and said ridge about said opening of said plate assembly are exposed at said surface of said wall.

9. The method of claim 8, wherein the step of reducing the thickness of said layer of fill material comprises:

sanding said layer of fill material from over said distal end of said operative portion of said electrical component and said ridge surrounding said opening of said plate assembly.

10. The method of claim 9, further comprising the steps of:

applying said layer of fill material over a thin protective cover mounted on said distal end of said operative portion of said electrical component; and removing said thin protective cover after said layer of fill material has been sanded from over said distal end of said operative portion of said electrical component.

11. The method of claim 3, wherein the step of mounting said flange portion of said plate assembly at said surface of said wall comprises:

mounting said plate assembly to a front side of said junction box.

12. The method of claim 2, wherein the step of placing said electrical component in said junction box comprises:

mounting said electrical component in said plate assembly.

13. The method of claim 12, wherein the step of mounting said electrical component in said plate assembly comprises:

mounting said electrical component in a receptacle portion of said plate assembly so that said operative portion of said electrical component is exposed through said opening of said plate member.

14. The method of claim 13, wherein the step of mounting said electrical component in said receptacle portion comprises:

detachably mounting said electrical component in said receptacle portion so that alternative electrical components are interchangeably mountable therein.

15. The method of claim 14, wherein the step of detachably mounting said electrical component in said receptacle portion of said plate assembly comprises:

inserting said electrical component into said receptacle portion through said opening of said plate member so that said electrical component is releasably captured therein.

16. The method of claim 13, wherein the step of mounting said component in said receptacle portion comprises:

mounting a plurality of said electrical components in individual receptacle portions in said plate assembly.

17. A method for installing an electrical component in a wall, said method comprising the steps of:

providing a plate assembly having an opening and a generally planar flange portion;

mounting said electrical component in said opening of said plate assembly so that an operative portion of said electrical component is exposed at a front of said opening;

mounting said plate assembly to a junction box in said wall so that said flange portion extends substantially parallel to a surface of said wall;

connecting said electrical component to at least one wire lead in said junction box;

placing a layer of wall surface material over said junction box and said flange portion of said plate assembly while leaving exposed said operative portion of said electrical component; and conforming said layer of wall surface material with a surrounding area of said surface of said wall so as to form a flush, substantially uniform surface that extends over and around said junction box and said surrounding area of said surface of said wall;

so that when finished said layer of wall finish material appears substantially level and continuous with said surface of said wall and substantially only said operative portion of said electrical component is visibly distinguishable at said surface of said wall.

18. The method of claim 17, wherein the step of providing a plate assembly having an opening and a generally planar flange portion comprises:

providing a plate assembly comprising a receptacle portion that extends rearwardly from said flange portion into said junction box and has said opening at a forward end thereof.

19. The method of claim 18, wherein the step of mounting said electrical component in said opening of said plate assembly comprises:

inserting said electrical component into said receptacle portion through said opening of said plate assembly.

20. A method for installing an electrical component in a wall, said method comprising the steps of:

placing said electrical component in a junction box in said wall so that only an operative portion of said electrical component is located at a surface of said wall;

placing a plate assembly on said junction box so that said operative portion of said electrical component is exposed at an opening of said plate assembly and a generally planar flange portion of said plate assembly extends substantially parallel to said surface of said wall;

mounting said flange portion of said plate assembly at said surface of said wall so that said flange portion lies generally flat thereon and so that a raised ridge about said opening of said plate assembly surrounds said electrical component therein so as to define an inner edge of an area of said flange portion for deposition of said layer of fill material thereon;

placing said wall surface material over said flange portion of said plate assembly while leaving exposed said opening of said plate assembly and said operative portion of said electrical component therein, the step of placing a wall surface material over said flange portion of said plate assembly comprising:

applying a layer of fill material over said flange portion of said plate assembly; and blending said layer of fill material into said surface of said wall around said flange portion of said plate assembly.

21. The method of claim 20, wherein the step of applying a layer of fill material over said flange portion of said plate assembly comprises:

applying a layer of drywall compound over said flange portion of said plate assembly and onto said surface of said wall around said plate portion.

22. The method of claim 20, wherein the step of mounting said flange portion of said plate assembly at said surface of said wall further comprises:
mounting said flange portion of said plate assembly to said surface of said wall so that said raised ridge projects from said flange portion so as to lie substantially flush with a distal end of said operative portion of said electrical component.

23. The method of claim 22, wherein the steps of applying a layer of fill material over said flange portion of said plate assembly and blending said layer of fill material into said surface of said wall comprise:
applying a layer of fill material over both said flange portion of said plate assembly and said distal end of said operative portion of said electrical component; and
reducing the thickness of said layer of fill material until said distal end of said operative portion of said electrical component and said ridge about said opening of said plate assembly are exposed at said surface of said wall.

24. The method of claim 23, wherein the step of reducing the thickness of said layer of fill material comprises:
sanding said layer of fill material from over said distal end of said operative portion of said electrical component and said ridge surrounding said opening of said plate assembly.

25. The method of claim 24, further comprising the steps of:
applying said layer of fill material over a thin protective cover mounted on said distal end of said operative portion of said electrical component; and
removing said thin protective cover after said layer of fill material has been sanded from over said distal end of said operative portion of said electrical component.

* * * * *